US012558639B2

(12) United States Patent    (10) Patent No.:   US 12,558,639 B2

Rahmathullah et al.    (45) Date of Patent:   *Feb. 24, 2026

(54) FILTER ELEMENT CONFIGURATIONS

(71) Applicant: Donaldson Company, Inc.,
Minneapolis, MN (US)

(72) Inventors: Aflal Rahmathullah, Savage, MN
(US); Andrew J. Dallas, Lakeville, MN
(US); Brian R. Tucker, Farmington,
MN (US); Daniel E. Adamek,
Bloomington, MN (US); Paul A. Way,
Edina, MN (US); Scott A. Betcher,
Lakeville, MN (US); Vijay K. Kapoor,
Eagan, MN (US); Colter A. Marcks,
Ellsworth, WI (US); **William S.
Rossiter**, Brooklyn Park, MN (US);

(Continued)

(73) Assignee: Donaldson Company, Inc.,
Minneapolis, MN (US)

( * ) Notice: Subject to any disclaimer, the term of this
patent is extended or adjusted under 35
U.S.C. 154(b) by 1002 days.

This patent is subject to a terminal dis-
claimer.

(21) Appl. No.: 16/970,109

(22) PCT Filed: Feb. 14, 2019

(86) PCT No.: PCT/US2019/018083

§ 371 (c)(1),
(2) Date: Aug. 14, 2020

(87) PCT Pub. No.: WO2019/161111

PCT Pub. Date: Aug. 22, 2019

(65) Prior Publication Data

US 2021/0016214 A1    Jan. 21, 2021

Related U.S. Application Data

(60) Provisional application No. 62/631,384, filed on Feb.
15, 2018.

(51) Int. Cl.
*B01D 17/04*    (2006.01)
*B01D 29/01*    (2006.01)
(Continued)

(52) U.S. Cl.
CPC ........... *B01D 39/18* (2013.01); *B01D 17/045*
(2013.01); *B01D 29/016* (2013.01);
(Continued)

(58) Field of Classification Search
CPC ................ B01D 39/18; B01D 39/1623; B01D
39/2068; B01D 17/045; B01D 29/016;
(Continued)

(56) References Cited

U.S. PATENT DOCUMENTS 2,933,154 A    4/1960   Herbert
3,228,527 A    1/1966   Mcpherson
(Continued)

FOREIGN PATENT DOCUMENTS

AU    8011898    1/1999
AU    2019222772 A1    8/2020
(Continued)

OTHER PUBLICATIONS

Gotoh, K., et al., "Wettability characteristics of poly(ethylene
terephthalate) films treated by atmospheric pressure plasma and
ultraviolet excimer light", Polymer Journal, 43, pp. 543-551. (Year:
2011).*

(Continued)

*Primary Examiner* — Kara M Peo
(74) *Attorney, Agent, or Firm* — Mueting Raasch Group

(57) ABSTRACT

The current technology relates to various filter elements
configurations where a substrate layer defines a surface
having a treatment. The treatment increases a roll off angle
of the surface for a 50 water droplet when the surface is
immersed in toluene. The filter element can have a housing (Continued)

and the substrate disposed in the housing. In some embodiments the substrate layer defines a plurality of pleats extending between pleat folds that form flow faces of the media. In some embodiments the substrate is incorporated into single facer media of a filter element. In some embodiments the substrate layer is incorporated in a filter element having a flow-by configuration. In some embodiments the substrate layer is incorporated in a filter element having a cross-flow configuration. Some embodiments relate to a vent. Some embodiments relate to a barrier assembly and/or a fuel filter element. Various other filter elements are described.

19 Claims, 33 Drawing Sheets

(72)  Inventors: Timothy O. Winters, Nowthen, MN (US); Wijadi Jodi, Burnsville, MN (US); Davis B. Moravec, Burnsville, MN (US); Stephen K. Sontag, Maple Grove, MN (US); Bradly G. Hauser, Minneapolis, MN (US); Matthew P. Goertz, Bloomington, MN (US); Derek O. Jones, Andover, MN (US); Yehya A. Elsayed, Dearborn, MI (US); Stuti S. Rajgarhia, Bloomington, MN (US); Charles S. Christ, Deephaven, MN (US); Joseph M. Block, Carver, MN (US)

(51)  Int. Cl.

| | |
|---|---|
| *B01D 35/00* | (2006.01) |
| *B01D 39/16* | (2006.01) |
| *B01D 39/18* | (2006.01) |
| *B01D 39/20* | (2006.01) |
| *B01D 46/00* | (2022.01) |
| *B01D 46/52* | (2006.01) |

(52)  U.S. Cl.
CPC ........ *B01D 35/005* (2013.01); *B01D 39/1623* (2013.01); *B01D 39/2068* (2013.01); *B01D 46/0005* (2013.01); *B01D 46/0031* (2013.01); *B01D 46/005* (2013.01); *B01D 46/523* (2013.01); *B01D 46/526* (2013.01); *B01D 46/527* (2013.01); *B01D 2201/127* (2013.01); *B01D 2239/0421* (2013.01); *B01D 2239/0478* (2013.01); *B01D 2239/0627* (2013.01); *B01D 2239/065* (2013.01); *B01D 2239/0695* (2013.01); *B01D 2239/1208* (2013.01); *B01D 2239/1216* (2013.01); *B01D 2265/04* (2013.01)

(58)  Field of Classification Search
CPC ............. B01D 35/005; B01D 46/0005; B01D 46/0031; B01D 46/005; B01D 46/523; B01D 46/526; B01D 46/527; B01D 2201/127; B01D 2239/0421; B01D 2239/0478; B01D 2239/0627; B01D 2239/065; B01D 2239/0695; B01D 2239/1208; B01D 2265/04
See application file for complete search history.

(56)  References Cited

U.S. PATENT DOCUMENTS

| | | | |
|---|---|---|---|
| 3,231,091 | A | 1/1966 | Kingsbury et al. |
| 4,908,236 | A | 3/1990 | Pitt et al. |
| 5,137,633 | A | 8/1992 | Wang |
| 5,269,925 | A | 12/1993 | Broadhurst |
| 5,437,900 | A | 8/1995 | Kuzowski |
| 5,443,724 | A | 8/1995 | Williamson et al. |
| 5,935,525 | A | 8/1999 | Lincoln et al. |
| 5,997,739 | A | 12/1999 | Clausen et al. |
| 6,422,396 | B1 | 7/2002 | Li et al. |
| 6,569,330 | B1 | 5/2003 | Sprenger et al. |
| 7,115,150 | B2 | 10/2006 | Johnson et al. |
| 7,147,110 | B2 | 12/2006 | Clausen et al. |
| 7,527,739 | B2 | 5/2009 | Jiang et al. |
| 7,628,917 | B2 | 12/2009 | Penezina et al. |
| 7,635,435 | B2 | 12/2009 | Benachenhou |
| 7,824,550 | B2 | 11/2010 | Abreu et al. |
| 7,846,242 | B2 | 12/2010 | Paling et al. |
| 8,017,011 | B2 | 9/2011 | Ellis et al. |
| 8,114,291 | B2 | 2/2012 | Ellis et al. |
| 8,356,717 | B2 | 1/2013 | Waller, Jr. et al. |
| 8,360,251 | B2 | 1/2013 | Wieczorek et al. |
| 8,545,589 | B2 | 10/2013 | Rocklitz et al. |
| 8,590,712 | B2 | 11/2013 | Wieczorek et al. |
| 9,186,602 | B2 | 11/2015 | Rathod et al. |
| 9,822,621 | B2 | 11/2017 | Lant et al. |
| 9,822,861 | B2 | 11/2017 | Avins |
| 9,823,174 | B2 | 11/2017 | Kota et al. |
| 9,862,622 | B2 | 1/2018 | Hwang et al. |
| 10,023,751 | B2 | 7/2018 | Hu et al. |
| 10,315,140 | B2 | 6/2019 | Hauser et al. |
| 10,414,847 | B2 | 9/2019 | Takahara et al. |
| 10,441,909 | B2 | 10/2019 | Sahbaee et al. |
| 10,882,085 | B2 | 1/2021 | Smith et al. |
| 11,207,623 | B2 | 12/2021 | Hauser et al. |
| 11,806,650 | B2 | 11/2023 | Hauser et al. |
| 12,017,161 | B2 | 6/2024 | Rahmathullah et al. |
| 2002/0102894 | A1 | 8/2002 | Hansen |
| 2003/0010002 | A1 | 1/2003 | Johnson et al. |
| 2004/0175957 | A1 | 9/2004 | Lukas et al. |
| 2006/0207234 | A1 | 9/2006 | Ward et al. |
| 2006/0242933 | A1 | 11/2006 | Webb et al. |
| 2006/0252848 | A1 | 11/2006 | Guillaume |
| 2007/0084776 | A1 | 4/2007 | Sasur |
| 2007/0166479 | A1 | 7/2007 | Drake et al. |
| 2008/0029623 | A1 | 2/2008 | Sugiyama et al. |
| 2008/0135200 | A1 | 6/2008 | Harwood |
| 2009/0127211 | A1 | 5/2009 | Rocklitz et al. |
| 2010/0050871 | A1 | 3/2010 | Moy et al. |
| 2011/0198280 | A1 | 8/2011 | Jones et al. |
| 2012/0107851 | A1 | 5/2012 | Killard et al. |
| 2012/0168359 | A1 | 7/2012 | Marshall et al. |
| 2013/0029048 | A1 | 1/2013 | Goscha et al. |
| 2013/0032316 | A1 | 2/2013 | Dhiman et al. |
| 2013/0109262 | A1 | 5/2013 | Zhou |
| 2013/0180920 | A1 | 7/2013 | Sivaniah et al. |
| 2013/0239828 | A1 | 9/2013 | Chen et al. |
| 2013/0248436 | A1 | 9/2013 | Hacker et al. |
| 2013/0309509 | A1 | 11/2013 | Shibuya et al. |
| 2013/0334130 | A1 | 12/2013 | Ganguli et al. |
| 2013/0341290 | A1 | 12/2013 | Yu et al. |
| 2014/0069862 | A1 | 3/2014 | Guo et al. |
| 2014/0178611 | A1 | 6/2014 | Smith et al. |
| 2014/0197090 | A1 | 7/2014 | Popoff et al. |
| 2014/0208703 | A1 | 7/2014 | Willems et al. |
| 2014/0275692 | A1 | 9/2014 | Patel et al. |
| 2014/0284263 | A1 | 9/2014 | Duerr et al. |
| 2014/0284264 | A1 | 9/2014 | Klein et al. |
| 2014/0314975 | A1 | 10/2014 | Smith et al. |
| 2015/0290561 | A1 | 10/2015 | Barsness et al. |
| 2015/0308393 | A1 | 10/2015 | Boiger et al. |
| 2015/0328565 | A1 | 11/2015 | Swaminathan et al. |
| 2015/0375429 | A1 | 12/2015 | Butt et al. |
| 2016/0047062 | A1 | 2/2016 | Greenawalt |
| 2016/0059167 | A1 | 3/2016 | Nagy et al. |
| 2016/0081541 | A1 | 3/2016 | Yasue |
| 2016/0340506 | A1 | 11/2016 | Agarwal et al. |
| 2017/0000223 | A1 | 1/2017 | Kim |
| 2017/0022372 | A1 | 1/2017 | Lynn et al. |
| 2017/0028358 | A1 | 2/2017 | Singh et al. |
| 2017/0326486 | A1 | 11/2017 | Chu et al. |
| 2018/0050293 | A1 | 2/2018 | Hauser et al. |
| 2018/0117797 | A1 | 5/2018 | Shin et al. |

(56) References Cited

U.S. PATENT DOCUMENTS

| | | | |
|---|---|---|---|
| 2018/0147604 A1 | 5/2018 | Dai et al. |
| 2018/0169551 A1 | 6/2018 | Jaganathan et al. |
| 2019/0314745 A1 | 10/2019 | Hauser et al. |
| 2021/0016214 A1 | 1/2021 | Rahmathullah et al. |
| 2021/0060456 A1 | 3/2021 | Rahmathullah et al. |
| 2021/0106935 A1 | 4/2021 | Rahmathullah et al. |
| 2021/0354059 A1 | 11/2021 | Goertz et al. |
| 2022/0152536 A1 | 5/2022 | Hauser et al. |
| 2024/0017365 A1 | 1/2024 | Nakajuma et al. |

FOREIGN PATENT DOCUMENTS

| | | |
|---|---|---|
| CA | 3089266 A1 | 8/2019 |
| CN | 1812071 | 8/2006 |
| CN | 101621001 | 1/2010 |
| CN | 101748604 | 6/2010 |
| CN | 102277060 | 12/2011 |
| CN | 102350182 | 2/2012 |
| CN | 102649029 | 8/2012 |
| CN | 102665844 | 9/2012 |
| CN | 103108689 | 5/2013 |
| CN | 103357196 | 10/2013 |
| CN | 104394955 | 3/2015 |
| CN | 104805420 | 7/2015 |
| CN | 104857742 | 8/2015 |
| CN | 105131318 | 12/2015 |
| CN | 105153403 | 12/2015 |
| CN | 105188967 | 12/2015 |
| CN | 105536383 | 5/2016 |
| CN | 105555907 | 5/2016 |
| CN | 105749770 | 7/2016 |
| CN | 106413836 | 2/2017 |
| CN | 106443840 | 2/2017 |
| CN | 106687190 | 5/2017 |
| CN | 106752234 | 5/2017 |
| CN | 112135679 A | 12/2020 |
| EP | 1740287 | 1/2007 |
| EP | 2 668 995 | 12/2013 |
| EP | 2 692 748 | 2/2014 |
| GB | 752029 | 7/1956 |
| GB | 1064065 | 4/1967 |
| GB | 1107607 | 3/1968 |
| JP | S62-049923 | 3/1987 |
| JP | H04-041770 | 2/1992 |
| JP | H04146262 A | 5/1992 |
| JP | H05-177129 | 7/1993 |
| JP | H07-500122 | 1/1995 |
| JP | H0718566 A | 1/1995 |
| JP | H0723032 B2 | 3/1995 |
| JP | H08-120559 | 5/1996 |
| JP | H09105094 A | 4/1997 |
| JP | H09-155167 | 6/1997 |
| JP | 2003-284914 | 10/2003 |
| JP | 2004100110 | 4/2004 |
| JP | 2005-510608 | 4/2005 |
| JP | 2005-329407 | 12/2005 |
| JP | 2005-537129 | 12/2005 |
| JP | 2006152450 A | 6/2006 |
| JP | 2007-181818 | 7/2007 |
| JP | 2011-511705 | 4/2011 |
| JP | 2014-198294 | 10/2014 |
| JP | 2015-014214 | 1/2015 |
| JP | 2015-039685 | 3/2015 |
| JP | 2015-081521 | 4/2015 |
| JP | 2017-077553 | 4/2017 |
| JP | 2019-526432 | 9/2019 |
| JP | 2021-513910 A1 | 6/2021 |
| JP | 7053569 B2 | 4/2022 |
| KR | 10-2013-0106673 | 9/2013 |
| KR | 20200119307 A | 10/2020 |
| RU | 2 281 146 | 8/2006 |
| RU | 2 284 214 | 9/2006 |
| RU | 2 539 342 | 1/2015 |
| WO | 96/37290 | 11/1996 |
| WO | 98/58990 | 12/1998 |
| WO | 99/16964 A1 | 4/1999 |
| WO | 2007/041559 | 4/2007 |
| WO | 2009/100067 | 8/2009 |
| WO | 2011/042605 | 4/2011 |
| WO | 2011/091432 | 7/2011 |
| WO | 2011/127479 | 10/2011 |
| WO | 2012/099125 | 7/2012 |
| WO | 2013/155427 | 10/2013 |
| WO | 2014/097309 | 6/2014 |
| WO | 2014/144536 | 9/2014 |
| WO | 2015/175877 | 11/2015 |
| WO | 2016/044620 | 3/2016 |
| WO | 2016/081541 | 5/2016 |
| WO | 2016/142131 | 9/2016 |
| WO | 2015/170724 | 4/2017 |
| WO | 2018/035235 | 2/2018 |
| WO | 2019/032773 | 2/2019 |
| WO | 2019/040324 | 2/2019 |
| WO | 2019/161108 | 8/2019 |
| WO | 2019/161110 | 8/2019 |
| WO | 2019/161111 | 8/2019 |

OTHER PUBLICATIONS

Gotoh, K., "Wettability and surface free energies of polymeric materials exposed to excimer ultraviolet light and particle deposition onto their surfaces in water", Polymer Surface Modification: Relevance to Adhesion, vol. 3, pp. 125-137. Ed. K.L. Mittal. (Year: 2004).*

ASTM-D6751-15C, "Standard Specification for Biodiesel Fuel Blend Stock (B100) for Middle Distillate Fuels", ASTM International, West Conshohocken, Pennsylvania, Jan. 2016, 11 pages.

ASTM-D975-17A, "Standard Specification for Diesel Fuel Oils", ASTM International, West Conshohocken, Pennsylvania, Jan. 2018, 28 pages.

Chunglok, "Extreme Wetting-Resistant Multiscale Nano-/ Microstructured Surfaces for Viscoelastic Liquid Repellence," Journal of Nanomaterials, 2016, vol. 2016, Article ID 9510156, 13 pages.

Feng, et al., "Petal Effect: A Superhydrophobic State with High Adhesive Force", Langmuir, 2008, 24(8):4114-4119. Published online Mar. 1, 2008.

International Patent Application No. PCT/US2017/047162, filed Aug. 16, 2017, International Preliminary Report on Patentability, issued Feb. 19, 2019, 7 pages.

International Patent Application No. PCT/US2017/047162, filed Aug. 16, 2017; International Search Report and Written Opinion issued Nov. 27, 2017, 13 pages.

International Patent Application No. PCT/US2019/018080, filed Feb. 14, 2019, International Preliminary Report on Patentability issued Aug. 18, 2020, 11 pages.

International Patent Application No. PCT/US2019/018080, filed Feb. 14, 2019, International Search Report and Written Opinion, mailed Jul. 15, 2019, 17 pages.

International Patent Application No. PCT/US2019/018080, filed Feb. 14, 2019, Invitation to Pay Additional Fees and Partial Search Report, mailed May 13, 2019, 12 pages.

International Patent Application No. PCT/US2019/018082, filed Feb. 14, 2019, International Preliminary Report on Patentability issued Aug. 18, 2020, 12 pages.

International Patent Application No. PCT/US2019/018082, filed Feb. 14, 2019, International Search Report and Written Opinion, mailed Jul. 15, 2019, 18 pages.

International Patent Application No. PCT/US2019/018082, filed Feb. 14, 2019, Invitation to Pay Additional Fees and Partial Search Report, mailed May 6, 2019, 13 pages.

International Patent Application No. PCT/US2019/018083, filed Feb. 14, 2019 , International Search Report and Written Opinion, mailed Jul. 15, 2019, 19 pages.

International Patent Application No. PCT/US2019/018083, filed Feb. 14, 2019, International Preliminary Report on Patentability issued Aug. 18, 2020, 12 pages.

(56)            References Cited

OTHER PUBLICATIONS

International Patent Application No. PCT/US2019/018083, filed Feb. 14, 2019, Invitation to Pay Additional Fees and Partial Search Report, mailed May 13, 2019, 14 pages.

ISO/TS 16332 Technical Specification, "Diesel engines—Fuel filters—Method for evaluation fuel/water separation efficiency, First Edition," ISO, Geneva, Switzerland, Sep. 15, 2006, 32 pages.

Miwa, et al., "Effects of the Surface Roughness on Sliding Angles of Water Droplets on Superhydrophobic Surfaces", Langmuir, 2000, 16(13):5754-5760. Published online May 27, 2000.

U.S. Appl. No. 62/543,456, filed Aug. 10, 2017, entitled "Fluid Filtration Apparatuses, Systems, and Methods". (No copy provided).

Wolfram, et al., Chapter 10, "Wetting, Spreading, and Contact Angle," in Wetting, Spreading, and Adhesion, Padday, J. F., ed.; Academic Press: London, 1978, 237-238.

Baiburdov et al., "Polymeric sorbents for collecting oil products from the surface of water reservoirs", Review of Russian-language literature for 2000-2017, Part 3, 2018, 18(3):285-298. With English abstract and partial machine translation. Also see Russian Patent Application No. 2020127540 First Office Action for statement of relevance.

Galko et al., "Innovations in the system of oil products removal from wastewater", 2015, Izvestiya TulGU, Technical Sciences, 7(2):64-72. With English Abstract and partial machine translation. Also see Russian Patent Application No. 2020130220 First Office Action for statement of relevance.

Patel, "Separation of Emulsified Water from Ultra Low Sulfur Diesel", Dissertation, Aug. 2013, The University of Akron, Akron Ohio, 177 pages. Obtained from the internet on May 3, 2023. Available online at https://etd.ohiolink.edu/apexprod/rws_etd/send_file/send?accession=akron1373375865&disposition=inline.

Russian Patent Application No. 2020127540, filed Feb. 14, 2019, First Office Action and Search Report issued Jun. 30, 2022. English translation for Office Action provided. 13 Pages.

Russian Patent Application No. 2020130220, filed Feb. 14, 2019, First Office Action and Search Report issued Jul. 19, 2022. English translation for Office Action provided. 23 Pages.

Veprikova et al., "Specifics of oil products removal from water using oil sorbents, filter materials, and active carbons", 2010, Journal of the Siberian Federal University, Chemistry 3:285-304. With partial machine translation. Also see Russian Patent Application No. 2020130220 First Office Action for statement of relevance.

Chinese Patent Application No. 201980013170.4, filed Feb. 14, 2019, Second Office Action and Search Report Issued Jul. 1, 2022, 30 pages. English translation provided.

Mo, et al., "Liquid Resin Light-curing Additive Manufacturing Technology", Jun. 30, 2013, Huazhong University of Science and Technology Press, Wuhan, China. Title page, publishing information page, and pp. 52-56, with English translation. (Previously cited using related CN Office Action for relevance.).

Zhang, et al., "Carrier Driven Gyroscope", Nov. 20, 2015, National Defense Industry Press, pp. 253-254. No translation provided, see translation of Second Office Action and Search Report of Chinese Patent Application No. 201980013170.4 for relevance.

Zhang, et al., "Introduction to Mechanical Engineering", Sep. 30, 2011, Huazhong University of Science and Technology Press, Wuhan, China. Title page, publishing information page, and pp. 228-229, with English translation.

Ma et al., "Controlling biofouling of reverse osmosis membranes through surface modification via grafting patterned polymer brushes", Sep. 1, 2015, Journal of Water Reuse and Desalination, 5(3):326-334.

Wang, et al., "Hydrophilically patterned superhydrophobic cotton fabrics and their use in ink printing", 2014, J. Mater. Chem. A, 2:8094-8102.

Chinese Patent Application No. 201980013170.4, filed Feb. 14, 2019, First Office Action and Search Report issued Nov. 19, 2021, 32 pages. English translation provided.

Mo, et al., "Liquid Resin Light-curing Additive Manufacturing Technology", Jun. 30, 2013, Huazhong University of Science and Technology Press, pp. 52-56. No translation provided, see translation of First Office Action and Search Report of Chinese Patent Application No. 201980013170.4 for relevance.

* cited by examiner

FILTER ELEMENT CONFIGURATIONS

CONTINUING APPLICATION DATA

This application is the §371 U.S. National Stage of International Application No. PCT/US2019/018083, filed Feb. 14, 2019, which claims the benefit of U.S. Provisional Application Ser. No. 62/631,384, filed Feb. 15, 2018, the disclosures of which are incorporated by reference herein in their entireties.

FIELD OF THE TECHNOLOGY

The technology disclosed herein relates to substrate. More particularly, the technology disclosed herein relates to filter element configurations.

BACKGROUND

Filtration of hydrocarbon fluids including diesel fuels for use in internal combustion engines is often essential to proper engine performance. Water and particle removal can be necessary to provide favorable engine performance as well as to protect engine components from damage. Free water (that is, non-dissolved water), which exists as a separate phase in the hydrocarbon fluid, can, if not removed, cause problems including damage to engine components through cavitation, corrosion, or promotion of microbiological growth.

SUMMARY

Some embodiments of the technology disclosed herein relates to a filter element having a substrate layer defining a first surface having a treatment. The treatment increases a roll off angle of the first surface for a 50 μL water droplet when the first surface is immersed in toluene. The substrate layer defines a plurality of pleats extending between a first set of pleat folds and a second set of pleat folds, where the first set of pleat folds defines a first face and the second set of pleat folds defines a second face.

In some such embodiments, the roll off angle of the first surface is in a range of 50 degrees to 90 degrees and the first surface has a contact angle in a range of 90 degrees to 180 degrees for a 50 μL water droplet when the first surface is immersed in toluene. Additionally or alternatively, the first face is opposite the second face relative to the filter element. Additionally or alternatively, a distance between each adjacent pleat fold in the first set of pleat folds is greater than a distance between each adjacent pleat fold in the second set of pleat folds. Additionally or alternatively, the filter element has pleat spacers disposed between each pleat fold in the first set of pleat folds. Additionally or alternatively, the first face defines a curved plane. Additionally or alternatively, the substrate layer defines a plurality of flutes extending between the first set of pleat folds and the second set of pleat folds. Additionally or alternatively, a portion of the plurality of flutes are tapered.

Additionally or alternatively, the substrate layer defines a second surface opposite the first surface, where the second surface has a roll off angle in a range of 50 degrees to 90 degrees and a contact angle in a range of 90 degrees to 180 degrees for a 50 μL water droplet when the second surface is immersed in toluene. Additionally or alternatively, the first face defines an outer cylindrical surface and the second face defines an inner cylindrical surface. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 μm to 50 μm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous. Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly (hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

Some embodiments relate to a filter element having a substrate layer defining a first surface having a treatment that increases the roll off angle for a 50 μL water droplet when the first surface is immersed in toluene. The substrate layer has a first edge defining a first flow face and a second edge defining a second flow face. A flow-defining layer is adjacent to the substrate layer, where the flow-defining layer has a third edge defining the first flow face and a fourth edge defining the second flow face. The flow-defining layer defines a fluid flow path from the first flow face to the second flow face, where the fluid flow path extends from the third edge to the fourth edge and the fluid flow path is adjacent to the first surface.

In some such embodiments, the roll off angle of the first surface is in a range of 50 degrees to 90 degrees and the first surface has a contact angle in a range of 90 degrees to 180 degrees for a 50 μL water droplet when the first surface is immersed in toluene. Additionally or alternatively, the filter element has a plurality of alternating substrate layers and flow defining layers in a stacked relationship. Additionally or alternatively, the first flow face is opposite the second flow face. Additionally or alternatively, one of the first flow face and the second flow face defines an outer cylindrical surface and the other one of the first flow face and the second flow face defines an inner cylindrical surface.

Additionally or alternatively, the substrate layer and the flow-defining layer each have an elongate sheet in a coiled configuration. Additionally or alternatively, the flow-defining layer has a mesh material. Additionally or alternatively, the substrate layer and the flow-defining layer are planar. Additionally or alternatively, the first flow face is parallel to the second flow face. Additionally or alternatively, the substrate layer is a first substrate layer and the filter element has a second substrate layer, and the flow-defining layer is positioned between the first substrate layer and the second substrate layer. Additionally or alternatively, the substrate layer defines a second surface opposite the first surface, where the second surface has a roll off angle in a range of 50 degrees to 90 degrees and a contact angle in a range of 90 degrees to 180 degrees for a 50 μL water droplet when the second surface is immersed in toluene.

Additionally or alternatively, one of the substrate layer and the flow-defining layer defines flutes extending from the first flow face to the second flow face. Additionally or alternatively, the other of the substrate layer and the flow-defining layer is substantially planar. Additionally or alternatively, the other of the substrate layer and the flow-defining layer defines flutes extending from the first flow face to the second flow face. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 μm to 50 μm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous.

Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly(hydroxypropyl methacrylate) (PHPM), poly(2-hydroxy-ethyl methacrylate) (PHEM), poly(2-ethyl-2-oxazoline)

(P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

Some embodiments relate to a filter element having a substrate layer having a first edge defining a first flow face and a second edge defining a second flow face. A flow-defining layer is adjacent to the substrate layer, where the flow-defining layer has a first surface having a treatment that increases the roll off angle for a 50 μL water droplet when the first surface is immersed in toluene, and where the flow-defining layer has a third edge defining the first flow face and a fourth edge defining the second flow face, where the flow-defining layer defines a fluid flow path from the first flow face to the second flow face and where the fluid flow path extends from the third edge to the fourth edge and the fluid flow path is adjacent to the first surface.

Additionally or alternatively, the substrate layer is a contaminant retention layer. Additionally or alternatively, the roll off angle of the first surface is in a range of 50 degrees to 90 degrees, and the first surface has a contact angle in a range of 90 degrees to 180 degrees for a 50 μL water droplet when the first surface is immersed in toluene. Additionally or alternatively, the filter element has a plurality of alternating substrate layers and flow defining layers in a stacked relationship. Additionally or alternatively, the first flow face is opposite the second flow face. Additionally or alternatively, one of the first flow face and the second flow face defines an outer cylindrical surface and the other one of the first flow face and the second flow face defines an inner cylindrical surface. Additionally or alternatively, the substrate layer and the flow-defining layer each have an elongate sheet in a coiled configuration. Additionally or alternatively, the flow-defining layer has a mesh material. Additionally or alternatively, the substrate layer and the flow-defining layer are planar.

Additionally or alternatively, the first flow face is parallel to the second flow face. Additionally or alternatively, the substrate layer is a first substrate layer and the filter element has a second substrate layer, and the flow-defining layer is positioned between the first substrate layer and the second substrate layer. Additionally or alternatively, the flow-defining layer defines a second surface opposite the first surface, where the second surface has a roll off angle in a range of 50 degrees to 90 degrees and a contact angle in a range of 90 degrees to 180 degrees for a 50 μL water droplet when the second surface is immersed in toluene. Additionally or alternatively, one of the substrate layer and the flow-defining layer defines flutes extending from the first flow face to the second flow face. Additionally or alternatively, the other of the substrate layer and the flow-defining layer is substantially planar.

Additionally or alternatively, the other of the substrate layer and the flow-defining layer defines flutes extending from the first flow face to the second flow face. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the flow-defining layer has at least one of an aromatic component and an unsaturated component. Additionally or alternatively, the flow-defining layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the flow-defining layer has a modifying resin. Additionally or alternatively, the flow-defining layer has pores having an average diameter of up to 2 mm. Additionally or alternatively, the flow-defining layer has pores having an average diameter in a range of 40 µm to 50 µm. Additionally or alternatively, the flow-defining layer is at least 15% porous and up to 99% porous. Additionally or alternatively, the flow-defining layer has at least one of an aromatic component and an unsaturated component, where the surface has a UV-treated surface, where the substrate has pores having an average diameter of up to 2 mm, and where the substrate is at least 15% porous and up to 99% porous.

Additionally or alternatively, the first surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the flow-defining layer has cellulose, polyester, polyamide, polyolefin, glass, or a combination thereof. Additionally or alternatively, the flow-defining layer has a phenolic resin.

Some embodiments relate to a barrier vent assembly having a substrate layer with a first surface. The first surface has a treatment that increases the roll off angle for a 50 µL water droplet when the first surface is immersed in toluene. The substrate layer defines a perimeter region and a central region that is central to the perimeter region. The perimeter region is configured to couple to a housing about an opening defined by the housing.

In some such embodiments, the roll off angle of the first surface is in a range of 50 degrees to 90 degrees and the first surface has a contact angle in a range of 90 degrees to 180 degrees for a 50 µL water droplet when the first surface is immersed in toluene. Additionally or alternatively, the vent has an adhesive is disposed in the perimeter region. Additionally or alternatively, a frame is coupled to the perimeter region, and the frame is configured to be coupled to the housing. Additionally or alternatively, the substrate layer has a second surface having a roll off angle in a range of 50 degrees to 90 degrees and a contact angle in a range of 90 degrees to 180 degrees for a 50 µL water droplet when the first surface is immersed in toluene.

Additionally or alternatively, the adhesive is disposed on the second surface. Additionally or alternatively, the adhesive is disposed on the first surface. Additionally or alternatively, the first surface is configured to face outside the housing. Additionally or alternatively, the housing is a fuel tank housing. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 µm to 50 µm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous. Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

Some embodiments of the current technology relate to a fuel filtration system having a filter element and a barrier assembly. The filter element is configured to coalesce water in a fuel stream, and the barrier assembly is in fluid communication with the filter element. The barrier assembly is positioned downstream of the filter element and defines an upstream surface, where the upstream surface has a treatment that increases a roll off angle for a 50 µL water droplet when the upstream surface is immersed in toluene.

In some such embodiments, the upstream surface of the barrier assembly is configured to be positioned non-perpendicularly to the direction of fluid flow. Additionally or alternatively, the roll-off angle of the upstream surface is in a range of 50 degrees to 90 degrees and the upstream surface has a contact angle of in a range of 90 degrees to 180 degrees for a 50 µL water droplet when the upstream surface is immersed in toluene. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 µm to 50 µm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous.

Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly (hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

Some embodiments of the current technology relate to a filter element having a housing and a first substrate layer disposed in the housing. The first substrate layer defines a first surface and a second surface, where the first surface has a treatment that increases a roll-off angle for a 50 µL water droplet when the first surface is immersed in toluene. The first substrate layer is in a spiral configuration.

In some such embodiments, the roll-off angle of the first surface is in a range of 50 degrees to 90 degrees and the first surface has a contact angle in a range of 90 degrees to 180 degrees for a 50 µL water droplet when the first surface is immersed in toluene. Additionally or alternatively, the housing defines housing drainage channels configured to direct fluid flow outside of the housing. Additionally or alternatively, the filter media defines substrate drainage channels within the spiraled configuration. Additionally or alternatively, the first substrate layer defines an outer cylindrical surface and a central cylindrical opening. Additionally or alternatively, the second surface has a roll off angle in a range of 50 degrees to 90 degrees and a contact angle in a range of 90 degrees to 180 degrees for a 50 µL water droplet when the first surface is immersed in toluene.

Additionally or alternatively, the first surface defines the central cylindrical opening. Additionally or alternatively, the second surface defines the central cylindrical opening. Additionally or alternatively, the filter element has a second substrate layer disposed in the housing, where the second substrate layer abuts the first substrate layer. Additionally or alternatively, the second substrate layer has a third surface and a fourth surface, where each of the third surface and the fourth surface has a roll off angle and a contact angle for a 50 µL water droplet when the first surface is immersed in toluene that is different than the roll off angle and the contact angle of the first surface of the first substrate layer. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 µm to 50 µm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous. Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly (hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

Some embodiments of the current technology relate to a cross-flow filter element having a first substrate defining a tubular structure having an outer radial surface and an inner radial surface. The filter element defines an upstream side within the inner radial surface and a downstream side outside of the outer radial surface, where at least one of the outer radial surface and the inner radial surface has a treatment that increases a roll-off angle for a 50 µL water droplet when the outer radial surface is immersed in toluene.

In some such embodiments, the roll off angle of the outer radial surface is in a range of 50 degrees to 90 degrees and the outer radial surface has a contact angle in a range of 90 degrees to 180 degrees for a 50 µL water droplet when the outer radial surface is immersed in toluene. Additionally or alternatively, the inner radial surface has a roll off angle in a range of 50 degrees to 90 degrees and a contact angle in a range of 90 degrees to 180 degrees for a 50 µL water droplet when the inner radial surface is immersed in toluene. Additionally or alternatively, each of the inner radial surface and the outer radial surface has a roll off angle in a range of 50 degrees to 90 degrees and a contact angle in a range of 90 degrees to 180 degrees for a 50 µL water droplet when the respective surface is immersed in toluene.

Additionally or alternatively, the first substrate is a membrane. Additionally or alternatively, the first substrate is a ceramic. Additionally or alternatively, the first substrate is polymeric. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the first substrate has at least one of an aromatic component and an unsaturated component. Additionally or alternatively, the first substrate has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the first substrate has a modifying resin. Additionally or alternatively, the first substrate has pores having an average diameter of up to 2 mm. Additionally or alternatively, the first substrate has pores having an average diameter in a range of 40 µm to 50 µm. Additionally or alternatively, the first substrate is at least 15% porous and up to 99% porous. Additionally or alternatively, the first substrate has at least one of an aromatic component and an unsaturated component, where the surface has a UV-treated surface, where the substrate has pores having an average diameter of up to 2 mm, and where the substrate is at least 15% porous and up to 99% porous. Additionally or alternatively, the surface has a hydrophilic group-containing polymer, where the substrate has pores having an average diameter of up to 2 mm, and where the substrate is at least 15% porous and up to 99% porous. Additionally or alternatively, the first substrate is stable. Additionally or alternatively, the first surface has poly (hydroxypropyl methacrylate) (PHPM), poly(2-hydroxy-ethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the first substrate has cellulose, polyester, polyamide, polyolefin, glass, or a combination thereof. Additionally or alternatively, the first substrate has a phenolic resin.

Some embodiments of the current technology relate to a filter element having a stack of a plurality of layers of single facer media. Each layer of single facer media has a fluted sheet and a facing sheet which cumulatively define a plurality of flutes including inlet flutes and outlet flutes. Each flute of the plurality of flutes has a flute length extending from a first face of the filter element to a second face of the filter element. A first obstruction is disposed within the outlet flutes towards the first face of the filter element. A second obstruction is disposed within the inlet flutes towards the second face of the filter element so that fluid passing into the first face of the filter element and out the second face of the filter element passes through media to provide fluid filtration. At least a first surface of the single facer media has a treatment that increases a roll-off angle for a 50 µL water droplet when the surface is immersed in toluene.

In some such embodiments, the roll off angle of the first surface of the single facer media is in a range of 50 degrees to 90 degrees and the at least one surface has a contact angle in a range of 90 degrees to 180 degrees for a 50 µL water droplet when the surface is immersed in toluene. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 µm to 50 µm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous.

Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly (hydroxypropyl methacrylate) (PHPM), poly(2-hydroxy-ethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

Some embodiments relate to a filter element having filter media configured in a tubular arrangement defining an inner opening and an outer surface. A liner is concentric with the filter media and where the liner is arranged in a series with respect to fluid flow through the filter element. The liner has a treatment that increases the roll-off angle of at least a first surface for a 50 μL water droplet when the surface is immersed in toluene.

In some such embodiments, the roll off angle of the first surface is in a range of 50 degrees to 90 degrees and the first surface has a contact angle in a range of 90 degrees to 180 degrees for a 50 μL water droplet when the surface is immersed in toluene. Additionally or alternatively, the liner is disposed in the inner opening defined by the filter media. Additionally or alternatively, the liner is disposed around the outer surface of the filter media. Additionally or alternatively, the filter media is pleated. Additionally or alternatively, the filter media is wrapped. Additionally or alternatively, the first surface of the liner has an outer liner surface. Additionally or alternatively, the at least first surface of the liner has an inner liner surface. Additionally or alternatively, the roll off angle of the first surface is in a range of 60 degrees to 90 degrees, in a range of 70 degrees to 90 degrees, or in a range of 80 degrees to 90 degrees. Additionally or alternatively, the first surface has a UV-treated surface. Additionally or alternatively, the first surface has a UV-oxygen-treated surface. Additionally or alternatively, the substrate layer has at least one of an aromatic component and an unsaturated component. Additionally or alternatively, the substrate layer has a UV-reactive resin.

Additionally or alternatively, the first surface has a hydrophilic group-containing polymer. Additionally or alternatively, the hydrophilic group-containing polymer has a hydrophilic pendant group. Additionally or alternatively, the hydrophilic group-containing polymer does not have a fluoropolymer. Additionally or alternatively, the hydrophilic group-containing polymer has a hydrophilic polymer. Additionally or alternatively, the hydrophilic group-containing polymer has a charged polymer. Additionally or alternatively, the hydrophilic group-containing polymer has a hydroxylated methacrylate polymer.

Additionally or alternatively, the substrate layer has a modifying resin. Additionally or alternatively, the substrate layer has pores having an average diameter of up to 2 mm. Additionally or alternatively, the substrate layer has pores having an average diameter in a range of 40 μm to 50 μm. Additionally or alternatively, the substrate layer is at least 15% porous and up to 99% porous. Additionally or alternatively, the substrate layer has at least one of an aromatic component and an unsaturated component, where the surface has a UV-treated surface, where the substrate has pores having an average diameter of up to 2 mm, and where the substrate is at least 15% porous and up to 99% porous.

Additionally or alternatively, the surface has a hydrophilic group-containing polymer, where the substrate has pores having an average diameter of up to 2 mm, and where the substrate is at least 15% porous and up to 99% porous. Additionally or alternatively, the substrate layer is stable. Additionally or alternatively, the first surface has poly (hydroxypropyl methacrylate) (PHPM), poly(2-hydroxy-ethyl methacrylate) (PHEM), poly(2-ethyl-2-oxazoline) (P2E2O), polyethyleneimine (PEI), quaternized polyethyleneimine, poly(dopamine), or combinations thereof. Additionally or alternatively, the substrate layer has cellulose, polyester, polyamide, polyolefin, glass, or a combination thereof. Additionally or alternatively, the substrate layer has a phenolic resin.

As used herein, the term "hydrophilic" refers to the ability of a molecule or other molecular entity to dissolve in water, and the term "hydrophile" refers to a molecule or other molecular entity which is hydrophilic and/or that is attracted to, and tends to be miscible with or soluble in water. In some embodiments, "hydrophilic" means that, to the extent saturation has not been reached, at least 90% of the molecules or other molecular entities, preferably at least 95% of the molecules or other molecular entities, more preferably at least 97% of the molecules or other molecular entities, and most preferably at least 99% of the molecules or other molecular entities dissolve in water at 25 degrees Celsius (° C.). In some embodiments, "hydrophile" means that, to the extent saturation has not been reached, at least 90% of the molecules or other molecular entities, preferably at least 95% of the molecules or other molecular entities, more preferably at least 97% of the molecules or other molecular entities, and most preferably at least 99% of the molecules or other molecular entities are miscible with or soluble in water at 25° C.

A "hydrophilic surface" refers to a surface on which a water droplet has a contact angle of less than 90 degrees. In some embodiments, the surface is preferably immersed in toluene.

A "hydrophobic surface" refers to a surface on which a water droplet has a contact angle of at least 90 degrees. In some embodiments, the surface is preferably immersed in toluene.

A substrate or a surface that is "stable" or has "stability" refers to a substrate or surface having the ability to retain a roll off angle of at least 80 percent (%), preferably at least 85%, more preferably at least 90%, or even preferably at least 95% of an initial roll off angle after being submersed in a hydrocarbon fluid at a temperature of at least 50° C. for at least 1 hour, at least 12 hours, or at least 24 hours, and up to 10 days, up to 30 days, or up to 90 days. In some embodiments, the "initial roll off angle" of the surface or the substrate is the roll off angle of a surface substrate that has been submersed in a hydrocarbon fluid for less than an hour, or more preferably less than 20 minutes.

A "polar functional group" refers to a functional group having a net dipole as a result of the presence of electronegative atoms (for example, nitrogen, oxygen, chlorine, fluorine, etc.).

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

The term "consisting of" means including, and limited to, whatever follows the phrase "consisting of." That is, "consisting of" indicates that the listed elements are required or mandatory, and that no other elements may be present.

The term "consisting essentially of" indicates that any elements listed after the phrase are included, and that other elements than those listed may be included provided that those elements do not interfere with or contribute to the activity or action specified in the disclosure for the listed elements.

Unless otherwise specified, "a," "an," "the," and "at least one" are used interchangeably and mean one or more than one.

Also herein, the recitations of numerical ranges by endpoints include all numbers subsumed within that range (for example, 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The current technology may be more completely understood and appreciated in consideration of the following detailed description of various embodiments of the current technology with the accompanying drawings.

Figure 12:
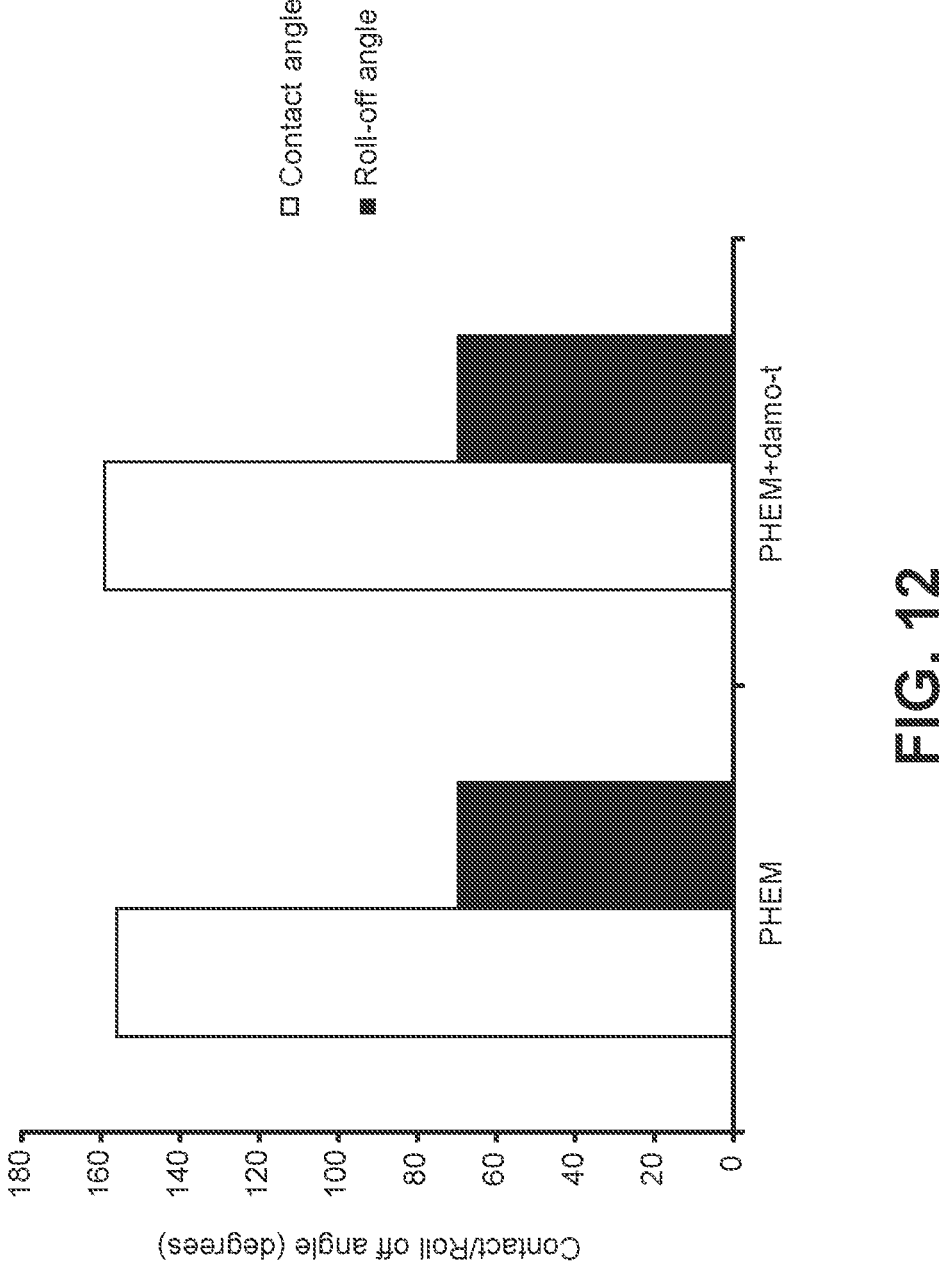

FIG. 12 shows the contact angle and the roll off angle of a 50 µL water droplet on an exemplary PHEM nanofiber-coated Substrate 6 with and without crosslinker DAMO-T.

Figure 13:
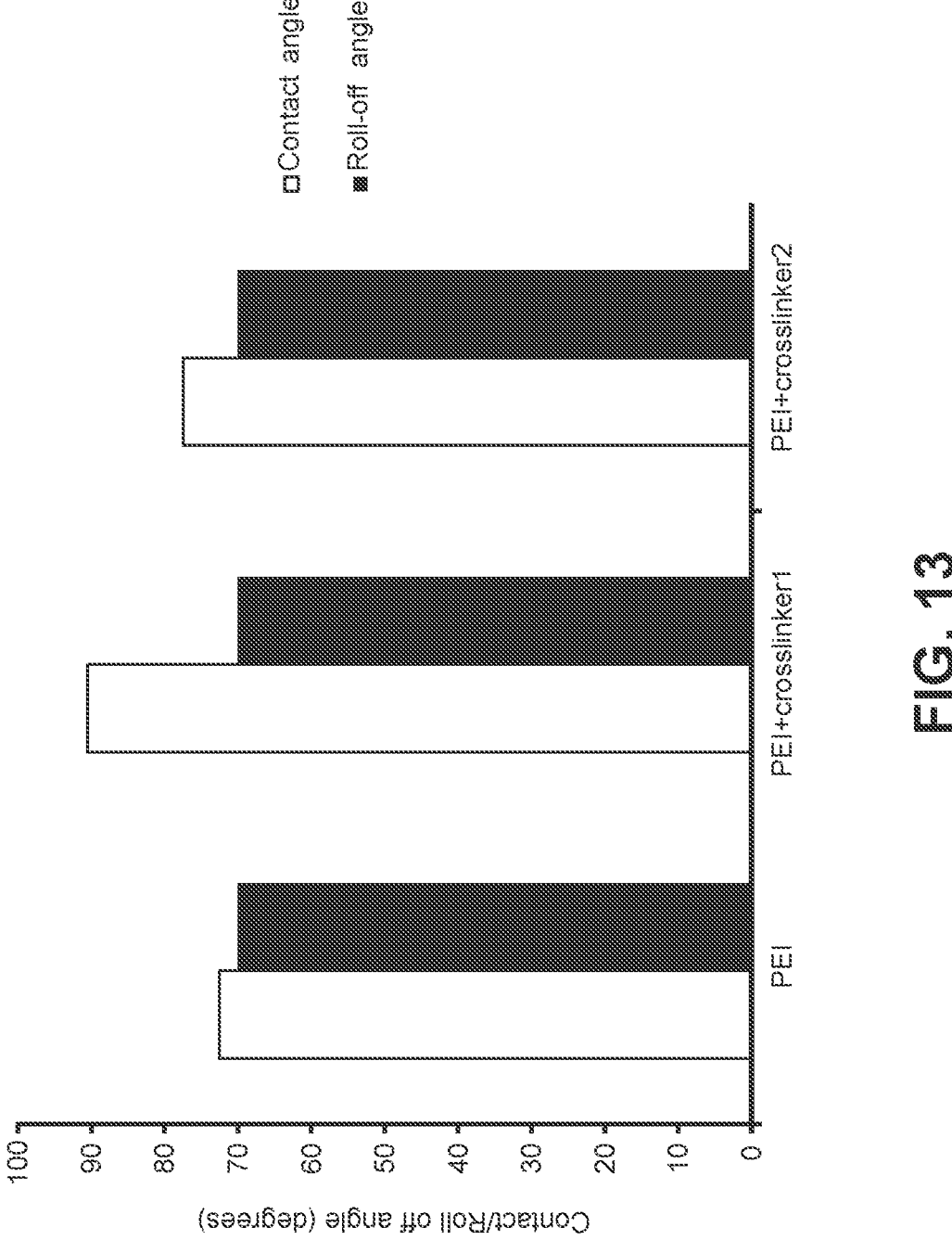

FIG. 13 shows the contact angle and the roll off angle of a 50 µL water droplet on an exemplary PEI nanofiber-coated Substrate 6 without crosslinker or crosslinked with (3-glycidyloxypropyl)trimethoxy silane) (crosslinker 1) or poly (ethylene glycol) diacrylate (crosslinker 2).

Figure 14:
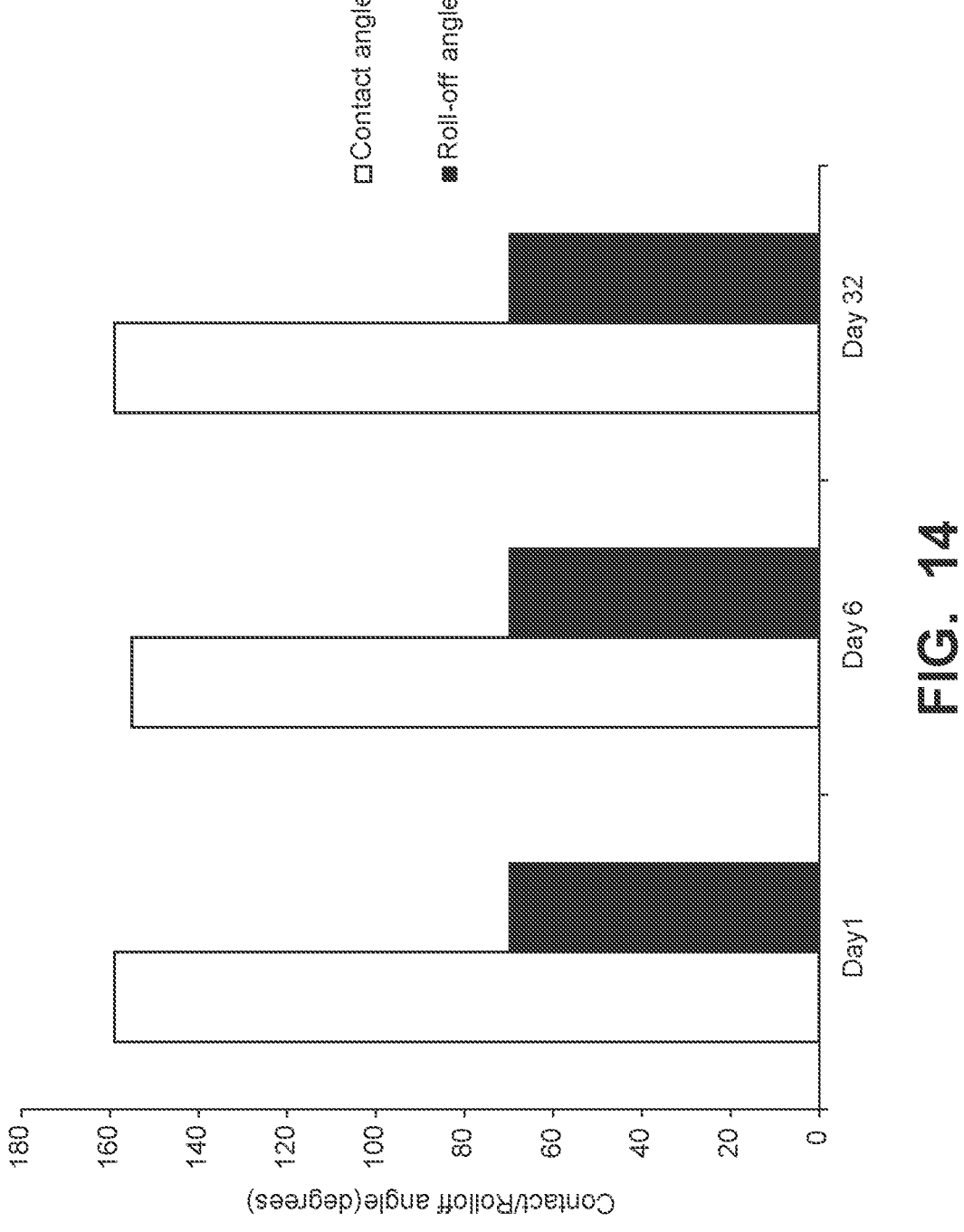

FIG. 14 shows the contact angles and the roll off angles of a 50 µL water droplet on an exemplary PHEM nanofiber-coated, DAMO-T-crosslinked Substrate 6 1 day, 6 days, and 32 days after formation of the coating by electrospinning.

Figure 15:
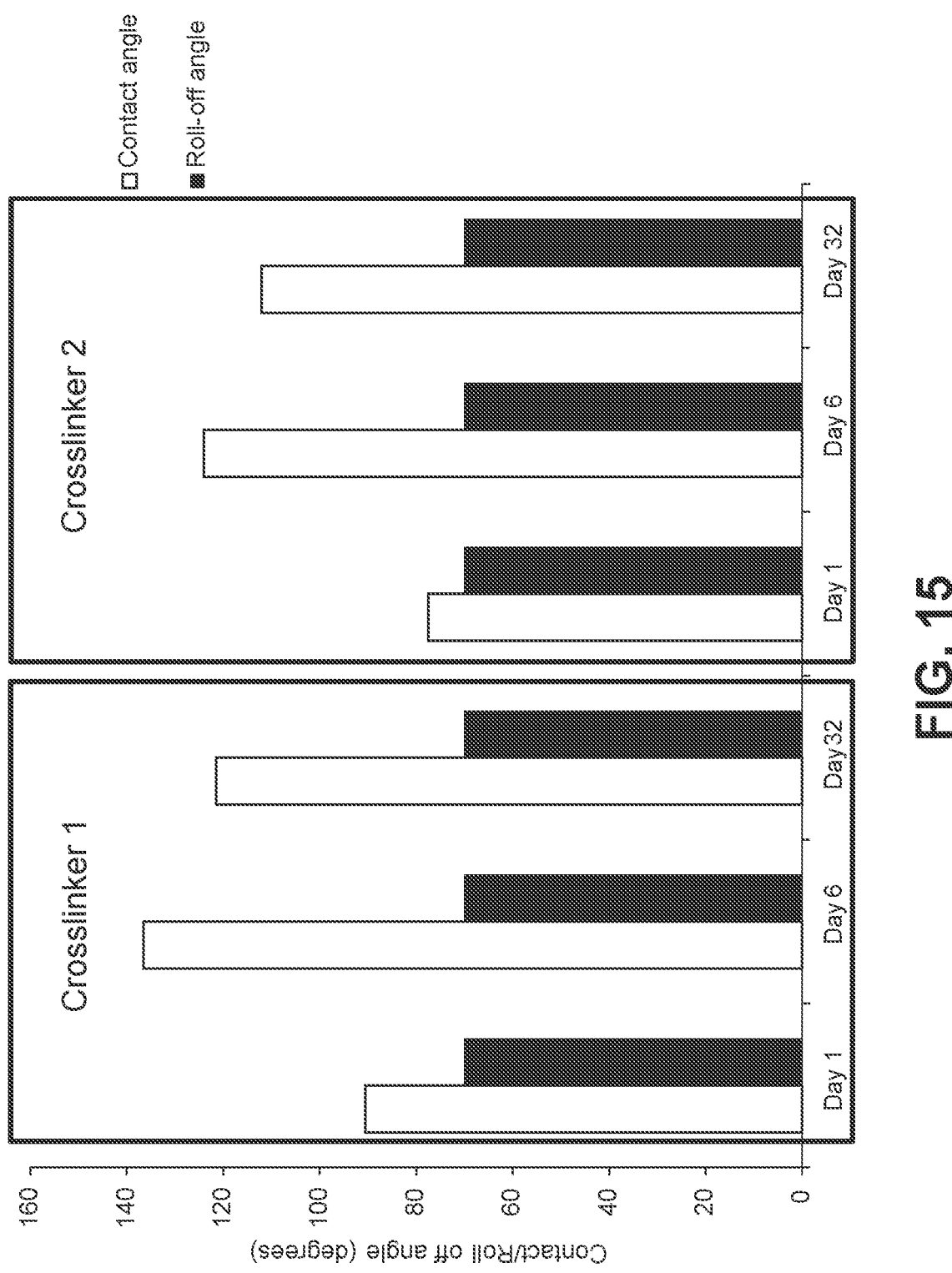

FIG. 15 shows the contact angle and the roll off angle of a 50 µL water droplet on an exemplary PEI-10K nanofiber-coated, crosslinked Substrate 6 1 day, 6 days, and 32 days after formation of the coating by electrospinning. The PEI was crosslinked using either (3-glycidyloxypropyl) trimethoxy silane (crosslinker 1) or poly (ethylene glycol) diacrylate (PEGDA) (crosslinker 2).

Figure 16C:
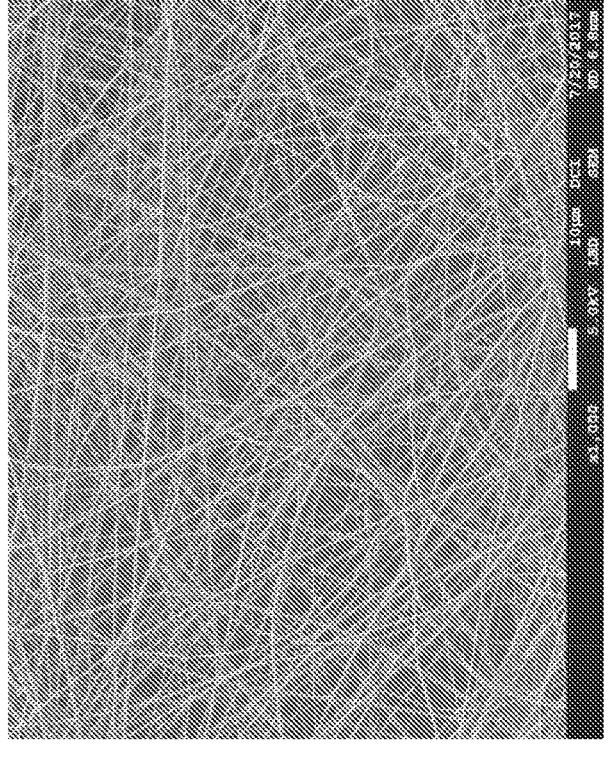
Figure 16A:
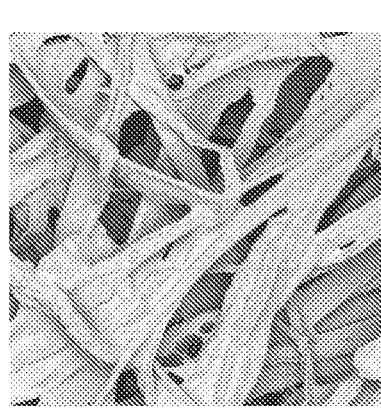
Figure 16B:
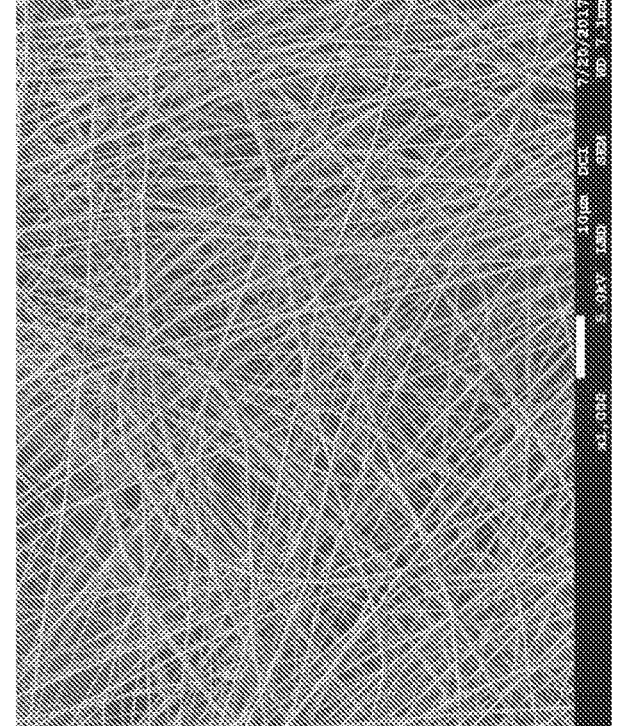

FIG. 16(A-C) shows exemplary scanning electron microscopy (SEM) images of uncoated Substrate 6 (FIG. 16A), Substrate 6 coated by electrospinning with PHEM without crosslinker (FIG. 16B), or Substrate 6 coated by electrospinning with PHEM with crosslinker DAMO-T (FIG. 16C). All images are shown at 1000× magnification.

Figure 17B:
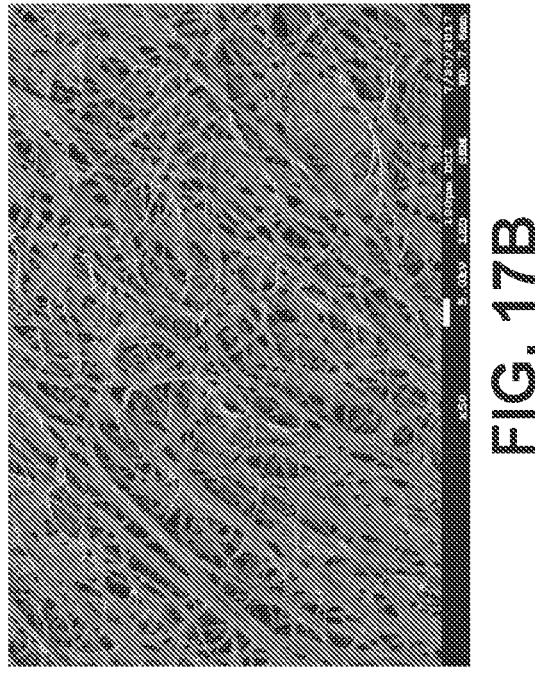
Figure 17A:
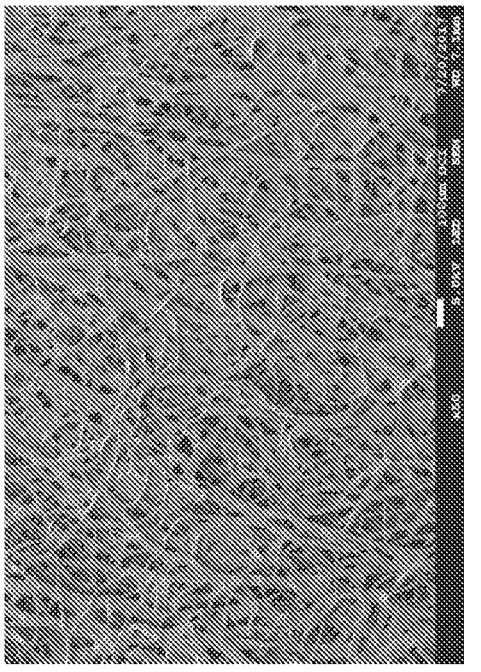
Figure 17C:
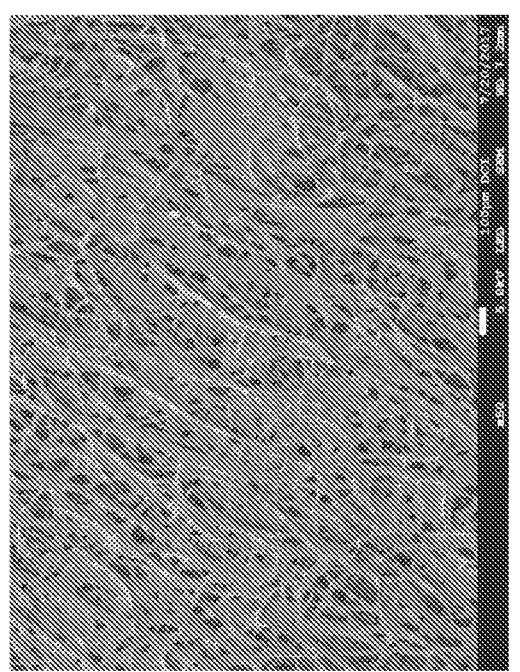

FIG. 17(A-C) shows exemplary SEM images of Substrate 6 coated by electrospinning with PEI-10K without crosslinker (FIG. 17A), Substrate 6 coated by electrospinning with PEI-10K with crosslinker (3-glycidyloxypropyl) trimethoxy silane (FIG. 17B), and Substrate 6 coated by electrospinning with PEI-10K with crosslinker poly (ethylene glycol) diacrylate (PEGDA) (FIG. 17C). All images are shown at 50× magnification.

Figure 18A:
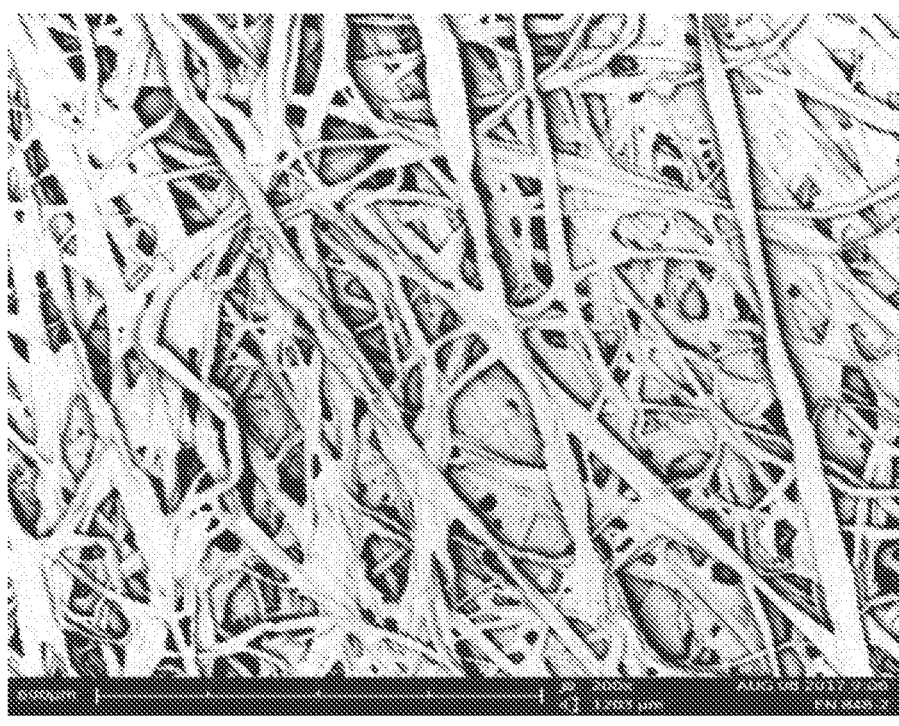
Figure 18B:
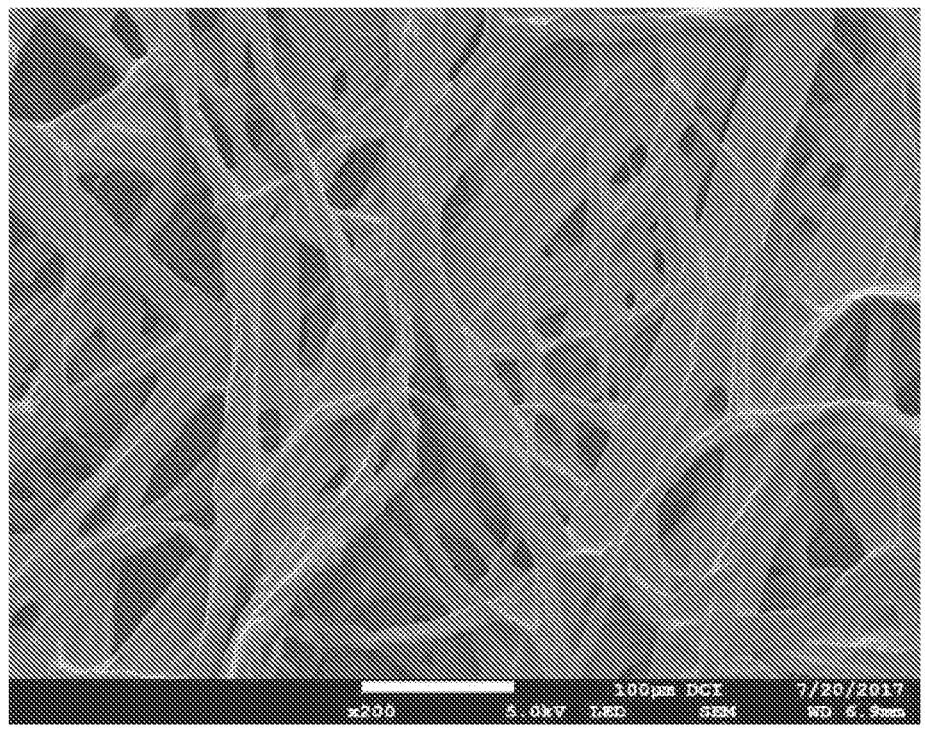
Figure 18C:
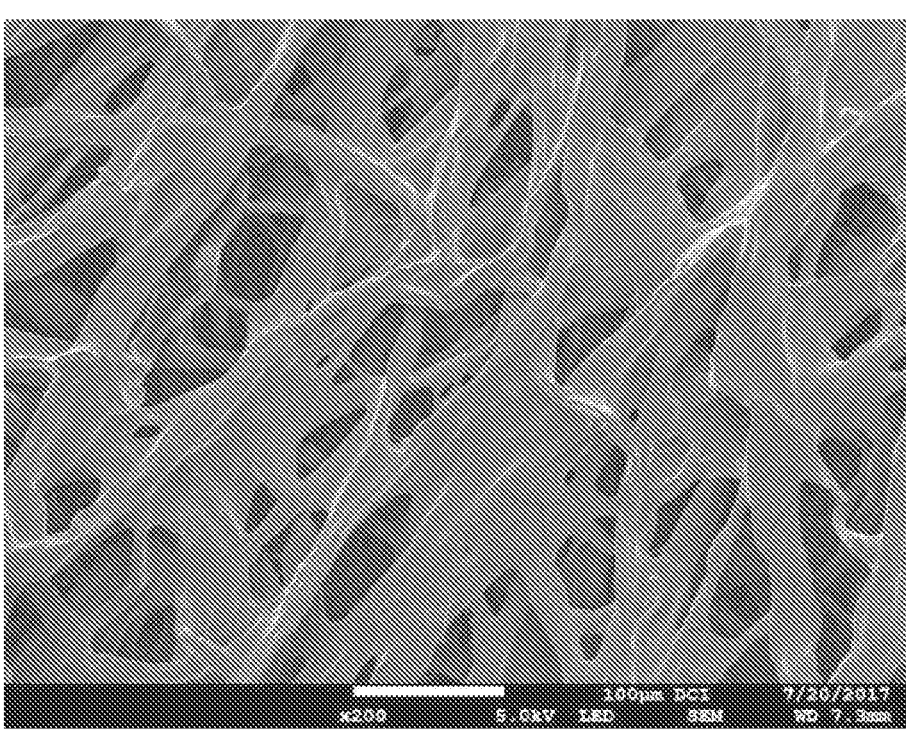
Figure 18D:
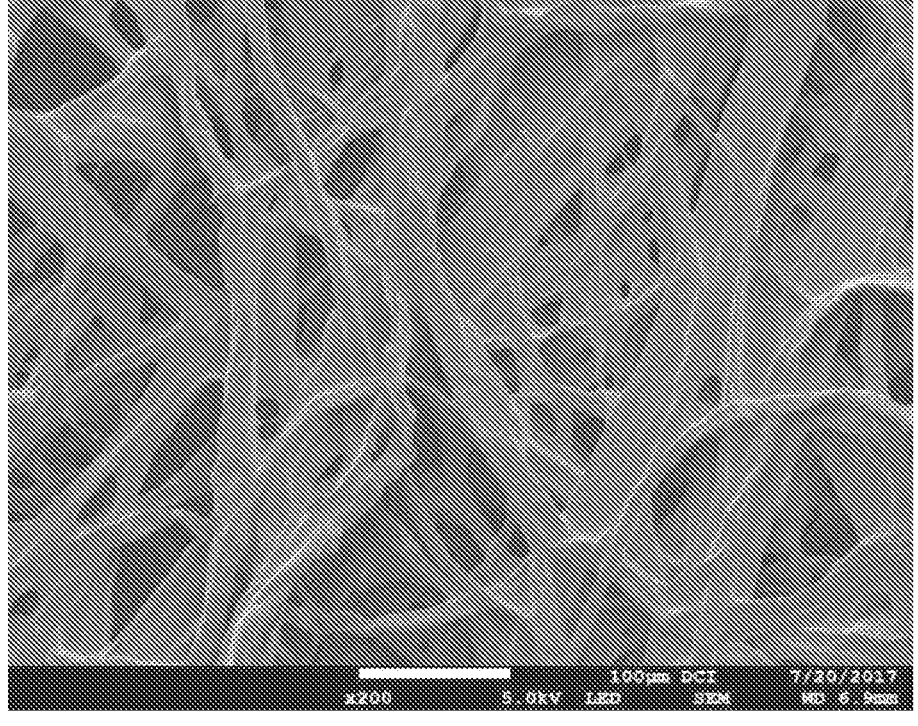

FIG. 18(A-D) shows exemplary SEM images of uncoated Substrate 6 (FIG. 18A); Substrate 6 coated by electrospinning with PEI-10K without crosslinker (FIG. 18B); Substrate 6 coated by electrospinning with PEI-10K and crosslinker 1 ((3-glycidyloxypropyl) trimethoxy silane) (FIG. 18C); and Substrate 6 coated by electrospinning with PEI-10K and crosslinker 2 (poly (ethylene glycol) diacrylate (PEGDA)) (FIG. 18D). All images are shown at 200× magnification.

Figure 19:
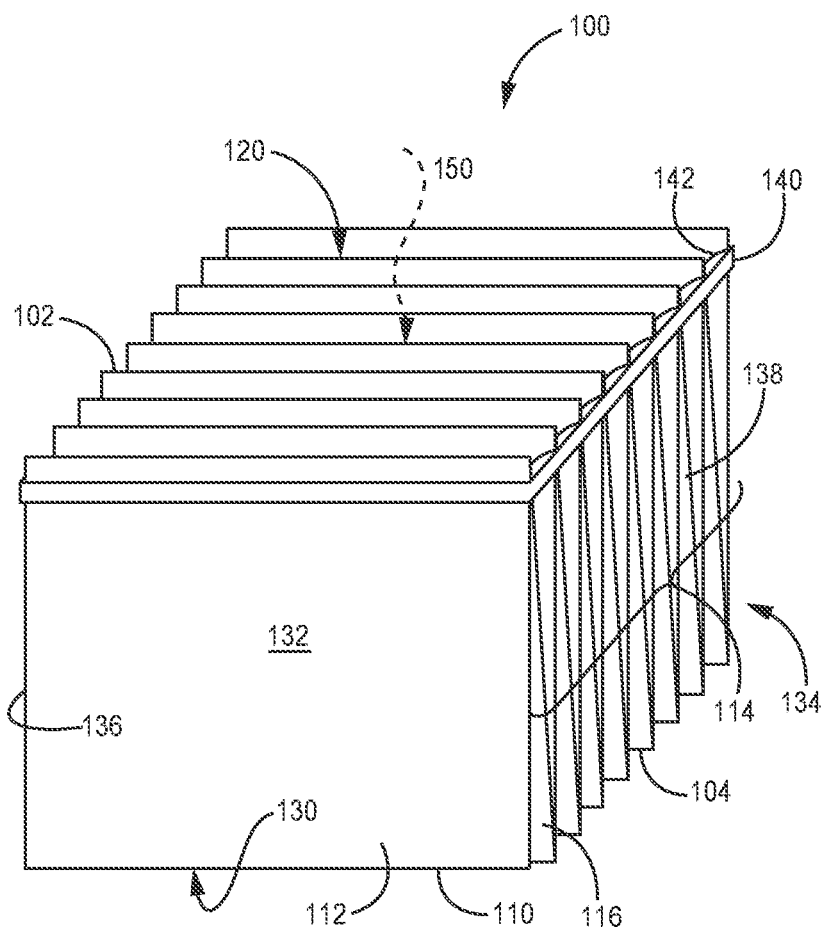

FIG. 19 depicts an example filter element consistent with the technology disclosed herein.

Figure 20:
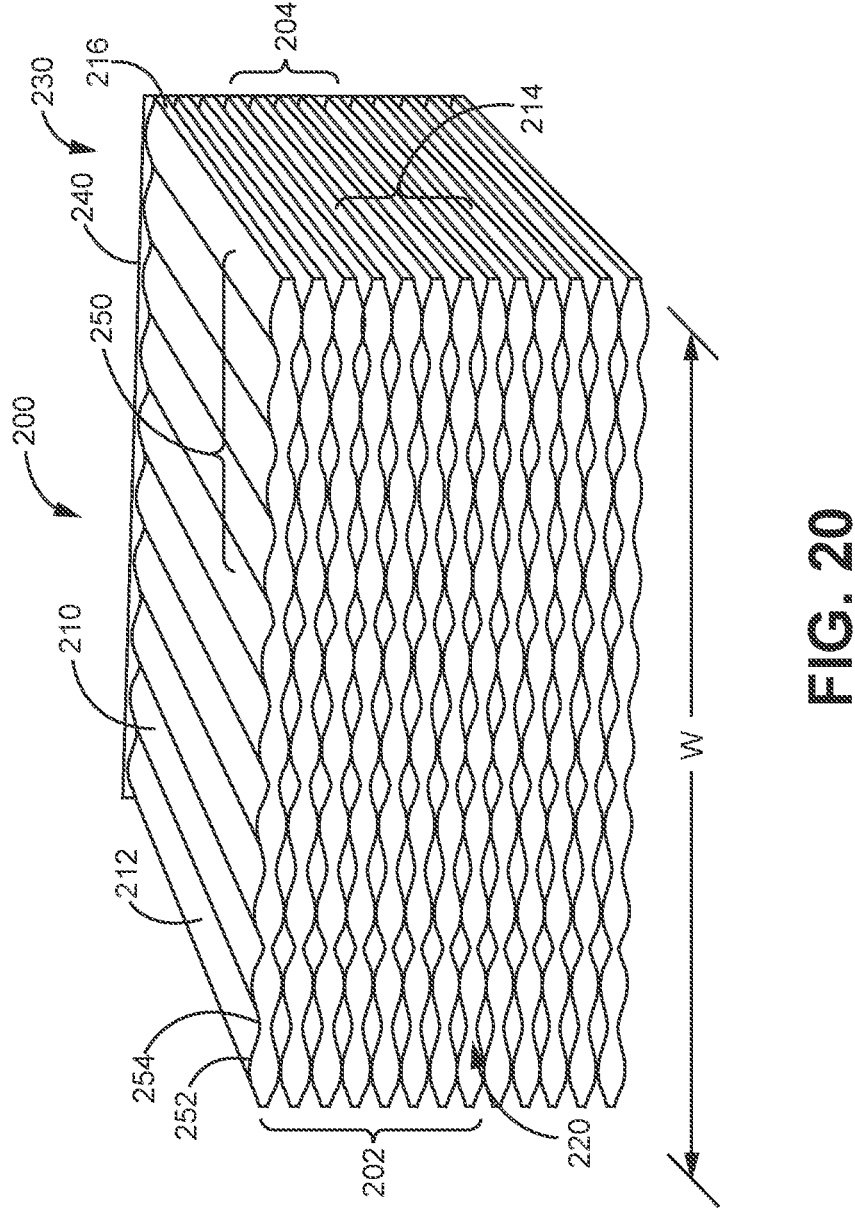

FIG. 20 depicts another example filter element consistent with the technology disclosed herein.

Figure 21:
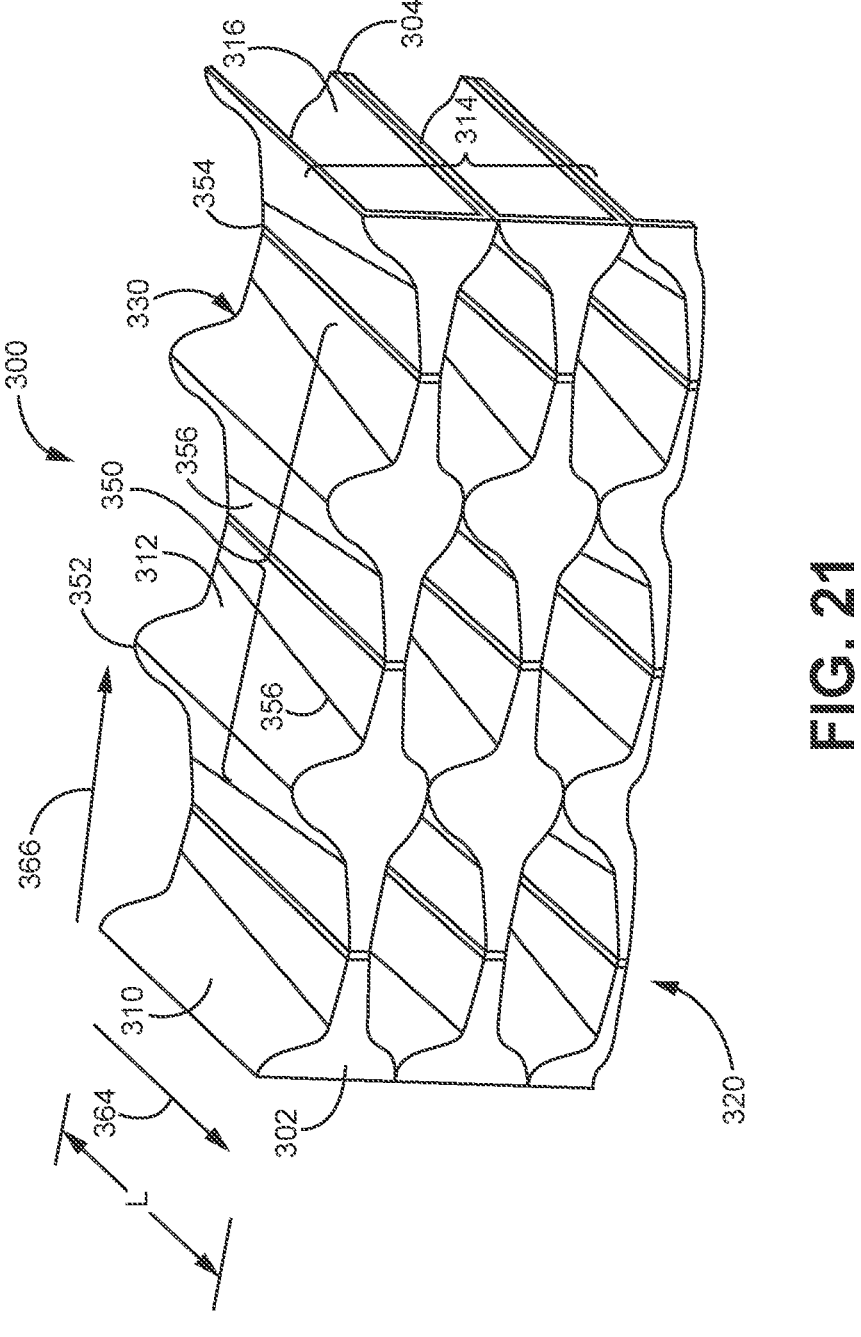

FIG. 21 depicts another example filter element consistent with the technology disclosed herein.

Figure 22:
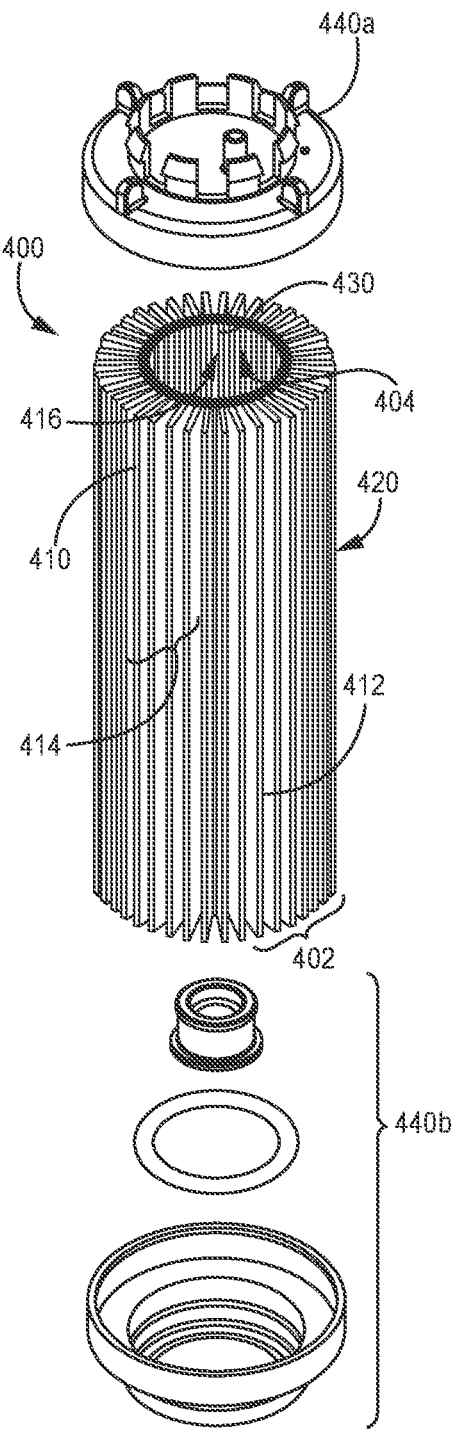

FIG. 22 depicts another example filter element consistent with the technology disclosed herein.

Figure 23:
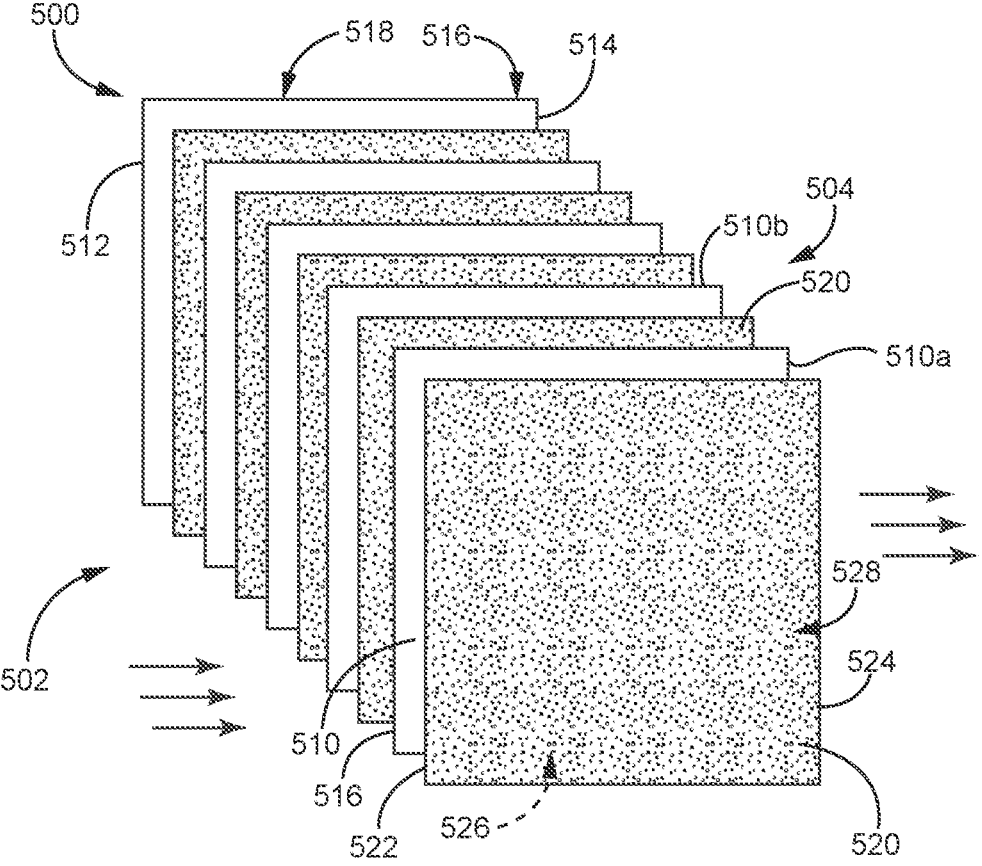

FIG. 23 depicts a schematic of another example filter element consistent with the technology disclosed herein.

Figure 24:
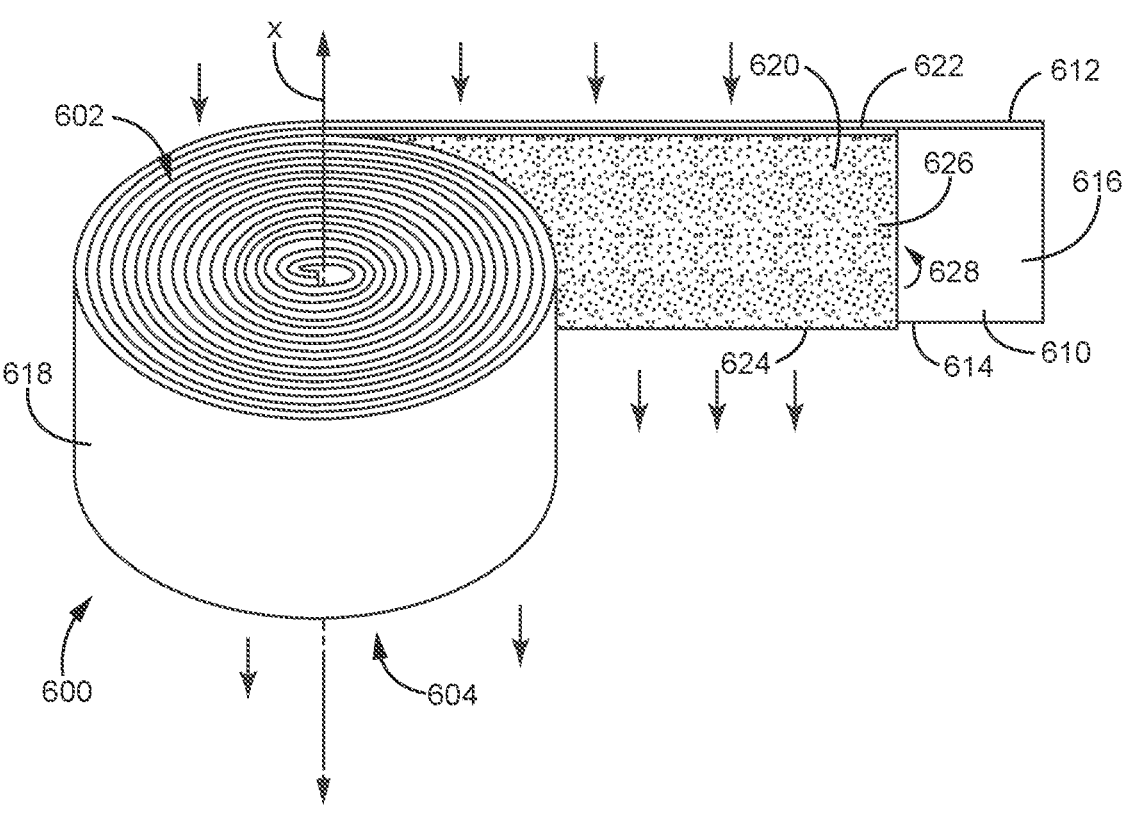

FIG. 24 depicts another example filter element consistent with the technology disclosed herein.

Figure 25:
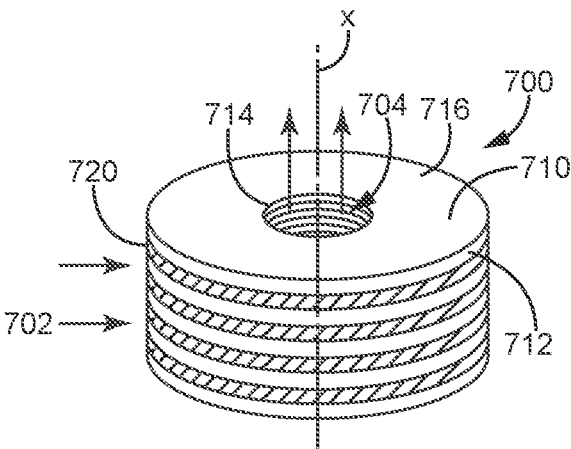

FIG. 25 depicts another example filter element consistent with the technology disclosed herein.

Figure 26:
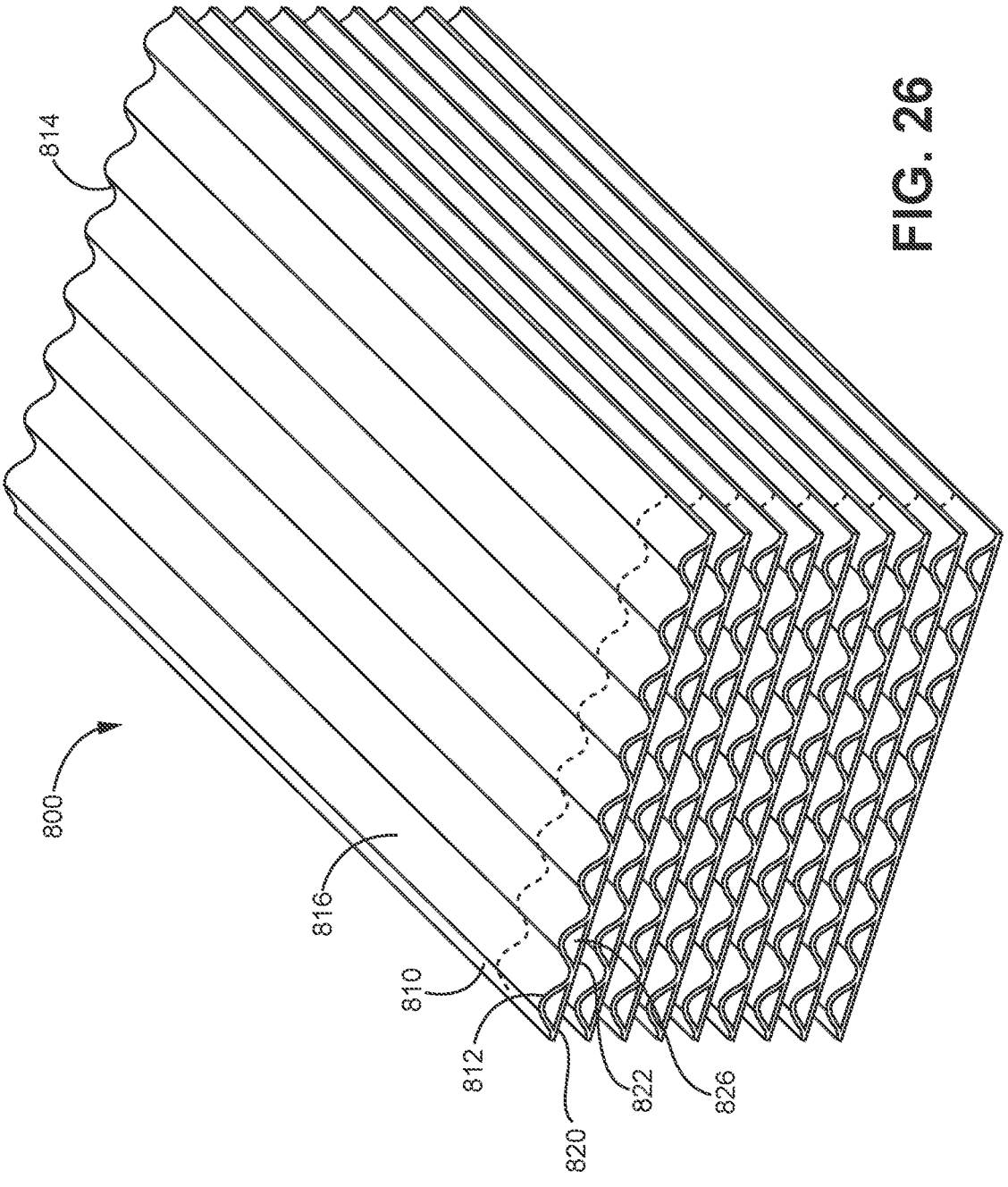

FIG. 26 depicts another example filter element consistent with the technology disclosed herein.

Figure 27:
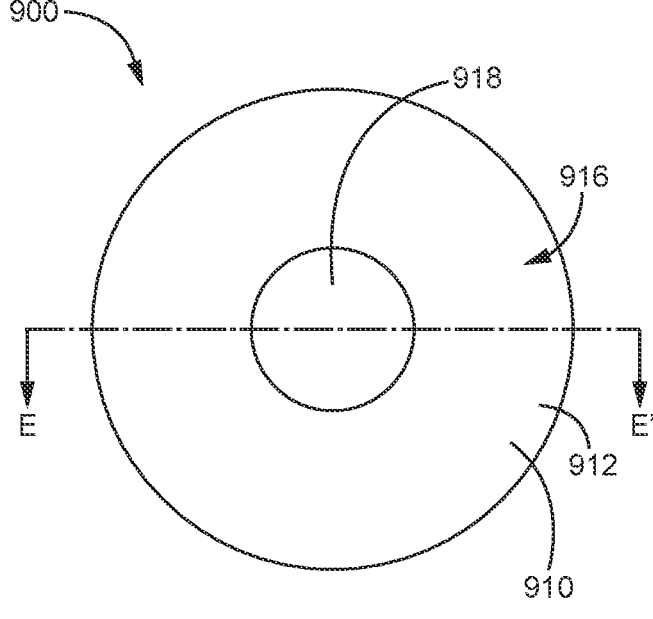

FIG. 27 depicts an example barrier vent consistent with the technology disclosed herein.

Figure 28:
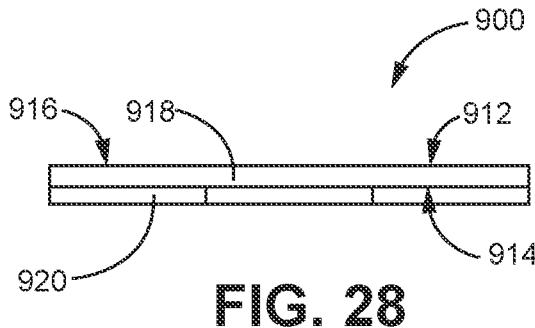

FIG. 28 is a cross-sectional view of the barrier vent of FIG. 27.

Figure 29:
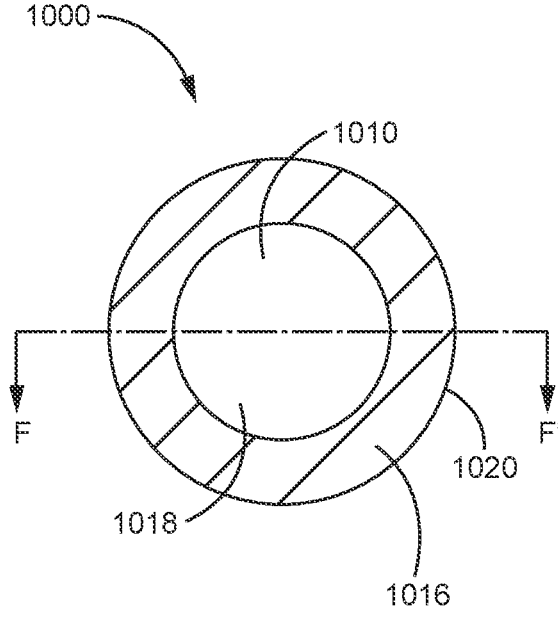

FIG. 29 depicts another example barrier vent consistent with the technology disclosed herein.

Figure 30:
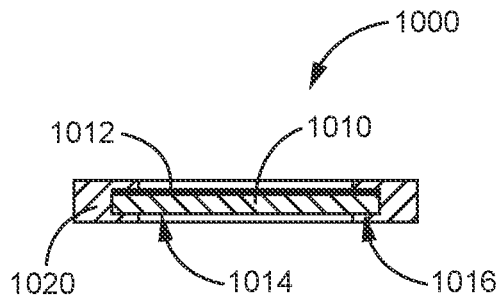

FIG. 30 is a cross-sectional view of the barrier vent of FIG. 29.

Figure 31:
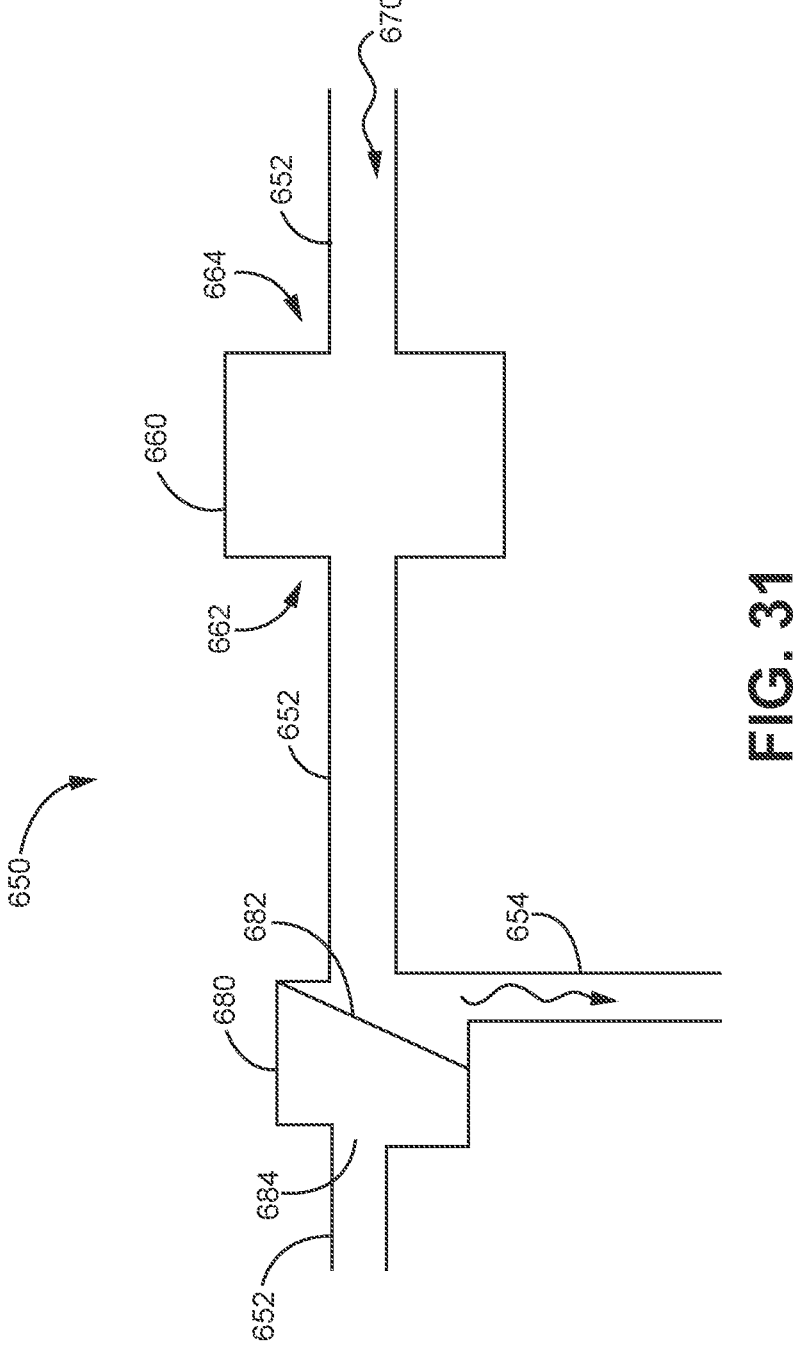

FIG. 31 is an example implementation of the technology disclosed herein.

Figure 32:
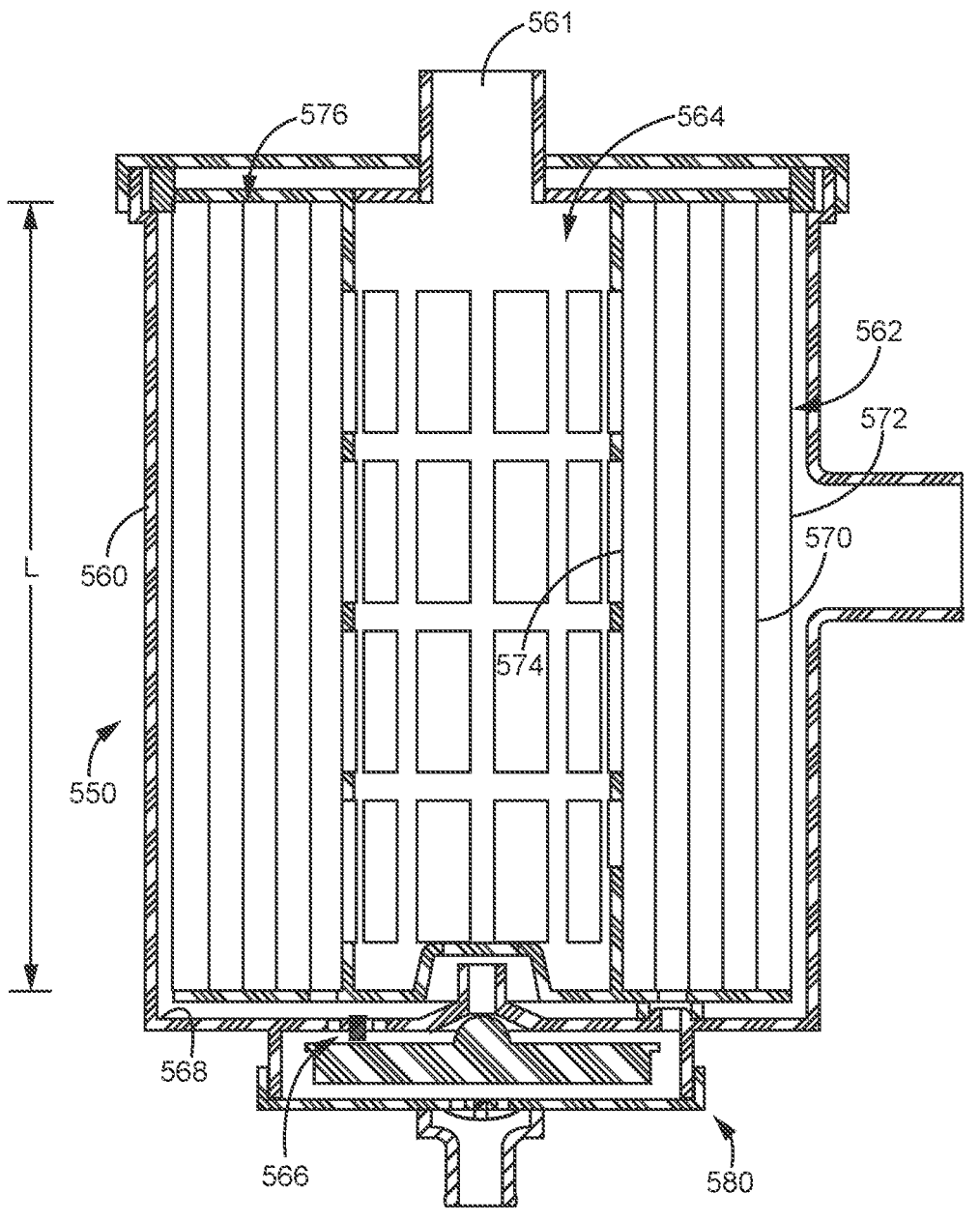

FIG. 32 is another example filter element consistent with the technology disclosed herein.

Figure 33:
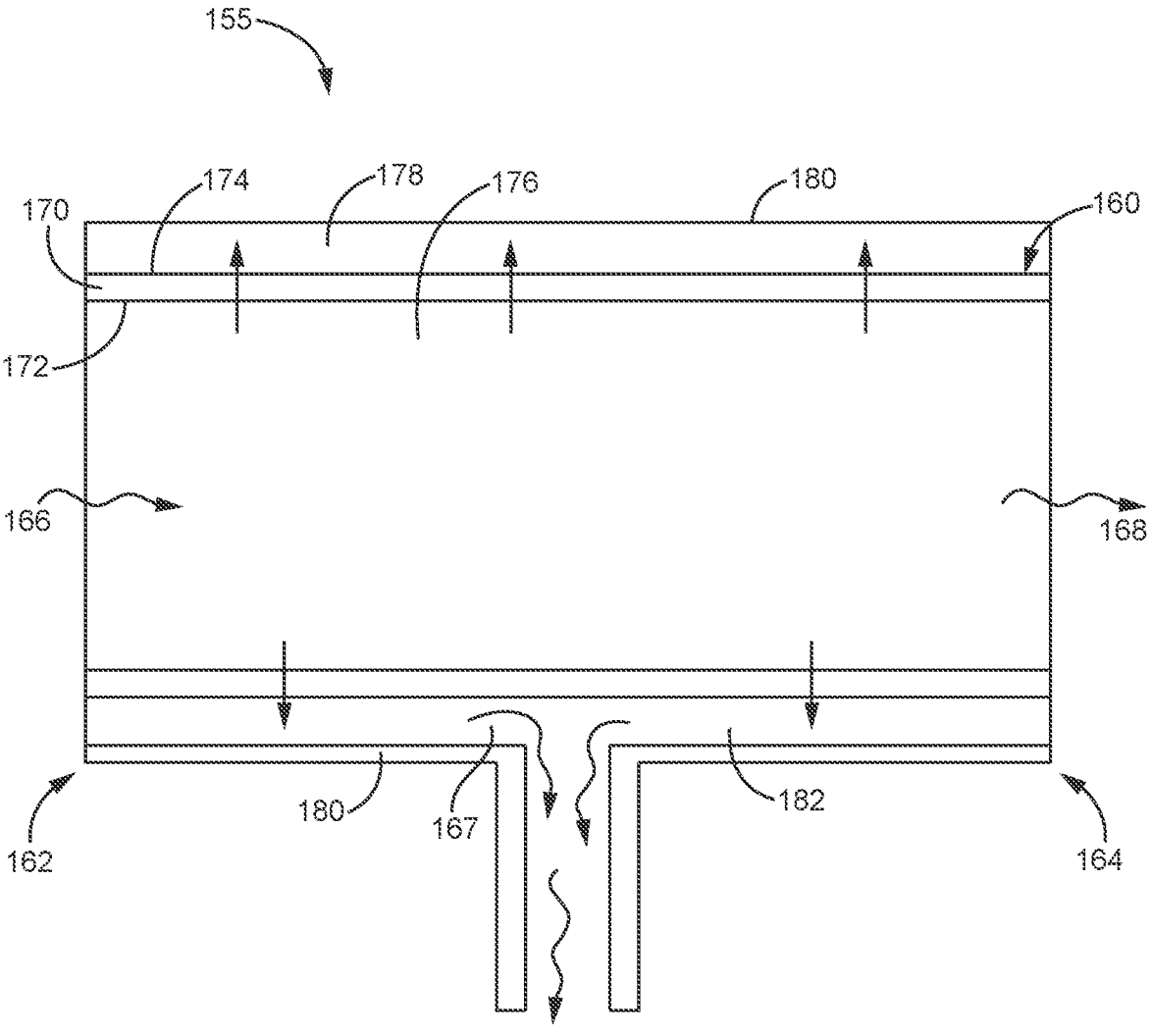

FIG. 33 is yet another example filter element consistent with the technology disclosed herein.

Figure 34:
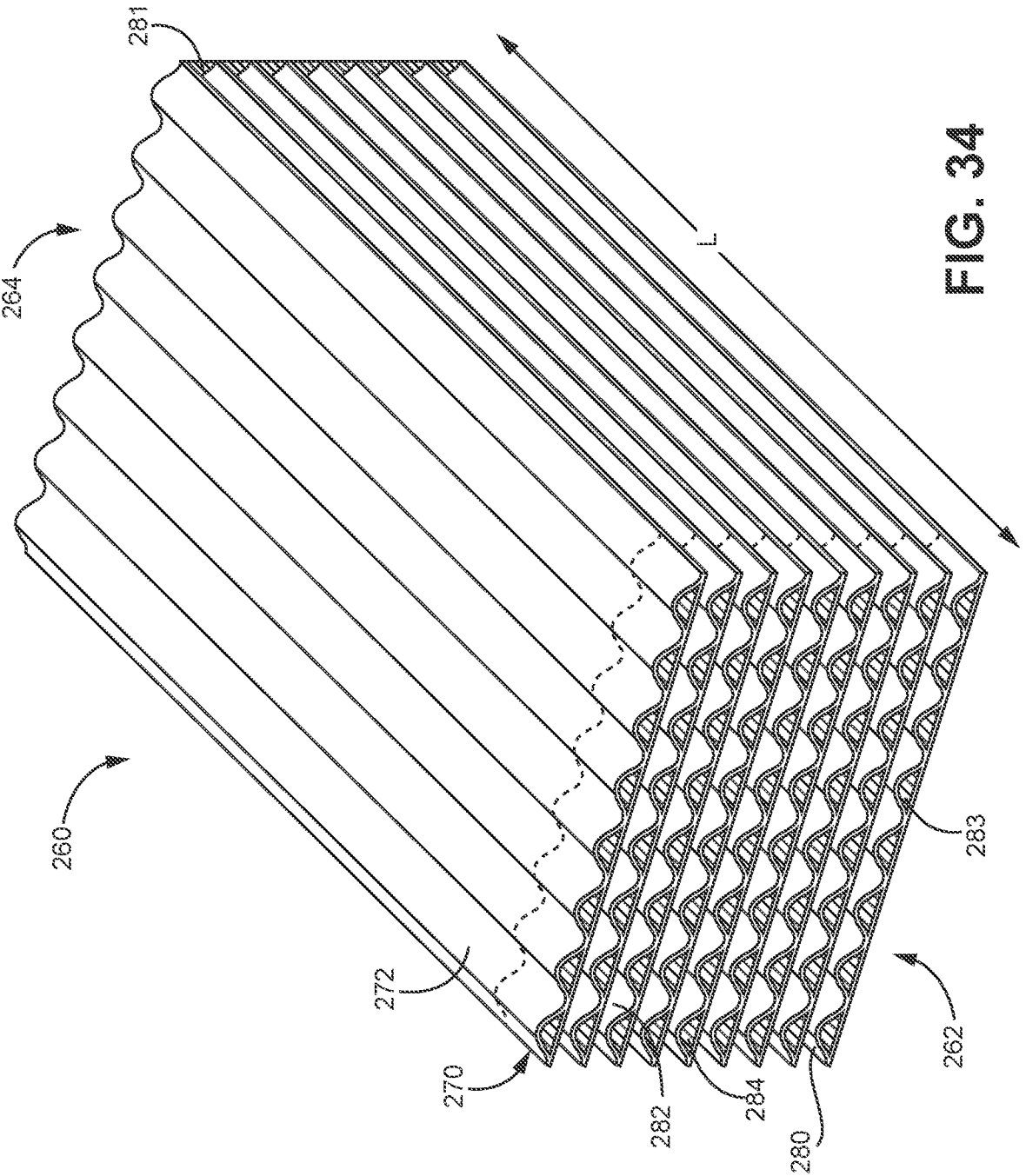

FIG. 34 is another example filter element consistent with the technology disclosed herein.

Figure 35:
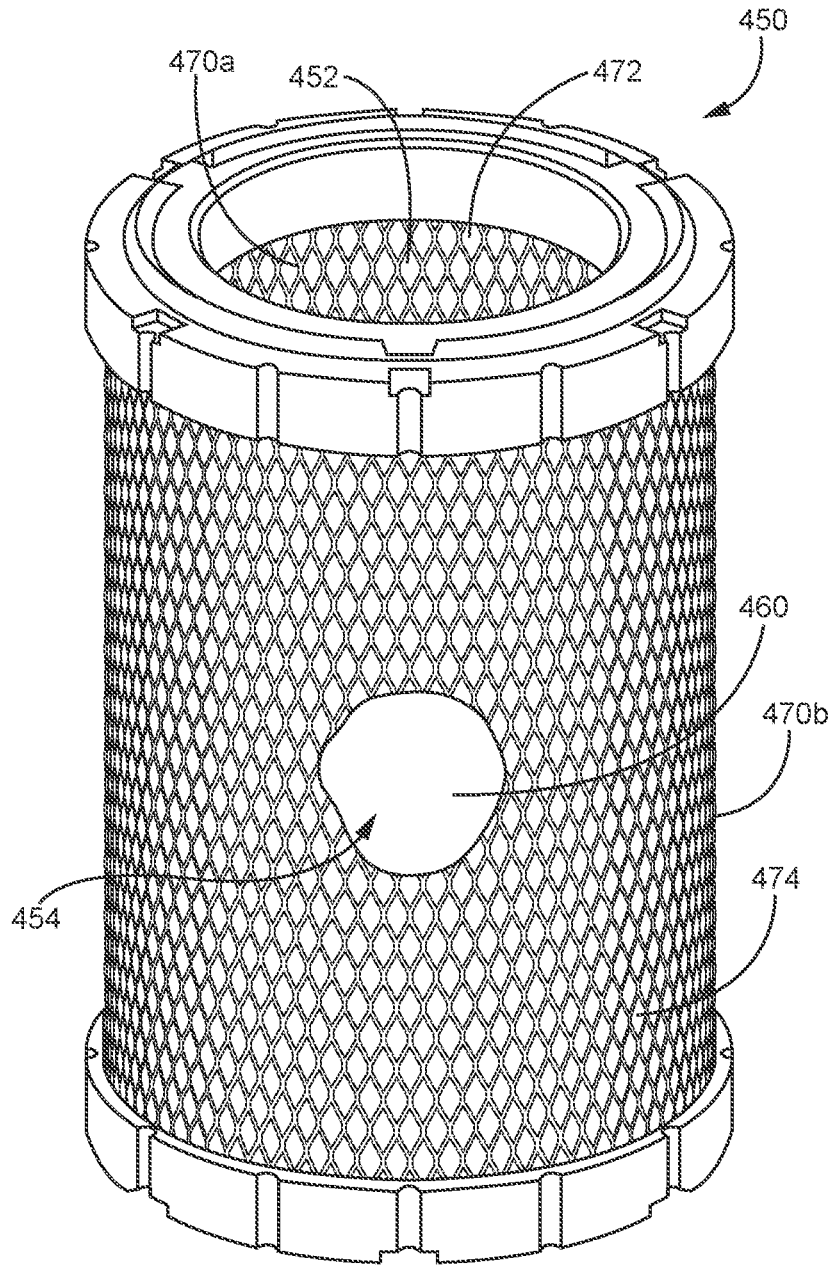

FIG. 35 depicts yet another filter element consistent with some examples.

DETAILED DESCRIPTION

A hydrocarbon fluid-water separation filter can include a filter media that includes at least one layer to remove particles and/or at least one layer to coalesce water from a hydrocarbon fluid stream; the layer or layers can be a substrate or can be supported by a substrate. In some embodiments, the particle removal layer and the water-coalescing layer can be the same layer and the layer can be a substrate or can be supported by a substrate. This disclosure describes a filter media including a substrate for use in a hydrocarbon fluid-water separation filter, methods of identifying the substrate, methods of making the substrate, methods of using the substrate, and methods of improving the roll off angle of the substrate. Inclusion of the substrate in a filter media or a filter element including, for example, a hydrocarbon fluid-water separation filter element, can provide more efficient filter manufacturing and/or improved performance characteristics of the filter media or filter element including, for example, improved water separation efficiency.

The hydrocarbon fluid can include, for example, diesel fuel, gasoline, hydraulic fluid, compressor oils, etc. In some embodiments, the hydrocarbon fluid preferably includes diesel fuel.

Methods of Identifying Material Suitable for Hydrocarbon Fluid-Water Separation

In one aspect, this disclosure describes a method of identifying a material including, for example, a filter media, having specific properties. The material is preferably suitable for hydrocarbon fluid-water separation.

In some embodiments, the method includes determining the roll off angle and, optionally, the contact angle of a droplet on a surface of the material while the material is immersed in fluid that includes a hydrocarbon. In some embodiments, the method includes identifying a material having the properties of a substrate suitable for hydrocarbon fluid-water separation including the roll off angle and/or contact angles described below.

In some embodiments, the droplet includes a hydrophile. In some embodiments, the droplet preferably includes water. In some embodiments, the droplet consists essentially of water. In some embodiments, the droplet consists of water. In some embodiments, the droplet is at least 5 µL, at least 10 µL, at least 15 µL, at least 20 µL, at least 25 µL, at least 30 µL, at least 35 µL, at least 40 µL, at least 45 µL, or at least 50 µL. In some embodiments, the droplet is up to 10 µL, up to 15 µL, up to 20 µL, up to 25 µL, up to 30 µL, up to 35 µL, up to 40 µL, up to 45 µL, up to 50 µL, up to 60 µL, up to 70 µL, or up to 100 µL. In some embodiments, the droplet is preferably a 20 µL droplet or a 50 µL droplet.

In some embodiments, the fluid that includes a hydrocarbon includes toluene. In some embodiments, the fluid that includes a hydrocarbon consists essentially of toluene. In some embodiments, the fluid that includes a hydrocarbon consists of toluene. Without wishing to be bound by theory, it is believed that, because of its interfacial tension with water, toluene acts as a surrogate for other hydrocarbon fluids including, for example, diesel fuel.

In contrast to previous methods for identifying materials suitable for use in hydrocarbon fluid-water separation, the methods described herein do not rely on the properties of a flat surface (for example, a surface that is non-porous). Rather, the methods described herein provide methods for testing the properties of a porous material (including, for example, a porous substrate) or a material having a porous surface. Furthermore, the methods described herein do not rely on the properties of the material in air. Rather, the materials are identified by the properties of the material in a fluid that includes a hydrocarbon including, for example, toluene.

For example, WO 2015/175877 says that a filter media designed to enhance fluid separation efficiency may comprise one or more layers having a surface modified to wet the fluid to be separated and one or more layers having a surface modified to repel the fluid to be separated. And WO 2015/175877 states that a "hydrophilic surface" may refer to a surface that has a water contact angle of less than 90 degrees and a "hydrophobic surface" may refer to a surface that has a water contact angle of greater than 90 degrees. But WO 2015/175877 does not say that the contact angle should be calculated in fluid rather than in air. And, indeed, the hydrophobicity of a surface in air does not predict the hydrophobicity of a surface in a hydrocarbon fluid.

Moreover, WO 2015/175877 does not say that the roll off angle of a surface is important and does not say how to select materials that alter the roll off angle. Rather, WO 2015/175877 says that roughness or coatings may be used to modify the wettability of a layer with respect to a particular fluid and that the terms "wet" and "wetting" refer to the ability of a fluid to interact with a surface such that the contact angle of the fluid with respect to the surface is less than 90 degrees.

But the wettability or contact angle of a surface alone—whether measured in air or in a hydrocarbon fluid—does not predict the hydrocarbon-water separation ability of the surface in a hydrocarbon fluid. In contrast, and as further described below, the adhesion or roll off angle of a water droplet on a surface in a hydrocarbon fluid optionally in combination with the contact angle of a droplet on the surface in a hydrocarbon fluid can be used to predict the ability of a substrate to remove water from hydrocarbon fluid.

Properties of the Substrate Surface

In one aspect, this disclosure describes a filter media that includes a substrate suitable for hydrocarbon fluid-water separation. The substrate includes a surface. In some embodiments, the substrate or a surface of the substrate are preferably stable.

In some embodiments, the surface has a roll off angle of at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, or at least 80 degrees for a 20 µL water droplet when the surface is immersed in toluene. In some embodiments, the surface has a roll off angle of at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, or at least 80 degrees for a 50 μL water droplet when the surface is immersed in toluene.

In some embodiments, the surface has a roll off angle of up to 60 degrees, up to 65 degrees, up to 70 degrees, up to 75 degrees, up to 80 degrees, up to 85 degrees, or up to 90 degrees for a 20 μL water droplet when the surface is immersed in toluene. In some embodiments, the surface has a roll off angle of up to 60 degrees, up to 65 degrees, up to 70 degrees, up to 75 degrees, up to 80 degrees, up to 85 degrees, or up to 90 degrees for a 50 μL water droplet when the surface is immersed in toluene.

In some embodiments, the surface has a roll off angle in a range of 50 degrees to 90 degrees for a 20 μL water droplet when the surface is immersed in toluene. In some embodiments, the surface has a roll off angle in a range of 40 degrees to 90 degrees for a 50 pt water droplet when the surface is immersed in toluene.

In some embodiments, the surface is preferably hydrophobic, that is, the surface has a contact angle of at least 90 degrees. In some embodiments, the surface has a contact angle of at least 90 degrees, at least 100 degrees, at least 110 degrees, at least 120 degrees, at least 130 degrees, or at least 140 degrees for a 20 μL water droplet when the surface is immersed in toluene. In some embodiments, the surface has a contact angle of at least 90 degrees, at least 100 degrees, at least 110 degrees, at least 120 degrees, at least 130 degrees, or at least 140 degrees for a 50 μL water droplet when the surface is immersed in toluene.

In some embodiments, the surface has contact angle of up to 150 degrees, up to 160 degrees, up to 170 degrees, or up to 180 degrees for a 20 μL water droplet when the surface is immersed in toluene. In some embodiments, the surface has contact angle of up to 150 degrees, up to 160 degrees, up to 170 degrees, or up to 180 degrees for a 50 μL water droplet when the surface is immersed in toluene.

In some embodiments, the surface has a contact angle in a range of 90 degrees to 150 degrees or in a range of 90 degrees to 180 degrees for a 20 μL water droplet when the surface is immersed in toluene.

In some embodiments, the surface has a contact angle in a range of 90 degrees to 150 degrees or in a range of 90 degrees to 180 degrees for a 50 μL water droplet when the surface is immersed in toluene.

As further described below, the roll off angle (that is, the adhesion) of a water droplet on a hydrophobic surface (that is, a surface having a contact angle of at least 90 degrees) of a substrate in a hydrocarbon fluid correlates with the size of a water droplet that can be coalesced or grown on the surface of the substrate in a hydrocarbon fluid. The size of the water droplet that can be coalesced or grown correlates with the ability of a substrate to remove water from hydrocarbon fluid. Thus, the ability of a substrate to remove water from hydrocarbon fluid can be accurately predicted by determining the roll off angle and the contact angle of a water droplet on the surface of the substrate in a hydrocarbon fluid.

Substrates produced and/or identified by the methods disclosed herein have a high contact angle and high roll off angle. The high contact angle is indicative of the low apparent drag forces on a water droplet, while the high roll off angle is indicative of the ability of the droplet to be retained on the substrate surface. Without wishing to be bound by theory, it is believed that this combination of features allows larger droplets to form through coalescence, making the droplets easier to separate from a hydrocarbon fluid stream, and improving the overall efficiency of water separation from the hydrocarbon fluid stream.

The balance of high contact angle and high roll off angle is achievable using the methodology disclosed herein including, for example, by modifying substrate surfaces to increase their roll off angle. Typically, these methods have little negative impact on the contact angle. In some embodiments, filter substrates having high contact angles can, therefore, be modified to provide a substrate having the claimed combination of contact angle and roll off angle.

Substrate Materials and Properties

The substrate can be any substrate suitable for use in a filter media. In some embodiments, the substrate is preferably a substrate suitable for use in a hydrocarbon fluid filter element including, for example, a fuel filter. In some embodiments, the substrate can include, for example, cellulose, polyester, polyamide, polyolefin, glass, or combinations thereof (for example, blends, mixtures, or copolymers thereof). The substrate can include, for example, a nonwoven web, a woven web, a porous sheet, a sintered plastic, a high density screen, a high density mesh, or combinations thereof. In some embodiments, the substrate can include synthetic fibers, naturally occurring fibers, or combinations thereof (for example, blends or mixtures thereof). The substrate is typically of a porous nature and of a specified and definable performance characteristic such as pore size, Frazier air permeability, and/or another suitable metric.

In some embodiments, the substrate can include a thermoplastic or a thermosetting polymer fiber. The polymers of the fiber may be present in a single polymeric material system, in a bicomponent fiber, or in a combination thereof. A bicomponent fiber may include, for example, a thermoplastic polymer. In some embodiments, a bicomponent fiber can have a core-sheath structure, including a concentric or a non-concentric structure. In some embodiments, the sheath of the bicomponent fiber can have a melting temperature lower than the melting temperature of the core such that, when heated, the sheath binds to the other fibers in the layer while the core maintains structural integrity. Exemplary embodiments of bicomponent fibers include side-by-side fibers or island-in-the-sea fibers.

In some embodiments, the substrate can include a cellulosic fiber including, for example, a softwood fiber (such as mercerized southern pine), a hardwood fiber (such as Eucalyptus fibers), a regenerated cellulose fiber, a mechanical pulp fiber, or a combination thereof (for example, a mixture or blend thereof).

In some embodiments, the substrate can include a glass fiber including, for example, a microglass, a chopped glass fiber, or a combination thereof (for example, a mixture or blend thereof).

In some embodiments, the substrate includes a fiber having a mean diameter of at least 0.3 micron, at least 1 micron, at least 10 microns, at least 15 microns, at least 20 microns, or at least 25 microns. In some embodiments, the substrate includes a fiber having a mean diameter of up to 50 microns, up to 60 microns, up to 70 microns, up to 75 microns, up to 80 microns, or up to 100 microns. A person having skill in the art will recognize that the diameter of the fiber may be varied depending on the fiber material as well as the process used to manufacture the fiber. The length of these fibers can also vary from a few millimeters in length to being a continuous fibrous structure. The cross-sectional shape of the fiber can also be varied depending on the material or manufacturing process used.

The substrate may, in some embodiments, include one or more binding materials. In some embodiments, a binding material includes a modifying resin that provides additional rigidity and/or hardness to the substrate. For example, in some embodiments, the substrate may be saturated with a modifying resin. A modifying resin may include a UV-reactive resin, as described herein, or a non-UV-reactive resin. A modifying resin may, in some embodiments, include a phenolic resin and/or an acrylic resin. A non-UV-reactive resin may, in some embodiments, include an acrylic resin that lacks an aromatic component and/or an unsaturated component.

In some embodiments, including, for example, when the substrate is prepared by being subjected to UV treatment, the substrate preferably includes an aromatic component and/or an unsaturated component. The aromatic component and/or an unsaturated component may be present in the materials included in the substrate or may be added to the substrate using another material including, for example, a resin. A resin including an aromatic component and/or an unsaturated component is referred to herein as a UV-reactive resin. A UV-reactive resin may include, for example, a phenolic resin. In some embodiments, the unsaturated component preferably includes a double bond.

In some embodiments, the substrate includes pores having an average diameter of up to 10 micrometers (μm), up to 20 μm, up to 30 μm, up to 40 μm, up to 45 μm, up to 50 μm, up to 60 μm, up to 70 μm, up to 80 μm, up to 90 μm, up to 100 μm, up to 200 μm, up to 300 μm, up to 400 μm, up to 500 μm, up to 600 μm, up to 700 μm, up to 800 μm, up to 900 μm, up to 1 millimeter (mm), up to 1.5 mm, up to 2 mm, up to 2.5 mm, or up to 3 mm. In some embodiments, the substrate includes pores having an average diameter of at least 2 μm, at least 5 μm, at least 10 μm, at least 20 μm, at least 30 μm, at least 40 μm, at least 50 μm, at least 60 μm, at least 70 μm, at least 80 μm, at least 90 μm, at least 100 μm, at least 200 μm, at least 300 μm, at least 400 μm, at least 500 μm, at least 600 μm, at least 700 μm, at least 800 μm, at least 900 μm, or at least 1 mm. In some embodiments, the substrate includes pores having an average diameter in a range of 5 μm to 100 μm. In some embodiments, the substrate includes pores having an average diameter in a range of 40 μm to 50 μm. In some embodiments, pore size may be measured using capillary flow porometry. In some embodiments, pore size is preferably measured by liquid extrusion porometry, as described in US Patent Publication No. 2011/0198280.

In some embodiments, the substrate is at least 15% porous, at least 20% porous, at least 25% porous, at least 30% porous, at least 35% porous, at least 40% porous, at least 45% porous, at least 50% porous, at least 55% porous, at least 55% porous, at least 60% porous, at least 65% porous, at least 70% porous, at least 75% porous, or at least 80% porous. In some embodiments, the substrate is up to 75% porous, up to 80% porous, up to 85% porous, up to 90% porous, up to 95% porous, up to 96% porous, up to 97% porous, up to 98% porous, or up to 99% porous. For example, the substrate may be at least 15% porous and up to 99% porous, at least 50% porous and up to 99% porous, or at least 80% porous and up to 95% porous.

In some embodiments, the filter media may be designed for flow that passes from upstream to downstream during use of the filter media. In some embodiments, including for example, when a filter media includes a substrate located downstream of an upstream layer, the substrate may include pores having an average diameter greater than the average diameter of the pores of the upstream layer. Additionally or alternatively, the substrate may include pores having an average diameter greater than the average diameter of a droplet that forms on a downstream side of the upstream layer. For example, when a filter media includes an upstream layer that is a coalescing layer that includes pores having an average diameter, the substrate may include pores having an average diameter greater than the average diameter of the pores of the coalescing layer.

Typically, a surface of a material (including, for example, a substrate), prior to any surface modification or treatment, has a roll off angle of less than 50 degrees, less than 40 degrees, or less than 30 degrees for a 20 μL water droplet when the surface is immersed in toluene. Typically, a surface of a material (including, for example, a substrate), prior to any surface modification or treatment, has a roll off angle of less than 30 degrees, less than 20 degrees, less than 15 degrees, or less than 12 degrees for a 50 μL water droplet when the surface is immersed in toluene.

For example, the roll off angle of the surface prior to any surface modification or treatment may be in a range of 0 degrees to 50 degrees for a 20 μL water droplet when the surface is immersed in toluene.

In some embodiments, the roll off angle of the surface prior to any surface modification or treatment may preferably be in a range of 0 degrees to 40 degrees for a 20 μL water droplet when the surface is immersed in toluene.

For example, the roll off angle of the surface prior to any surface modification or treatment may be in a range of 0 degrees to 20 degrees for a 50 μL water droplet when the surface is immersed in toluene.

Providing a material (including, for example, a substrate) having a surface having a suitable roll off angle is within the remit of the skilled person.

Typically, a surface of a material (including, for example, a substrate), prior to any surface modification or treatment, has a contact angle of at least 90 degrees, at least 100 degrees, or at least 110 degrees for a 20 μL water droplet when the surface is immersed in toluene. Typically, a surface of a material (including, for example, a substrate), prior to any surface modification or treatment, has a contact angle of at least 90 degrees, at least 100 degrees, or at least 110 degrees for a 50 μL water droplet when the surface is immersed in toluene.

For example, the contact angle of the surface, prior to any surface modification or treatment, may be in a range of 90 degrees to 180 degrees for a 20 μL water droplet when the surface is immersed in toluene.

In some embodiments, the contact angle of the surface, prior to any surface modification or treatment, may preferably be in a range of 100 degrees to 150 degrees for a 20 μL water droplet when the surface is immersed in toluene.

For example, the contact angle of the surface, prior to any surface modification or treatment, may be in a range of 90 degrees to 180 degrees for a 50 μL water droplet when the surface is immersed in toluene.

In some embodiments, the contact angle of the surface, prior to any surface modification or treatment, may preferably be in a range of 100 degrees to 150 degrees for a 50 μL water droplet when the surface is immersed in toluene.

In some embodiments, the surface, prior to any surface modification or treatment, may have a contact angle of 0 degrees, that is, a droplet will completely spread out on the surface. In some embodiments, including when the surface, prior to any surface modification or treatment, has a contact angle of 0 degrees, the roll of angle, prior to any surface modification or treatment, will be undefined.

Providing a material (including, for example, a substrate) having a surface having a suitable contact angle is within the remit of the skilled person. Typically, including materials that are generally hydrophobic will usually result in a higher contact angle.

Other factors that influence the contact angle of a surface may include the pore size and porosity. "Porosity" is defined as the amount of void space in a material. For instance, pores of a certain size may promote hydrocarbon fluid, which is hydrophobic, being trapped in the filter. Moreover, the high interfacial tension of water prevents it from effectively penetrating pores below a certain size.

Filter Media Including the Substrate

In some embodiments, a filter media including the substrate is preferably used for hydrocarbon-water separation or, more preferably, fuel-water separation, and, most preferably, diesel fuel-water separation. In some embodiments the filter media can be used for other types of fluid filtration.

The filter media may include one layer, two layers, or a plurality of layers. In some embodiments, one or more of the layers of the filter media may be supported by the substrate, may include the substrate, or may be the substrate.

In some embodiments, and, as shown, for example, in FIG. 1A-D, the filter media may include a layer to remove particles from a hydrocarbon liquid stream 20 and/or a layer to coalesce water from a hydrocarbon liquid stream (also referred to as a coalescing layer) 30. In some embodiments, a layer to remove particles from a hydrocarbon liquid stream and/or a coalescing layer may be supported by the substrate 10, as shown in an illustrative embodiment in FIG. 1A and FIG. 1B. In some embodiments, including, for example, when the filter media is designed to accommodate a flow that passes from upstream to downstream during use of the filter media, a layer to remove particles from a hydrocarbon liquid stream and/or a coalescing layer can be located upstream of the substrate. In some embodiments, the layer to remove particles from a hydrocarbon liquid stream and the substrate are the same layer 40, as shown in one embodiment in FIG. 1C. In some embodiments, the coalescing layer and the substrate are the same layer 50, as shown in one embodiment in FIG. 1D. When the substrate and the layer to remove particles from a hydrocarbon liquid stream are the same layer or when the substrate and the layer to coalesce water from a hydrocarbon liquid stream are the same layer, filter media manufacturing may be more efficient because the filter media may include a decreased number of total layers.

In some embodiments, a surface of the substrate preferably forms a downstream side of the substrate. In some embodiments, a surface of the substrate can form a downstream side or layer of the filter media or a downstream side of the filter media.

In some embodiments, including, for example, when a surface of the substrate forms a downstream side or layer of the filter media or a downstream side of the filter media, the substrate may preferably be separated from another layer by sufficient space to allow water droplet formation and/or water droplet roll off. In some embodiments, the substrate may be separated from another layer by at least 10 μm, at least 20 μm, at least 30 μm, at least 40 μm, at least 50 μm, at least 100 μm, at least 200 μm, at least 500 μm, or at least 1 mm. In some embodiments, the substrate may be separated from another layer by up to 40 μm, up to 50 μm, up to 100 μm, up to 200 μm, up to 500 μm, up to 1 mm, up to 2 mm, up to 3 mm, up to 4 mm, or up to 5 mm.

Figures 1A, 1B, 1C, 1D:
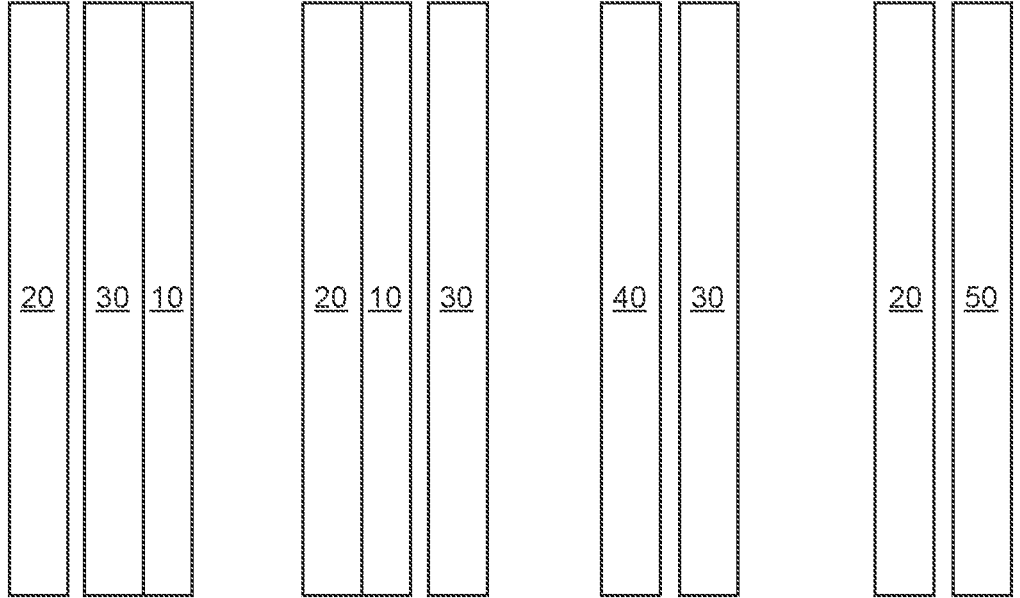
FIG. 1A shows an exemplary arrangement of the layers of a filter media including a substrate.
FIG. 1B shows an exemplary arrangement of the layers of a filter media including a substrate.
FIG. 1C shows an exemplary arrangement of the layers of a filter media including a substrate.
FIG. 1D shows an exemplary arrangement of the layers of a filter media including a substrate.

In some embodiments, a layer configured to remove particulate contaminants 20 is located upstream of a coalescing layer 30 and the coalescing layer is located upstream of the substrate 10, as shown in one embodiment, in FIG. 1A. In some embodiments, a coalescing layer is located downstream of the substrate. In some embodiments, the filter media may include at least two coalescing layers with one of the coalescing layers located downstream of the substrate.

In some embodiments, the substrate may be included in a flow-by structure including, for example, a structure as described in U.S. Patent Application No. 62/543,456, filed Aug. 10, 2017 and entitled: Fluid Filtration Apparatuses, Systems, and Methods, which is hereby incorporated by reference for its description of media structures.

In some embodiments, the filter media can be included in a filter element. The filter media can have any suitable configuration. In some embodiments, the filter element can include a screen. In some embodiments, the screen can be located downstream of the substrate.

The filter media may have any suitable configuration. For example, the filter media can have a tubular configuration. In some embodiments, the filter media can include pleats.

Methods of Making

This disclosure further describes methods of making a material. In some embodiments, the material can include a filter media including a substrate. The material, filter media, substrate, and/or a surface thereof may be treated by any suitable method to achieve the desired roll off angle and the desired contact angle. In some embodiments, treating of the material, filter media, substrate, and/or a surface thereof includes treating only a portion of the material, filter media, substrate, and/or a surface thereof.

In some embodiments, the treatment to achieve the desired roll off angle and the desired contact angle does not change the structure of the substrate. For example, in some embodiments, the treatment does not change at least one of the average diameter of the pores of the substrate and permeability of the substrate. In some embodiments, the treatment does not change the appearance of the media when viewed at 500× magnification.

Curing

In some embodiments, the substrate includes a resin (for example, a modifying resin). Resins are well known and are typically used to improve the internal bonding of filter substrates.

Any suitable resin may be used including, for example, a UV-reactive resin or a non-UV-reactive resin. The resin may include, for example, a partially-cured resin (for example, a partially-cured phenolic resin), and curing of the resin may be performed to increase the rigidity of the substrate and/or to prevent disintegration of the substrate during use. Curing may be performed prior to performing a treatment to achieve the desired roll off angle and the desired contact angle or after performing a treatment to achieve the desired roll off angle and the desired contact angle. For example, if the substrate includes a hydrophilic group-containing polymer present in a separate layer from the resin, curing of the resin may be performed prior to formation of the layer including the hydrophilic group-containing polymer or after formation of the layer including the hydrophilic group-containing polymer. In some embodiments, the resin is preferably impregnated into the substrate.

The resin can include polymerizable monomers, polymerizable oligomers, polymerizable polymers, or combinations thereof (for example, blends, mixtures, or copolymers thereof). As used herein, curing refers to hardening of the resin and can include crosslinking and/or polymerizing components of the resin. In some embodiments, the resin includes polymers, and, during curing, the molecular weight of the polymer is increased due to crosslinking of the polymers.

Curing may be performed by any suitable means including, for example, by heating the substrate. In some embodiments, curing is preferably performed by heating the substrate at a temperature and for a time sufficient to cure a resin (including, for example, a phenolic resin). In some embodiments, the substrate may be heated at a temperature of at least 50° C., at least 75° C., at least 100° C., or at least 125° C. In some embodiments, the substrate may be heated at a temperature of up to 125° C., up to 150° C., up to 175° C., or up to 200° C. In some embodiments, the substrate may be heated to a temperature having a range of 50° C. to 200° C. In some embodiments, the substrate may be heated for at least 1 minute, at least 2 minutes, at least 5 minutes, at least 7 minutes, at least 10 minutes, or at least 15 minutes. In some embodiments, the substrate may be heated for up to 8 minutes, up to 10 minutes, up to 12 minutes, up to 15 minutes, up to 20 minutes, or up to 25 minutes. In some embodiments, it may be preferred to heat the substrate at 150° C. for 10 minutes.

Methods of Treating a Substrate to Improve the Roll Off Angle

In some embodiments, the disclosure relates to methods of treating a substrate to improve the roll off angle of a surface. Without wishing to be bound by theory, the various methods disclosed are believed to improve the roll off angle by modifying the surface properties of the substrate to make the microstructure of the surface more hydrophilic, while retaining the overall hydrophobic properties of the surface to water droplets.

The various different approaches include those set out below.

UV

In some embodiments, the substrate includes a UV-treated surface, that is, a surface treated with UV radiation. In such embodiments, the substrate preferably includes an aromatic and/or unsaturated component.

For instance, the substrate may include a fibrous material having an aromatic and/or unsaturated component. In some embodiments, the substrate may include a UV-reactive resin, that is, a resin having an aromatic and/or unsaturated component. Such a UV-reactive resin may be present in addition to a fibrous material having an aromatic and/or unsaturated component, or may be used in combination with fibrous material not having an aromatic and/or unsaturated component.

In some embodiments, the substrate preferably includes an aromatic resin (that is, a resin containing aromatic groups) including, for example, a phenolic resin.

In some embodiments, the UV radiation is applied to the substrate at a distance from the source of at least 0.25 centimeters (cm), at least 0.5 cm, at least 0.75 cm, at least 1 cm, at least 1.25 cm, at least 2 cm, or at least 5 cm. In some embodiments, the UV radiation is applied to the substrate at a distance from the source of up to 0.5 cm, up to 1 cm, up to 2 cm, up to 3 cm, up to 5 cm, or up to 10 cm.

In some embodiments, the substrate is exposed to UV radiation of at least 250 microwatts per square centimeter ($\mu W/cm^2$), at least 300 $\mu W/cm^2$, at least 500 $\mu W/cm^2$, at least 1 milliwatt per square centimeter ($mW/cm^2$), at least 5 $mW/cm^2$, at least 10 $mW/cm^2$, at least 15 $mW/cm^2$, at least 20 $mW/cm^2$, at least 21 $mW/cm^2$, or at least 25 $mW/cm^2$. In some embodiments, the substrate is exposed to UV radiation of up to 20 $mW/cm^2$, up to 21 $mW/cm^2$, up to 22 $mW/cm^2$, up to 25 $mW/cm^2$, up to 30 $mW/cm^2$, up to 40 $mW/cm^2$, up to 50 $mW/cm^2$, up to 60 $mW/cm^2$, up to 70 $mW/cm^2$, up to 80 $mW/cm^2$, up to 90 $mW/cm^2$, up to 100 $mW/cm^2$, up to 150 $mW/cm^2$, or up to 200 $mW/cm^2$.

In some embodiments, for example, the substrate is exposed to UV radiation in a range of 300 $\mu W/cm^2$ to 100 $mW/cm^2$.

In some embodiments, for example, the substrate is exposed to UV radiation in a range of 300 $\mu W/cm^2$ to 200 $mW/cm^2$.

In some embodiments, the substrate is exposed to (that is, treated with) UV radiation for at least 1 second, at least 2 seconds, at least 3 seconds, at least 5 seconds, at least 10 seconds, at least 30 seconds, at least 1 minute, at least 2 minutes, at least 3 minutes, at least 4 minutes, at least 5 minutes, at least 7 minutes, at least 9 minutes, at least 10 minutes, at least 11 minutes, at least 13 minutes, at least 15 minutes, at least 17 minutes, or at least 20 minutes. In some embodiments, the substrate is exposed to UV radiation for up to 5 seconds, up to 10 seconds, up to 30 seconds, up to 1 minute, up to 2 minutes, up to 4 minutes, up to 5 minutes, up to 6 minutes, up to 8 minutes, up to 10 minutes, up to 12 minutes, up to 14 minutes, up to 15 minutes, up to 16 minutes, up to 18 minutes, up to 20 minutes, up to 22 minutes, up to 24 minutes, up to 25 minutes, up to 26 minutes, up to 28 minutes, or up to 30 minutes.

In some embodiments, the UV radiation is applied for a time in a range of 2 seconds to 20 minutes.

In some embodiments, different wavelengths of UV radiation may be applied sequentially. In some embodiments, it may be preferable to apply different wavelengths of UV radiation simultaneously.

Without wishing to be bound by theory, it is believed that the UV radiation causes an aromatic and/or unsaturated component to react and become chemically modified. This reaction increases the roll off angle of the surface while substantially retaining the contact angle properties.

It has been found that additional agents, such as those set out below, may promote the chemical reaction of aromatic and/or unsaturated components present in and/or on the substrate. These additional agents may be used individually, sequentially, and/or simultaneously during treatment of the substrate with UV.

UV+Oxygen

In some embodiments, the substrate preferably includes a UV-oxygen-treated surface, that is, a surface treated with UV radiation in the presence of oxygen. Treatment in the presence of oxygen can include at least one of, for example, treatment in atmospheric air including oxygen, treatment in an oxygen-containing environment, treatment in an oxygen-enriched environment, or treatment of a substrate that includes oxygen in or on the substrate.

In some embodiments, the substrate is preferably treated under conditions and with wavelengths of UV radiation sufficient to generate ozone and oxygen radicals. In some embodiments, the UV radiation source is preferably a low pressure mercury lamp. The UV radiation may be applied using any combination of the parameters described above with respect to treatment with UV radiation including distance, intensity, and time, and multiple wavelengths may be applied using sequential or simultaneous application.

In some embodiments, the UV radiation includes a wavelength capable of forming two oxygen radicals ($O^-$) from $O_2$. Oxygen radicals can react with $O_2$ to form ozone ($O_3$). In some embodiments, the UV radiation includes a wavelength of at least 165 nanometers (nm), at least 170 nm, at least 175 nm, at least 180 nm, or at least 185 nm. In some embodiments, the UV radiation includes a wavelength of up to 190 nm, up to 195 nm, up to 200 nm, up to 205 nm, up to 210 nm, up to 215 nm, up to 220 nm, up to 230 nm, or up to 240 nm. In some embodiments, the UV radiation includes a wavelength in a range of 180 nm to 210 nm. In some embodiments, the UV radiation includes a wavelength of 185 nm.

In some embodiments, the UV radiation includes a wavelength capable of splitting ozone ($O_3$) to form $O_2$ and an oxygen radical ($O^-$). In some embodiments, the UV radiation includes a wavelength of at least 200 nm, at least 205 nm, at least 210 nm, at least 215 nm, at least 220 nm, at least 225 nm, at least 230 nm, at least 235 nm, at least 240 nm, at least 245 nm, or at least 250 nm. In some embodiments, the UV radiation includes a wavelength of up to 260 nm, up to 265 nm, up to 270 nm, up to 275 nm, up to 280 nm, up to 285 nm, up to 290 nm, up to 295 nm, up to 300 nm, up to 310 nm, or up to 320 nm. In some embodiments, the UV radiation includes a wavelength in a range of 210 nm to 280 nm. In some embodiments, the UV radiation includes a wavelength of 254 nm.

UV+Ozone

In some embodiments, the substrate includes a UV-ozone-treated surface, that is, a surface treated with UV radiation in the presence of ozone ($O_3$). The UV radiation may be applied using any combination of the parameters described above with respect to treatment with UV radiation including distance, intensity, and time, and multiple wavelengths may be applied using sequential or simultaneous application.

Treatment in the presence of ozone can include, for example, treatment in an ozone-containing environment or treatment during the generation of ozone within the environment (for example, by corona discharge). In some embodiments, the ozone-containing environment includes $O_2$. In other embodiments the ozone-containing environment includes less than 10 percent by volume (vol.-%) $O_2$, less than 5 vol.-% $O_2$, less than 2 vol.-% $O_2$, or less than 1 vol.-% $O_2$. In some embodiments, the ozone-containing environment includes an inert gas, such as nitrogen, helium, argon, or mixtures thereof.

In some embodiments the ozone-containing environment includes at least 0.005 vol.-% $O_3$, at least 0.01 vol.-% $O_3$, at least 0.05 vol.-% $O_3$, at least 0.1 vol.-% $O_3$, at least 0.5 vol.-% $O_3$, at least 1 vol.-% $O_3$, at least 2 vol.-% $O_3$, at least 5 vol.-% $O_3$, at least 10 vol.-% $O_3$, or at least 15 vol.-% $O_3$. In some embodiments, the ozone-containing environment includes a higher concentration of ozone at the surface of the substrate. Such a concentration can be achieved by, for example, introducing the ozone at the substrate surface (for example, by allowing ozone to diffuse from the back side of the media.) In some embodiments, the concentration of ozone at or near the surface of the substrate is preferably sufficient to generate oxygen radicals from the ozone present in the presence of UV radiation.

In some embodiments, the UV radiation includes a wavelength capable of splitting ozone ($O_3$) to form $O_2$ and an oxygen radical ($O^-$). In embodiments, including, for example, when the ozone-containing environment includes less than 10 vol.-% $O_2$, less than 5 vol.-% $O_2$, less than 2 vol.-% $O_2$, or less than 1 vol.-% $O_2$, the UV radiation can include a wavelength of at least 165 nm, at least 170 nm, at least 175 nm, at least 180 nm, or at least 185 nm and of up to 260 nm, up to 265 nm, up to 270 nm, up to 275 nm, up to 280 nm, up to 285 nm, or up to 290 nm. In some embodiments, the UV radiation includes a wavelength in a range of 180 nm to 280 nm.

In embodiments when the ozone-containing environment includes $O_2$ that would absorb UV radiation in a range of 180 nm to 210 nm, the UV radiation preferably includes a wavelength of at least 210 nm, at least 215 nm, at least 220 nm, at least 225 nm, at least 230 nm, at least 235 nm, at least 240 nm, at least 245 nm, or at least 250 nm. In some embodiments, the UV radiation includes a wavelength of up to 260 nm, up to 265 nm, up to 270 nm, up to 275 nm, up to 280 nm, up to 285 nm, up to 290 nm, up to 295 nm, up to 300 nm, up to 310 nm, or up to 320 nm. In some embodiments, the UV radiation includes a wavelength in a range of 210 nm to 280 nm. In some embodiments, the UV radiation includes a wavelength of 254 nm.

UV+$H_2O_2$

In some embodiments, the substrate includes a UV-$H_2O_2$-treated surface, that is, a surface treated with UV radiation and $H_2O_2$. In some embodiments, the surface of the substrate and/or the entire substrate may be placed in contact with (for example, coated with and/or submerged in) a solution including $H_2O_2$. In some embodiments, the solution can include at least 20 percent by weight (wt.-%) $H_2O_2$, at least 25 wt.-% $H_2O_2$, at least 30 wt.-% $H_2O_2$, at least 40 wt.-% $H_2O_2$, at least 50 wt.-% $H_2O_2$, at least 60 wt.-% $H_2O_2$, at least 70 wt.-% $H_2O_2$, at least 80 wt.-% $H_2O_2$, or at least 90 wt.-% $H_2O_2$. In some embodiments, the solution can contain up to 30 wt.-% $H_2O_2$, up to 40 wt.-% $H_2O_2$, up to 50 wt.-% $H_2O_2$, up to 60 wt.-% $H_2O_2$, up to 70 wt.-% $H_2O_2$, up to 80 wt.-% $H_2O_2$, up to 90 wt.-% $H_2O_2$, or up to 100 wt.-% $H_2O_2$.

In some embodiments, the substrate may be placed in contact with a solution including $H_2O_2$ for at least 10 seconds, at least 30 seconds, at least 45 seconds, at least 1 minute, at least 2 minutes, at least 4 minutes, at least 6 minutes, or at least 8 minutes. In some embodiments, the substrate may be in contact with a solution including $H_2O_2$ for up to 30 seconds, up to 45 seconds, up to 1 minute, up to 2 minutes, up to 4 minutes, up to 6 minutes, up to 8 minutes, up to 10 minutes, or up to 30 minutes.

In some embodiments, the substrate may be treated with UV radiation while in contact with a solution including $H_2O_2$. In some embodiments, the substrate may be treated with UV radiation after being in contact with a solution including $H_2O_2$. The UV radiation may be applied using any combination of the parameters described above with respect to treatment with UV radiation including distance, intensity, and time, and multiple wavelengths may be applied using sequential or simultaneous application.

The substrate may be treated with UV radiation sufficient to generate hydroxyl radicals ($^-OH$). The substrate may be treated with UV radiation while the surface is in contact with $H_2O_2$, after the surface has been in contact with $H_2O_2$, or both during contact and after contact with $H_2O_2$.

In some embodiments, the UV radiation includes a wavelength capable of forming two oxygen radicals ($O^-$) from $O_2$. Oxygen radicals can react with $O_2$ to form ozone ($O_3$). In some embodiments, the UV radiation includes a wavelength of at least 165 nm, at least 170 nm, at least 175 nm, at least 180 nm, or at least 185 nm. In some embodiments, the UV radiation includes a wavelength of up to 190 nm, up to 195 nm, up to 200 nm, up to 205 nm, up to 210 nm, up to 215 nm, up to 220 nm, up to 230 nm, or up to 240 nm. In some embodiments, the UV radiation includes a wavelength in a range of 180 nm to 210 nm. In some embodiments, the UV radiation includes a wavelength of 185 nm.

In some embodiments, the UV radiation includes a wavelength capable of splitting ozone ($O_3$) to form $O_2$ and an oxygen radical ($O^-$). In some embodiments, the UV radiation includes a wavelength of at least 200 nm, at least 205 nm, at least 210 nm, at least 215 nm, at least 220 nm, at least 225 nm, at least 230 nm, at least 235 nm, at least 240 nm, at least 245 nm, or at least 250 nm. In some embodiments, the UV radiation includes a wavelength of up to 260 nm, up to 265 nm, up to 270 nm, up to 275 nm, up to 280 nm, up to 285 nm, up to 290 nm, up to 295 nm, up to 300 nm, up to 310 nm, or up to 320 nm. In some embodiments, the UV radiation includes a wavelength in a range of 210 nm to 280 nm. In some embodiments, the UV radiation includes a wavelength of 254 nm.

In some embodiments, the UV radiation includes a wavelength of at least 200 nm, at least 250 nm, at least 300 nm, at least 330 nm, at least 340 nm, at least 350 nm, at least 355 nm, at least 360 nm, or at least 370 nm. In some embodiments, the UV radiation includes a wavelength of up to 350 nm, up to 360 nm, up to 370 nm, up to 375 nm, up to 380 nm, up to 385 nm, up to 390 nm, up to 395 nm, up to 400 nm, up to 410 nm, or up to 420 nm. In some embodiments, the UV radiation includes a wavelength in a range of 350 nm to 370 nm. In some embodiments, the UV radiation includes a wavelength of 360 nm.

In some embodiments, a substrate may be dried after being placed in contact with a solution including $H_2O_2$ and before being treated with UV. In some embodiments, a substrate may be dried after being placed in contact with a solution including $H_2O_2$ and after being treated with UV. In some embodiments, the substrate may be oven dried.

The UV treatment (whether UV alone or UV with oxygen, ozone, and/or hydrogen peroxide) is more effective when the substrate includes an aromatic and/or unsaturated component, including, for example, when the substrate includes a UV-reactive resin including, for example, an aromatic resin (for example, a resin containing aromatic groups) including, for example, a phenolic resin.

Substrate Including a Hydrophilic Group-Containing Polymer

As an alternative or in addition to UV treatment, the surface properties of the substrate may be modified by the inclusion of a hydrophilic group-containing polymer in and/or on the substrate. In some embodiments when both UV treatment and inclusion of a hydrophilic group-containing polymer are used, it may be preferred to include a hydrophilic group-containing polymer in a substrate or to modify a substrate to include a hydrophilic group-containing polymer prior to UV treatment.

In some embodiments, the substrate includes a hydrophilic group-containing polymer. The hydrophilic group of the hydrophilic group-containing polymer can include a hydrophilic pendant group or a hydrophilic group that repeats within the polymer backbone or both. As used herein, a "pendant group" is covalently bound to the polymer backbone but does not form a part of the polymer backbone. In some embodiments, the hydrophilic group includes at least one of a hydroxy, an amide, an alcohol, an acrylic acid, a pyrrolidone, a methyl ether, an ethylene glycol, a propylene glycol, dopamine, and an ethylene imine. In some embodiments, a hydrophilic pendant group includes at least one of a hydroxy, an amide, an alcohol, an acrylic acid, a pyrrolidone, a methyl ether, and dopamine. In some embodiments, a hydrophilic group that repeats within the polymer backbone includes at least one of an ethylene glycol, a propylene glycol, dopamine, and an ethylene imine.

In some embodiments, a substrate including a hydrophilic group-containing polymer may include a surface having a hydrophilic group-containing polymer disposed thereon. In some embodiments, the substrate preferably includes a layer including a hydrophilic group-containing polymer. In some embodiments, the surface having the hydrophilic group-containing polymer disposed thereon or, in some embodiments, the hydrophilic group-containing polymer-containing layer, preferably forms the surface of the substrate having the desired properties (including roll off angle and contact angle), as described herein.

The layer may be formed using any suitable method. For example, the layer could be formed by applying a polymer including, for example, a pre-polymerized polymer. Additionally or alternatively, the layer could be formed by applying monomers, oligomers, polymers, or combinations thereof (for example, blends, mixtures, or copolymers thereof) and then polymerizing the monomers, oligomers, polymers, or combinations thereof to form a polymer, copolymer, or combination thereof. In some embodiments, a polymer may be deposited from a solution using oxidative or reductive polymerization.

In some embodiments, the layer may be formed using any suitable coating process including, for example, plasma-deposition coating, roll-to-roll coating, dip coating, and/or spray coating. Spray coating may include, for example, air pressure spraying, electrostatic spraying, etc. In some embodiments, the surface may be laminated. In some embodiments, the layer may be formed by spinning a polymer onto the substrate. Spinning a polymer onto the substrate may include, for example, electrospinning the polymer onto the substrate or depositing the polymer on the substrate by wet spinning, dry spinning, melt spinning, gel spinning, jet spinning, magnetospinning, etc. The spinning of the polymer onto the substrate may, in some embodiments, form polymer nanofibers. Additionally or alternatively, spinning of the polymer onto the substrate may coat fibers already present in the substrate. In some embodiments, including wherein the polymer is deposited by dry spinning polymer solution onto the substrate, one or more driving forces including air, an electric field, centrifugal force, a magnetic field, etc., may be used individually or in combination.

In some embodiments, the hydrophilic group-containing polymer includes polar functional groups.

In some embodiments, the hydrophilic group-containing polymer is a hydrophilic polymer.

In some embodiments, the hydrophilic group-containing polymer is not able to dissolve in water (for example, it is not a hydrophilic polymer) but rather includes at least one of a pendant group able to dissolve in water (for example, a hydrophilic pendant group) or a group that repeats within the polymer backbone that is able to dissolve in water (for example, a hydrophilic group that repeats within the polymer backbone).

In some embodiments, the hydrophilic group-containing polymer includes a hydroxylated methacrylate polymer. In some embodiments, the hydrophilic group-containing polymer does not include a fluorine group.

In some embodiments, the hydrophilic group-containing polymer does not include a fluoropolymer. As used herein, a fluoropolymer refers to a polymer that includes at least 5% fluorine, at least 10% fluorine, at least 15% fluorine, or at least 20% fluorine.

In some embodiments, the hydrophilic group-containing polymer can include, for example, poly(hydroxypropyl methacrylate) (PHPM) including poly(2-hydroxypropyl methacrylate, poly(3-hydroxypropyl methacrylate, or a mixture thereof; poly(2-hydroxyethyl methacrylate) (PHEM); poly(2-ethyl-2-oxazoline) (P2E2O); polyethyleneimine (PEI); quaternized polyethyleneimine; or poly(dopamine); or combinations thereof (for example, blends, mixtures, or copolymers thereof).

In some embodiments, the hydrophilic group-containing polymer can be dispersed and/or dissolved in a solvent during layer formation. In some embodiments, the solvent preferably solubilizes the hydrophilic group-containing polymer but does not solubilize the substrate or any component of the substrate. In some embodiments, the solvent is preferably non-toxic. In some embodiments, the hydrophilic group-containing polymer is preferably insoluble in a hydrocarbon fluid. In some embodiments, the hydrophilic group-containing polymer is preferably insoluble in toluene.

In some embodiments, the solvent is a solvent having a high dielectric constant. The solvent can include, for example, methanol, ethanol, propanol, isopropanol (also called isopropyl alcohol (IPA)), butanol (including each of its isomeric structures), butanone (including each of its isomeric structures), acetone, ethylene glycol, dimethyl formamide, ethyl acetate, water, etc.

The concentration of the hydrophilic group-containing polymer in the solvent can be selected based on the molecular weight of the polymer. In some embodiments, the hydrophilic group-containing polymer may be present in the solvent at a concentration of at least 0.25 percent (%) weight/volume (w/v), at least 0.5% (w/v), at least 0.75% (w/v), at least 1.0% (w/v), at least 1.25% (w/v), at least 1.5% (w/v), at least 1.75% (w/v), at least 2.0% (w/v), at least 3% (w/v), at least 5% (w/v), at least 10% (w/v), at least 20% (w/v), at least 30% (w/v), at least 40% (w/v), or at least 50% (w/v). In some embodiments, the hydrophilic group-containing polymer may be present in the solvent at a concentration of up to 0.5% (w/v), up to 0.75% (w/v), up to 1.0% (w/v), up to 1.25% (w/v), up to 1.5% (w/v), up to 1.75% (w/v), up to 2.0% (w/v), up to 3% (w/v), up to 4% (w/v), up to 5% (w/v), up to 10% (w/v), up to 15% (w/v), up to 20% (w/v), up to 30% (w/v), up to 40% (w/v), up to 50% (w/v), or up to 60% (w/v).

In some embodiments, including, for example, for depositing the hydrophilic group-containing polymer by dip coating, the polymer may be present in the solvent at a concentration in a range of 0.5% (w/v) to 4% (w/v).

In some embodiments, including, for example, for depositing the hydrophilic group-containing polymer by dip coating, the polymer may be present in the solvent at a concentration in a range of 0.5% (w/v) to 1% (w/v).

In some embodiments, including, for example, for depositing the hydrophilic group-containing polymer by electrospinning, the polymer may be present in the solvent at a concentration in a range of 5% (w/v) to 30% (w/v).

In some embodiments, the layer may be formed using dip coating. The dip coating can be accomplished by using, for example, a Chemat DipMaster 50 dip coater. In some embodiments, the layer may be formed by dip coating the substrate one, two, three, or more times. In some embodiments, the substrate may be dip coated, rotated 180 degrees, and dip coated again. In some embodiments, the substrate may be submerged in a dispersion including the hydrophilic group-containing polymer and withdrawn at a rate of 50 millimeters per minute (mm/min). In some embodiments, the dispersion is preferably a solution.

In some embodiments, the layer may be formed using electrospinning. The electrospinning may be accomplished as described, for example, in US20160047062 A1.

In some embodiments, including, for example, when the hydrophilic group-containing polymer includes poly(dopamine), the hydrophilic group-containing polymer may be deposited from a solution using oxidative or reductive polymerization. For example, a layer including poly(dopamine) may be prepared from the oxidative polymerization of dopamine.

In some embodiments, the layer including a hydrophilic group-containing polymer has a thickness of at least 0.5 Angstrom (Å), at least 1 Å, at least 5 Å, at least 8 Å, at least 10 Å, at least 12 Å, at least 14 Å, at least 16 Å, at least 18 Å, at least 20 Å, at least 25 Å, at least 30 Å, or at least 50 Å.

In some embodiments, solvent may be removed after layer formation including, for example, after a dip coating procedure. The solvent may be removed, for example, by evaporation including, for example, by drying using an oven.

In some embodiments, a charged coating may be formed (for example, via quaternization, electrochemical oxidation, or reduction) and/or the coating may include a charged polymer. In some embodiments, the layer including a hydrophilic group-containing polymer may be altered after formation of the layer. For example, the hydrophilic group-containing polymer may be quaternized. In some embodiments, the hydrophilic group-containing polymer can be quaternized by treating the polymer layer with an acid. In some embodiments, the hydrophilic group-containing polymer can be quaternized by dipping the substrate including the hydrophilic group-containing polymer layer in a solution including an acid. In some embodiments, the acid can be HCl.

In some embodiments, the hydrophilic group-containing polymer and/or the coating may be treated with maleic anhydride.

In some embodiments, the substrate may include a hydrophilic group-containing polymer disposed therein. If the substrate includes a modifying resin, the polymer is chemically distinct from the modifying resin. In some embodiments, the hydrophilic group-containing polymer may be applied simultaneously with a modifying resin. For example, the hydrophilic group-containing polymer may be mixed with a modifying resin before the modifying resin is applied to the substrate.

In some embodiments, the hydrophilic group-containing polymer may be crosslinked. In some embodiments, including, for example, when the polymer forms a hydrophilic group-containing polymer forms layer on a substrate, the polymer may be crosslinked by including a crosslinker in the polymer dispersion used for coating or electrospinning. In some embodiments, including, for example, when the polymer is disposed within a substrate, the hydrophilic group-containing polymer may be crosslinked by including a crosslinker in a dispersion used to introduce the hydrophilic group-containing polymer. In some embodiments, the dispersion is preferably a solution.

Any suitable crosslinker for use with the hydrophilic group-containing polymer may be selected. For example, N-(2-Aminoethyl)-3-aminopropyltrimethoxysilane (DAMO-T) may be used as a crosslinker for PHEM. For example, (3-glycidyloxypropyl) trimethoxy silane or poly (ethylene glycol) diacrylate (PEGDA) may be used as a crosslinker for polyethyleneimine (PEI). Hydrophilic group-containing polymers including primary or secondary amine groups could be crosslinked by, for example, compounds including carboxylic acids (adipic acid), aldehydes (for example, gluteraldehyde), ketones, melamine-formaldehyde resins, phenol-formaldehyde resins, etc. In another example, hydrophilic group-containing polymers containing primary or secondary alcohol groups could be crosslinked by, for example, compounds including carboxylic acids (adipic acid), isocyanates (toluene diisocyanate), organic silanes (tetramethoxysilane), titanium(IV) complexes (tetrabutyltitanate), phenol-formaldehyde resins, melamine-formaldehyde resins, etc.

In some embodiments, crosslinking of the hydrophilic group-containing polymer may accelerated by exposing the hydrophilic group-containing polymer and the crosslinker to heat. The heat may be applied by any suitable method including, for example, by heating the substrate in an oven, exposing the substrate to an infrared light, exposing the substrate to steam, or treating the substrate with heated rollers. Any combination of time and temperature suitable for use with the hydrophilic group-containing polymer, crosslinker, and substrate may be used. In some embodiments, the hydrophilic group-containing polymer and the crosslinker may be exposed to temperatures of at least 80° C., at least 90° C., at least 100° C., at least 110° C., at least 120° C., at least 130° C., at least 140° C., at least 150° C., at least 160° C., at least 170° C., at least 180° C., or at least 190° C. In some embodiments, the hydrophilic group-containing polymer and the crosslinker may be exposed to temperatures of up to 140° C., up to 150° C., up to 160° C., up to 170° C., up to 180° C., up to 190° C., up to 200° C., up to 210° C., up to 220° C., up to 230° C., up to 240° C., up to 260° C., up to 280° C., or up to 300° C. In some embodiments, the hydrophilic group-containing polymer and the crosslinker may be exposed to a heat treatment for at least 15 seconds, at least 30 seconds, at least 60 seconds, at least 120 seconds, at least 2 minutes, at least 5 minutes, at least 10 minutes, or at least 1 hour. In some embodiments, the media is exposed to heat for up to 2 minutes, up to 3 minutes, up to 5 minutes, up to 10 minutes, up to 15 minutes, up to 20 minutes, up to 1 hour, up to 2 hours, up to 24 hours, or up to 2 days. For example, in some embodiments, the hydrophilic group-containing polymer may be crosslinked by heating the hydrophilic group-containing polymer and the crosslinker at a temperature of at least 100° C. and up to 150° C. for between 15 seconds and 15 minutes. In another example, in some embodiments, the hydrophilic group-containing polymer may be crosslinked by heating the hydrophilic group-containing polymer and the crosslinker at a temperature of at least 80° C. and up to 200° C. for between 15 seconds and 15 minutes.

In some embodiments, the hydrophilic group-containing polymer may be annealed. As used herein, "annealing" includes exposing a hydrophilic group-containing polymer to an environment with the purpose of reorienting functional groups within the hydrophilic group-containing polymer and/or increasing the crystallinity of the hydrophilic group-containing polymer. If crosslinking of the hydrophilic group-containing polymer is accelerated by exposing the hydrophilic group-containing polymer and the crosslinker to heat, the hydrophilic group-containing polymer may be annealed before crosslinking, during crosslinking, or after crosslinking. In some embodiments, if crosslinking of the hydrophilic group-containing polymer is accelerated by exposing the hydrophilic group-containing polymer and the crosslinker to heat, the hydrophilic group-containing polymer may preferably be annealed during crosslinking or after crosslinking. In some embodiments, the hydrophilic group-containing polymer may preferably be annealed after cross-linking.

In some embodiments, annealing includes heating the substrate including the hydrophilic group-containing polymer in the presence of a polar solvent. For example, annealing may include submerging a hydrophilic group-containing polymer-containing and/or a hydrophilic group-containing polymer-coated substrate in a polar solvent. Additionally or alternatively, annealing may include exposing a hydrophilic group-containing polymer-containing and/or a hydrophilic group-containing polymer-coated substrate to a polar solvent in the form of steam. In some embodiments, including, for example, when a hydrophilic group-containing polymer layer is applied by dip coating a substrate in a polymer solution, the polymer solution may include a polar solvent, and heating and subsequent evaporation of the polar solvent from the substrate may anneal the polymer layer.

A polar solvent suitable for annealing may include, for example, water or an alcohol. An alcohol may include, for example, methanol, ethanol, isopropanol, t-butanol, etc. Other suitable polar solvents may include, for example, acetone, ethyl acetate, methyl ethyl ketone (MEK), dimethylformamide (DMF), etc.

In some embodiments, annealing includes exposing the substrate to a temperature of at least the glass transition temperature (Tg) of the hydrophilic group-containing polymer. In some embodiments, annealing includes exposing the substrate to a solvent having a temperature of at least the Tg of the hydrophilic group-containing polymer.

In some embodiments, including for example, when annealing includes submerging the hydrophilic group-containing polymer-coated substrate in a polar solvent, the polar solvent is at least 50° C., at least 55° C., at least 60° C., at least 65° C., at least 70° C., at least 75° C., at least 80° C., at least 85° C., at least 90° C., at least 95° C., at least 100° C., at least 110° C., at least 120° C., at least 130° C., at least 140° C., or at least 150° C. In some embodiments, the polar solvent is up to 90° C., up to 95° C., up to 100° C., up to 105° C., up to 110° C., up to 115° C., up to 120° C., up to 130° C., up to 140° C., up to 150° C., or up to 200° C. In some embodiments, the media is submerged in the polar solvent for at least 10 seconds, at least 30 seconds, at least 60 seconds, at least 90 seconds, at least 120 seconds, at least 150 seconds, or at least 180 seconds. In some embodiments, the media is submerged in the polar solvent for up to 60 seconds, up to 120 seconds, up to 150 seconds, up to 180 seconds, up to 3 minutes, or up to 5 minutes. In some embodiments, the polar solvent may preferably be water. For example, in some embodiments, annealing includes submerging the hydrophilic group-containing polymer-coated media in 90° C. water for at least 10 seconds and up to 5 minutes.

Without wishing to be bound by theory, it is believed that the surface of the substrate having a hydrophilic group-containing polymer disposed thereon or including a hydrophilic group-containing polymer disposed therein may have the desired properties (including roll off angle and contact angle), described above, because of discontinuities on the substrate surface. Accordingly, in some embodiments, the substrate may include a mixture of fibers. In some embodiments, the substrate may include both non-polymer and polymer fibers and/or two different types of polymer fibers. For example, the substrate could include, polyester fibers discontinuously wrapped with nylon and/or nylon fibers discontinuously wrapped with polyester. Additionally or alternatively, the substrate may include a fiber that, if it formed the entire surface, would create a hydrophilic surface and a fiber that, if it formed the entire surface, would create a hydrophobic surface.

In some embodiments, a substrate including a hydrophilic group-containing polymer—including a substrate including a hydrophilic group-containing polymer coating or a substrate including a hydrophilic group-containing polymer disposed therein—is preferably stable. In some embodiments, the stability of a substrate including a hydrophilic group-containing polymer may be increased by treating with maleic anhydride, annealing the hydrophilic group-containing polymer, and/or crosslinking the hydrophilic group-containing polymer. Without wishing to be bound by theory, in some embodiments, stability of a substrate including a hydrophilic group-containing polymer is believed to be increased by decreasing the solubility of the hydrophilic group-containing polymer—including, for example, by crosslinking. Again, without wishing to be bound by theory, in some embodiments, it is believed that the stability of a substrate may to be increased by increasing the accessibility of a polymer's hydrophilic pendant group (for example, a hydroxyl group) on a surface of a substrate—including, for example, by annealing.

Treated Substrates and Uses

In some embodiments, the disclosure relates to a filter media including a substrate obtainable by a method that includes exposing a surface of the substrate to UV radiation. The substrate includes at least one of an aromatic component and an unsaturated component.

In some embodiments, the surface of the substrate, prior to treatment, preferably has a contact angle of at least 90 degrees, as further described herein.

In some embodiments, exposing a surface of the substrate to UV radiation includes exposing the surface to UV radiation in the presence of oxygen, as further described herein. In some embodiments, exposing a surface of the substrate to UV radiation includes exposing the surface to UV radiation and at least one of $H_2O_2$ and ozone, as further described herein. In some embodiments, the substrate includes a UV-reactive resin, that is, a resin including at least one of an aromatic component and an unsaturated component. In some embodiments, the UV-reactive resin includes a phenolic resin.

In some embodiments, the disclosure relates to a filter media including a substrate obtainable by a method that includes disposing a hydrophilic group-containing polymer on a surface of the substrate.

In some embodiments, the surface of the substrate, prior to treatment, preferably has a contact angle of at least 90 degrees, as further described herein.

In some embodiments, the disclosure relates to the use of UV radiation to improve the roll off angle of a surface of a substrate, the substrate including at least one of an aromatic component and an unsaturated component.

In some embodiments, the use is characterized by the substrate including an aromatic resin.

In some embodiments, the use is characterized by the substrate including a phenolic resin.

In some embodiments, the use is characterized by the use of UV radiation in the presence of at least one of oxygen, ozone, and $H_2O_2$.

In some embodiments, the disclosure relates to the use of a substance obtainable by exposure of at least one of an aromatic component and an unsaturated component to UV radiation to improve the roll off angle of a substrate.

In some embodiments, the use relates to a use of a substance obtainable by exposure of a UV-reactive resin to UV radiation to improve the roll off angle of a substrate.

In some embodiments, the use relates to a use of a substance obtainable by exposure of an aromatic resin to UV radiation to improve the roll off angle of a substrate.

In some embodiments, the use relates to a use of a substance obtainable by exposure of a phenolic resin to UV radiation to improve the roll off angle of a substrate.

In some embodiments, the use is characterized by exposure to UV radiation in the presence of at least one of oxygen, ozone, and $H_2O_2$.

The disclosure also relates to the use of a hydrophilic group-containing polymer to improve the roll off angle of a substrate.

The disclosure further relates to the use of a hydrophilic polymer to improve the roll off angle of a substrate.

In some embodiments of these uses, the substrate is preferably a filter substrate, including, for instance, a filter substrate having a contact angle in a range of 90 degrees to 180 degrees for a 20 μL water droplet when the surface is immersed in toluene, as further described herein.

In some embodiments of these uses, the substrate is preferably a filter substrate, including, for instance, a filter substrate having a contact angle in a range of 90 degrees to 180 degrees for a 50 μL water droplet when the surface is immersed in toluene, as further described herein.

Exemplary Filter Media Embodiments

Embodiment 1

A filter media comprising a substrate, wherein the substrate comprises a surface having a roll off angle in a range of 50 degrees to 90 degrees and a contact angle in a range of 90 degrees to 180 degrees for a 20 μL water droplet when the surface is immersed in toluene.

Embodiment 2

The filter media of embodiment 1, wherein the surface has a roll off angle in a range of 60 degrees to 90 degrees, in a range of 70 degrees to 90 degrees, or in a range of 80 degrees to 90 degrees.

Embodiment 3

A filter media comprising a substrate, wherein the substrate comprises a surface having a roll off angle in a range of 40 degrees to 90 degrees and a contact angle in a range of 90 degrees to 180 degrees for a 50 μL water droplet when the surface is immersed in toluene.

Embodiment 4

The filter media of embodiment 3, wherein the surface has a roll off angle in a range of 50 degrees to 90 degrees, in a range of 60 degrees to 90 degrees, in a range of 70 degrees to 90 degrees, or in a range of 80 degrees to 90 degrees.

Embodiment 5

The filter media of any one of embodiments 1 to 4, wherein the surface comprises a UV-treated surface.

Embodiment 6

The filter media of any one of any one of embodiments 1 to 5, wherein the surface comprises a UV-oxygen-treated surface.

Embodiment 7

The filter media of any one of any one of embodiments 1 to 6, wherein the surface comprises a UV-ozone-treated surface.

Embodiment 8

The filter media of any one of any one of embodiments 1 to 7, wherein the surface comprises a UV-$H_2O_2$-treated surface.

Embodiment 9

The filter media of any one of embodiments 1 to 8, wherein the substrate comprises a hydrophilic group-containing polymer.

Embodiment 10

The filter media of any one of embodiments 1 to 9, wherein the surface comprises a hydrophilic group-containing polymer disposed thereon.

Embodiment 11

The filter media of either of embodiments 9 or 10, wherein the hydrophilic group-containing polymer comprises a hydrophilic pendant group.

Embodiment 12

The filter media of any one of embodiments 9 to 11, wherein the hydrophilic group-containing polymer comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 13

The filter media of any one of embodiments 9 to 12, wherein the hydrophilic group-containing polymer comprises a hydrophilic polymer.

Embodiment 14

The filter media of any one of embodiments 9 to 13, wherein the hydrophilic group-containing polymer comprises a charged polymer.

Embodiment 15

The filter media of any one of embodiments 9 to 14, wherein the hydrophilic group-containing polymer comprises a hydroxylated methacrylate polymer.

Embodiment 16

The filter media of any one of embodiments 9 to 15, wherein the hydrophilic group-containing polymer does not comprise a fluoropolymer.

Embodiment 17

A filter media comprising a substrate,
wherein the substrate comprises a surface having a roll off angle in a range of 50 degrees to 90 degrees and a contact angle in a range of 90 degrees to 180 degrees for a 20 μL water droplet when the surface is immersed in toluene; and wherein the surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 18

The filter media of embodiment 17, wherein the surface has a roll off angle in a range of 60 degrees to 90 degrees, in a range of 70 degrees to 90 degrees, or in a range of 80 degrees to 90 degrees.

Embodiment 19

A filter media comprising a substrate,
wherein the substrate comprises a surface having a roll off angle in a range of 40 degrees to 90 degrees and a contact angle in a range of 90 degrees to 180 degrees for a 50 μL water droplet when the surface is immersed in toluene; and
wherein the surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 20

The filter media of embodiment 19, wherein the surface has a roll off angle in a range of 50 degrees to 90 degrees, in a range of 60 degrees to 90 degrees, in a range of 70 degrees to 90 degrees, or in a range of 80 degrees to 90 degrees.

Embodiment 21

The filter media of any one of embodiments 1 to 20, wherein the substrate comprises cellulose, polyester, polyamide, polyolefin, glass, or a combination thereof.

Embodiment 22

The filter media of any one of embodiments 1 to 21, wherein the substrate comprises at least one of an aromatic component and an unsaturated component.

Embodiment 23

The filter media of any one of any one of embodiments 1 to 22, wherein the substrate comprises a modifying resin.

Embodiment 24

The filter media of any one of any one of embodiments 1 to 23, wherein the substrate comprises a UV-reactive resin.

Embodiment 25

The filter media of any one of any one of embodiments 1 to 24, wherein the substrate comprises a phenolic resin.

Embodiment 26

The filter media of any one of embodiments 1 to 25, wherein the substrate comprises pores having an average diameter of up to 2 mm.

Embodiment 27

The filter media of any one of embodiments 1 to 26, wherein the substrate comprises pores having an average diameter in a range of 40 μm to 50 μm.

Embodiment 28

The filter media of any one of embodiments 1 to 27, wherein the substrate is at least 15% porous and up to 99% porous.

Embodiment 29

The filter media of any one of embodiments 1 to 28, wherein the filter media further comprises a coalescing layer located upstream of the substrate.

Embodiment 30

The filter media of embodiment 29, wherein the coalescing layer comprises pores having an average diameter and the substrate comprises pores having an average diameter, and the average diameter of the pores of the substrate is greater than the average diameter of the pores of the coalescing layer.

Embodiment 31

The filter media of either of embodiments 29 or 30, wherein the substrate comprises pores having an average diameter, and wherein a droplet having an average diameter forms on a downstream side of the coalescing layer, and further wherein the average diameter of the pores of the substrate is greater than the average diameter of the droplet.

Embodiment 32

The filter media of any one of embodiments 1 to 31, wherein the substrate is stable.

Exemplary Method of Treatment Embodiments

Embodiment 1

A method of treating a material comprising a surface, the method comprising
treating the surface to form a treated surface,
wherein the treated surface has a roll off angle in a range of 50 degrees to 90 degrees and a contact angle in a range of 90 degrees to 180 degrees for a 20 μL water droplet when the surface is immersed in toluene.

Embodiment 2

The method of embodiment 1, wherein the treated surface has a roll off angle in a range of 60 degrees to 90 degrees, in a range of 70 degrees to 90 degrees, or in a range of 80 degrees to 90 degrees.

Embodiment 3

A method of treating a material comprising a surface, the method comprising
treating the surface to form a treated surface,
wherein the treated surface has a roll off angle in a range of 40 degrees to 90 degrees and a contact angle in a range of 90 degrees to 180 degrees for a 50 μL water droplet when the surface is immersed in toluene.

Embodiment 4

The method of embodiment 3, wherein the treated surface has a roll off angle in a range of 50 degrees to 90 degrees, in a range of 60 degrees to 90 degrees, in a range of 70 degrees to 90 degrees, or in a range of 80 degrees to 90 degrees.

Embodiment 5

The method of any one of embodiments 1 to 4, wherein treating the surface comprises exposing the surface to ultraviolet (UV) radiation.

Embodiment 6

The method of embodiment 5, wherein treating the surface comprises exposing the surface to ultraviolet (UV) radiation in the presence of oxygen, and wherein the UV radiation comprises a first wavelength in a range of 180 nm to 210 nm and a second wavelength in a range of 210 nm to 280 nm.

Embodiment 7

The method of any one of embodiments 1 to 6, wherein the UV radiation comprises a wavelength of 185 nm.

Embodiment 8

The method of any one of embodiments 1 to 7, wherein the UV radiation comprises a wavelength of 254 nm.

Embodiment 9

The method of any one of embodiments 1 to 8, wherein treating the surface comprises exposing the surface to $H_2O_2$.

Embodiment 10

The method of any one of embodiments 1 to 9, wherein treating the surface comprises exposing the surface to ultraviolet (UV) radiation comprising a wavelength in a range of 350 nm to 370 nm.

Embodiment 11

The method of any one of embodiments 1 to 10, wherein treating the surface comprises exposing the surface to ultraviolet (UV) radiation in the presence of ozone.

Embodiment 12

The method of any one of embodiments 1 to 11, wherein treating the surface comprises exposing the surface to UV radiation in a range of 300 μW/cm$^2$ to 200 mW/cm$^2$.

Embodiment 13

The method of any one of embodiments 1 to 12, wherein treating the surface comprises exposing the surface to UV radiation for a time in a range of 2 seconds to 20 minutes.

Embodiment 14

The method of any one of embodiments 1 to 13, wherein treating the surface comprises forming a layer comprising a hydrophilic group-containing polymer on the surface.

Embodiment 15

The method of embodiment 14, wherein the hydrophilic group-containing polymer comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 16

The method of either of embodiments 14 or 15, wherein the hydrophilic group-containing polymer comprises a hydrophilic polymer.

Embodiment 17

The method of any one of embodiments 14 to 16, wherein the hydrophilic group-containing polymer comprises a hydrophilic pendant group.

Embodiment 18

The method of any one of embodiments 14 to 17, wherein the hydrophilic group-containing polymer comprises a hydroxylated methacrylate polymer.

Embodiment 19

The method of any one of embodiments 14 to 18, wherein the hydrophilic group-containing polymer does not comprise a fluoropolymer.

Embodiment 20

The method of any one of embodiments 14 to 19, wherein the layer comprises a charged layer.

Embodiment 21

The method of any one of embodiments 14 to 20, wherein forming a layer comprising a hydrophilic group-containing polymer comprises dip coating the material in a solution comprising the hydrophilic group-containing polymer.

Embodiment 22

The method of embodiment 21, wherein the solution comprising the hydrophilic group-containing polymer further comprises a crosslinker.

Embodiment 23

The method of embodiment 22, wherein the crosslinker comprises at least one of N-(2-Aminoethyl)-3-aminopropyltrimethoxysilane (DAMO-T), 3-glycidyloxypropyl) trimethoxy silane and poly (ethylene glycol) diacrylate (PEGDA).

Embodiment 24

The method of any one of embodiments 14 to 20, wherein forming a layer comprising a hydrophilic group-containing polymer on the surface comprises electrospinning a solution comprising a hydrophilic group-containing polymer onto the surface.

Embodiment 25

The method of embodiment 24, the method further comprising forming nanofibers comprising the hydrophilic group-containing polymer on the surface.

Embodiment 26

The method of either of embodiments 24 or 25, wherein the solution comprising a hydrophilic group-containing polymer further comprises a crosslinker.

Embodiment 27

The method of embodiment 26, wherein the crosslinker comprises at least one of N-(2-Aminoethyl)-3-aminopropyltrimethoxysilane (DAMO-T), 3-glycidyloxy propyl) trimethoxy silane and poly (ethylene glycol) diacrylate (PEGDA).

Embodiment 28

The method of any one of embodiments 14 to 27, the method further comprising crosslinking the hydrophilic group-containing polymer.

Embodiment 29

The method of Embodiment 28, wherein crosslinking the hydrophilic group-containing polymer comprises heating the hydrophilic group-containing polymer-coated material at a temperature in a range of 80° C. to 200° C. for 30 seconds to 15 minutes.

Embodiment 30

The method of any one of embodiments 14 to 29, the method further comprising annealing the hydrophilic group-containing polymer.

Embodiment 31

The method of Embodiment 30, wherein annealing the hydrophilic group-containing polymer comprises submerging the hydrophilic group-containing polymer-coated material in a solvent for at least 10 seconds, wherein the temperature of the solvent is at least the glass transition temperature of the hydrophilic group-containing polymer.

Embodiment 32

The method of any one of embodiments 1 to 31, wherein the material comprises a filter media.

Embodiment 33

The method of embodiment 32, wherein the filter media comprises a substrate.

Embodiment 34

The method of any one of embodiments 1 to 33, wherein the material comprises cellulose, polyester, polyamide, polyolefin, glass, or a combination thereof.

Embodiment 35

The method of any one of embodiments 1 to 34, wherein the material comprises a at least one of an aromatic component and an unsaturated component.

Embodiment 36

The method of any one of embodiments 1 to 35, wherein the material comprises a modifying resin.

Embodiment 37

The method of any one of embodiments 1 to 36, wherein the material comprises a UV-reactive resin.

Embodiment 38

The method of any one of embodiments 1 to 37, wherein the material comprises a phenolic resin.

Embodiment 39

The method of any one of embodiments 1 to 38, wherein the material comprises pores having an average diameter of up to 2 mm.

Embodiment 40

The method of any one of embodiments 1 to 39, wherein the material comprises pores having an average diameter in a range of 40 µm to 50 µm.

Embodiment 41

The method of any one of embodiments 1 to 40, wherein the material is at least 15% porous and up to 99% porous.

Embodiment 42

The method of any one of embodiments 1 to 41, wherein the treated surface is stable.

Embodiment 43

The method of any one of embodiments 1 to 42, wherein the surface of the material, prior to treatment, has a contact angle in a range of 90 degrees to 180 degrees for a 20 µL water droplet when the surface is immersed in toluene.

Embodiment 44

The method of any one of embodiments 1 to 43, wherein the surface of the material, prior to treatment, has a contact angle in a range of 100 degrees to 150 degrees for a 20 µL water droplet when the surface is immersed in toluene.

Embodiment 45

The method of any one of embodiments 1 to 44, wherein the surface of the material, prior to treatment, has a roll off angle in a range of 0 degrees to 50 degrees for a 20 µL water droplet when the surface is immersed in toluene.

Embodiment 46

The method of any one of embodiments 1 to 42, wherein the surface of the material, prior to treatment, has a contact angle in a range of 90 degrees to 180 degrees for a 50 µL water droplet when the surface is immersed in toluene.

Embodiment 47

The method of any one of embodiments 1 to 42 or 46, wherein the surface of the material, prior to treatment, has a contact angle in a range of 100 degrees to 150 degrees for a 50 µL water droplet when the surface is immersed in toluene.

Embodiment 48

The method of any one of embodiments 1 to 42, 46, or 47 wherein the surface of the material, prior to treatment, has a roll off angle in a range of 0 degrees to 40 degrees for a 50 µL water droplet when the surface is immersed in toluene.

Exemplary Filter Element Embodiments

Embodiment 1

A filter element comprising:
a filter media comprising a substrate, wherein the substrate comprises a surface having a roll off angle in a range of 50 degrees to 90 degrees and a contact angle in a range of 90 degrees to 180 degrees for a 20 µL water droplet when the surface is immersed in toluene.

Embodiment 2

The filter element of embodiment 1, wherein the surface has a roll off angle in a range of 60 degrees to 90 degrees, in a range of 70 degrees to 90 degrees, or in a range of 80 degrees to 90 degrees.

Embodiment 3

A filter element comprising
a filter media comprising a substrate, wherein the substrate comprises a surface having a roll off angle in a range of 40 degrees to 90 degrees and a contact angle in a range of 90 degrees to 180 degrees for a 50 µL water droplet when the surface is immersed in toluene.

Embodiment 4

The filter element of embodiment 3, wherein the surface has a roll off angle in a range of 50 degrees to 90 degrees, in a range of 60 degrees to 90 degrees, in a range of 70 degrees to 90 degrees, or in a range of 80 degrees to 90 degrees.

Embodiment 5

The filter element of any one of embodiments 1 to 4, wherein the surface defines a downstream side of the filter media.

Embodiment 6

The filter element of any one of embodiments 1 to 5, wherein the filter media comprises a layer configured to remove particulate contaminants.

Embodiment 7

The filter element of embodiment 6, wherein the layer configured to remove particulate contaminants is upstream of the substrate.

Embodiment 8

The filter element of any one of embodiments 1 to 7, wherein the filter media comprises a coalescing layer.

Embodiment 9

The filter element of embodiment 8, wherein the coalescing layer is upstream of the substrate.

Embodiment 10

The filter element of any one of embodiments 1 to 9, wherein the filter media comprises a layer configured to remove particulate contaminants and a coalescing layer, and the layer configured to remove particulate contaminants is upstream of the coalescing layer and the coalescing layer is upstream of the substrate.

Embodiment 11

The filter element of any one of embodiments 1 to 10, the filter element further comprising a screen.

Embodiment 12

The filter element of embodiment 11, wherein the screen is downstream of the substrate.

Embodiment 13

The filter element of any one of embodiments 1 to 12, the filter element further comprising a second coalescing layer downstream of the substrate.

Embodiment 14

The filter element of any one of embodiments 1 to 13, wherein the filter media has a tubular configuration.

Embodiment 15

The filter element of any one of embodiments 1 to 14, wherein the filter media comprises pleats.

Embodiment 16

The filter element of any one of embodiments 1 to 15, wherein the filter element is configured to remove water from a hydrocarbon fluid.

Embodiment 17

The filter element of embodiment 16, wherein the hydrocarbon fluid comprises diesel fuel.

Embodiment 18

The filter element of any one of embodiments 1 to 17, wherein the surface is stable.

Exemplary Methods of Identifying Material Suitable for Hydrocarbon Fluid-Water Separation

Embodiment 1

A method for identifying a material suitable for hydrocarbon fluid-water separation, the method comprising determining the roll off angle of a droplet on a surface of the material, wherein the material is immersed in a fluid comprising a hydrocarbon, and wherein the roll off angle is in a range of 40 degrees to 90 degrees.

Embodiment 2

The method of embodiment 1, wherein the droplet comprises a hydrophile.

Embodiment 3

The method of either of embodiments 1 or 2, wherein the droplet comprises water.

Embodiment 4

The method of any one of embodiments 1 to 3, wherein the fluid comprising a hydrocarbon comprises toluene.

Embodiment 5

The method of any one of embodiments 1 to 4, wherein the droplet is a 20 µL droplet.

Embodiment 6

The method of any one of embodiments 1 to 4, wherein the droplet is a 50 µL droplet.

Embodiment 7

The method of any one of embodiments 1 to 6, wherein the method further comprises determining the contact angle of the droplet on the surface of the material.

Embodiment 8

The method of embodiment 7, wherein the contact angle is in a range of 90 degrees to 180 degrees.

Embodiment 9

The method of any one of embodiments 1 to 8, wherein the material comprises a hydrophilic group-containing polymer disposed thereon.

Embodiment 10

The method of embodiment 10, wherein the hydrophilic group-containing polymer comprises a hydrophilic polymer.

Embodiment 11

The method of any one of embodiments 1 to 10, wherein the surface of the material is stable.

Embodiment 12

The method of any one of embodiments 1 to 11, wherein the material comprises pores having an average diameter of up to 2 mm.

Embodiment 13 method of any one of embodiments 1 to 12, wherein the material comprises pores having an average diameter in a range of 40 μm to 50 μm.

Embodiment 14 method of any one of embodiments 1 to 13, wherein the material is at least 15% porous and up to 99% porous.

Exemplary UV Radiation-Treated Substrate Embodiments

Embodiment 1

A filter media comprising a substrate obtainable by a method comprising:
exposing a surface of the substrate to ultraviolet (UV) radiation, wherein the substrate comprises at least one of an aromatic component and an unsaturated component.

Embodiment 2

The filter media of embodiment 1, wherein the surface of the substrate, prior to treatment, has a contact angle in a range of 90 degrees to 180 degrees for a 20 μL water droplet when the surface is immersed in toluene.

Embodiment 3

The filter media of either of embodiments 1 or 2, wherein the surface of the substrate, prior to treatment, has a contact angle in a range of 100 degrees to 150 degrees for a 20 μL water droplet when the surface is immersed in toluene.

Embodiment 4

The filter media of embodiment 1, wherein the surface of the substrate, prior to treatment, has a contact angle in a range of 90 degrees to 180 degrees for a 50 μL water droplet when the surface is immersed in toluene.

Embodiment 5

The filter media of either of embodiments 1 or 4, wherein the surface of the substrate, prior to treatment, has a contact angle in a range of 100 degrees to 150 degrees for a 50 μL water droplet when the surface is immersed in toluene.

Embodiment 6

A filter media comprising a substrate obtainable by a method comprising
providing a substrate comprising at least one of an aromatic component and an unsaturated component, the substrate having a surface having a contact angle in a range of 90 degrees to 180 degrees for a 20 μL water droplet when the surface is immersed in toluene, and exposing a surface of the substrate to ultraviolet (UV) radiation.

Embodiment 7

The filter media of embodiment 6, wherein the surface of the substrate, prior to treatment, has a contact angle in a range of 100 degrees to 150 degrees for a 20 μL water droplet when the surface is immersed in toluene.

Embodiment 8

A filter media comprising a substrate obtainable by a method comprising
providing a substrate comprising at least one of an aromatic component and an unsaturated component, the substrate having a surface, the surface having, prior to treatment, a contact angle in a range of 90 degrees to 180 degrees for a 50 μL water droplet when the surface is immersed in toluene, and
exposing a surface of the substrate to ultraviolet (UV) radiation.

Embodiment 9

The filter media of embodiment 8, wherein the surface of the substrate, prior to treatment, has a contact angle in a range of 100 degrees to 150 degrees for a 50 μL water droplet when the surface is immersed in toluene.

Embodiment 10

The filter media of any one of embodiments 1 to 9, wherein exposing the surface of the substrate to UV radiation comprises exposing the surface to UV radiation in the presence of oxygen, and wherein the UV radiation comprises a first wavelength in a range of 180 nm to 210 nm and a second wavelength in a range of 210 nm to 280 nm.

Embodiment 11

The filter media of any one of embodiments 1 to 10, wherein the UV radiation comprises a wavelength of 185 nm.

Embodiment 12

The filter media of any one of embodiments 1 to 11, wherein the UV radiation comprises a wavelength of 254 nm.

Embodiment 13

The filter media of any one of embodiments 1 to 12, wherein exposing the surface comprises exposing the surface to $H_2O_2$.

Embodiment 14

The filter media of any one of embodiments 1 to 13, wherein exposing the surface comprises exposing the surface to UV radiation comprising a wavelength in a range of 350 nm to 370 nm.

Embodiment 15

The filter media of any one of embodiments 1 to 14, wherein exposing the surface comprises exposing the surface to UV radiation in the presence of ozone.

Embodiment 16

The filter media of any one of embodiments 1 to 15, wherein exposing the surface comprises exposing the surface to UV radiation in a range of 300 $\mu$W/cm$^2$ to 200 mW/cm$^2$.

Embodiment 17

The filter media of any one of embodiments 1 to 16, wherein exposing the surface comprises exposing the surface to UV radiation for a time in a range of 2 seconds to 20 minutes.

Embodiment 18

The filter media of any one of embodiments 1 to 17, wherein the substrate comprises an aromatic component and an unsaturated component.

Embodiment 19

The filter media of embodiment 18, wherein the substrate comprises a UV-reactive resin.

Embodiment 20

The filter media of either of embodiments 18 or 19, the UV-reactive resin comprising a phenolic resin.

Embodiment 21

The filter media of any one of embodiments 1 to 20, wherein the substrate comprises pores having an average diameter of up to 2 mm.

Embodiment 22

The filter media of any one of embodiments 1 to 21, wherein the substrate comprises pores having an average diameter in a range of 40 $\mu$m to 50 $\mu$m.

Embodiment 23

The filter media of any one of embodiments 1 to 22, wherein the substrate is at least 15% porous and up to 99% porous.

Embodiment 24

The filter media of any one of embodiments 1 to 22, wherein the substrate, prior to treatment, has a roll off angle in a range of 0 degrees to 50 degrees for a 20 $\mu$L water droplet when the surface is immersed in toluene.

Embodiment 25

The filter media of any one of embodiments 1 to 22, wherein the substrate, prior to treatment, has a roll off angle in a range of 0 degrees to 40 degrees for a 50 $\mu$L water droplet when the surface is immersed in toluene.

Exemplary Hydrophilic Group-Containing Polymer-Treated Substrate Embodiments

Embodiment 1

A filter media comprising a substrate obtainable by a method comprising:
    disposing a hydrophilic group-containing polymer on a surface of the substrate.

Embodiment 2

The filter media of embodiment 1, wherein the surface of the substrate, prior to treatment, has a contact angle in a range of 90 degrees to 180 degrees for a 20 $\mu$L water droplet when the surface is immersed in toluene.

Embodiment 3

The filter media of either of embodiments 1 or 2, wherein the surface of the substrate, prior to treatment, has a contact angle in a range of 100 degrees to 150 degrees for a 20 $\mu$L water droplet when the surface is immersed in toluene.

Embodiment 4

The filter media of embodiment 1, wherein the surface of the substrate, prior to treatment, has a contact angle in a range of 90 degrees to 180 degrees for a 50 $\mu$L water droplet when the surface is immersed in toluene.

Embodiment 5

The filter media of either of embodiments 1 or 4, wherein the surface of the substrate, prior to treatment, has a contact angle in a range of 100 degrees to 150 degrees for a 50 $\mu$L water droplet when the surface is immersed in toluene.

Embodiment 6

The filter media of any one of embodiments 1 to 5, wherein the hydrophilic group-containing polymer comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 7

The filter media of any one of embodiments 1 to 6, wherein the hydrophilic group-containing polymer comprises a hydrophilic polymer.

Embodiment 8

The filter media of any one of embodiments 1 to 7, wherein the hydrophilic group-containing polymer comprises a hydrophilic pendant group.

Embodiment 9

The filter media of any one of embodiments 1 to 8, wherein the hydrophilic group-containing polymer comprises a hydroxylated methacrylate polymer.

Embodiment 10

The filter media of any one of embodiments 1 to 9, wherein the hydrophilic group-containing polymer does not comprise a fluoropolymer.

Embodiment 11

The filter media of any one of embodiments 1 to 10, wherein disposing a hydrophilic group-containing polymer on the surface of the substrate comprises forming a layer comprising the hydrophilic group-containing polymer on the surface.

Embodiment 12

The filter media of embodiment 11, wherein the layer comprises a charged layer.

Embodiment 13

The filter media of any one of embodiments 1 to 12, wherein disposing a hydrophilic group-containing polymer on the surface of the substrate comprises dip coating the substrate in a solution comprising the hydrophilic group-containing polymer.

Embodiment 14

The filter media of embodiment 13, wherein the solution comprising the hydrophilic group-containing polymer further comprises a crosslinker.

Embodiment 15

The filter media of embodiment 14, wherein the cross-linker comprises at least one of N-(2-Aminoethyl)-3-aminopropyltrimethoxysilane (DAMO-T), 3-glycidyloxypropyl) trimethoxy silane and poly (ethylene glycol) diacrylate (PEGDA).

Embodiment 16

The filter media of any one of embodiments 1 to 12, wherein disposing a hydrophilic group-containing polymer on the surface of the substrate comprises electrospinning a solution comprising a hydrophilic group-containing polymer onto the surface.

Embodiment 17

The filter media of embodiment 16, wherein electrospinning a solution comprising a hydrophilic group-containing polymer onto the surface comprises forming nanofibers comprising the hydrophilic group-containing polymer on the surface.

Embodiment 18

The filter media of either of embodiments 16 or 17, wherein the solution comprising a hydrophilic group-containing polymer further comprises a crosslinker.

Embodiment 19

The filter media of embodiment 18, wherein the cross-linker comprises at least one of N-(2-Aminoethyl)-3-aminopropyltrimethoxysilane (DAMO-T), 3-glycidyloxypropyl) trimethoxy silane and poly (ethylene glycol) diacrylate (PEGDA).

Embodiment 20

The filter media of any one of embodiments 1 to 20, the method further comprising crosslinking the hydrophilic group-containing polymer.

Embodiment 21

The filter media of Embodiment 20, wherein crosslinking the hydrophilic group-containing polymer comprises heating the hydrophilic group-containing polymer-coated material at a temperature in a range of 80° C. to 200° C. for 30 seconds to 15 minutes.

Embodiment 22

The filter media of any one of embodiments 1 to 21, the method further comprising annealing the hydrophilic group-containing polymer.

Embodiment 23

The filter media of Embodiment 22, wherein annealing the hydrophilic group-containing polymer comprises sub-merging the hydrophilic group-containing polymer-coated material in a solvent for at least 10 seconds, wherein the temperature of the solvent is at least the glass transition temperature of the hydrophilic group-containing polymer.

Embodiment 24

The filter media of any one of embodiments 1 to 23, wherein the substrate comprises pores having an average diameter of up to 2 mm.

Embodiment 25

The filter media of any one of embodiments 1 to 24, wherein the substrate comprises pores having an average diameter in a range of 40 $\mu$m to 50 $\mu$m.

Embodiment 26

The filter media of any one of embodiments 1 to 25, wherein the substrate is at least 15% porous and up to 99% porous.

Embodiment 27

The filter media of any one of embodiments 1 to 26, wherein the substrate, prior to treatment, has a roll off angle in a range of 0 degrees to 50 degrees for a 20 $\mu$L water droplet when the surface is immersed in toluene.

Embodiment 28

The filter media of any one of embodiments 1 to 26, wherein the substrate, prior to treatment, has a roll off angle in a range of 0 degrees to 40 degrees for a 50 μL water droplet when the surface is immersed in toluene.

Exemplary Use Embodiments

Embodiment 1

The use of ultraviolet (UV) radiation to improve the roll off angle of a surface of a substrate, the substrate comprising at least one of an aromatic component and an unsaturated component.

Embodiment 2

The use of embodiment 1, the use characterized by the substrate comprising an aromatic resin.

Embodiment 3

The use of either of embodiments 1 or 2, the use characterized by the substrate comprising a phenolic resin.

Embodiment 4

The use of any one of embodiments 1 to 3, the use characterized by the use of UV radiation in the presence of oxygen to improve the roll off angle.

Embodiment 5

The use of any one of embodiments 1 to 4, the use characterized by the use of UV radiation in the presence of ozone to improve the roll off angle.

Embodiment 6

The use of any one of embodiments 1 to 5, the use characterized by the use of UV radiation in the presence of $H_2O_2$ to improve the roll off angle.

Embodiment 7

The use of a substance obtainable by exposure of at least one of an aromatic component and an unsaturated component to UV radiation to improve the roll off angle of a substrate.

Embodiment 8

The use of embodiment 7, wherein the use relates to a use of a substance obtainable by exposure of a UV-reactive resin to UV radiation to improve the roll off angle of a substrate.

Embodiment 9

The use of either of embodiments 7 or 8, wherein the use relates to a use of a substance obtainable by exposure of a phenolic resin to UV radiation to improve the roll off angle of a substrate.

Embodiment 10

The use of any one of embodiments 7 to 9, the use characterized by exposure of at least one of an aromatic component and an unsaturated component to UV radiation in the presence of oxygen.

Embodiment 11

The use of any one of embodiments 7 to 9, the use characterized by exposure of at least one of an aromatic component and an unsaturated component to UV radiation in the presence of ozone.

Embodiment 12

The use of any one of embodiments 7 to 9, the use characterized by exposure of at least one of an aromatic component and an unsaturated component to UV radiation in the presence of $H_2O_2$.

Embodiment 13

The use of a hydrophilic group-containing polymer to improve the roll off angle of a substrate.

Embodiment 14

The use of a hydrophilic polymer to improve the roll off angle of a substrate.

Embodiment 15

The use of any one of embodiments 1 to 14 wherein the substrate is a filter substrate.

Embodiment 16

The use of embodiment 15, wherein the filter substrate has a contact angle in a range of 90 degrees to 180 degrees for a 20 μL water droplet when the surface is immersed in toluene.

Embodiment 17

The use of embodiment 15, wherein the filter substrate has a contact angle in a range of 90 degrees to 180 degrees for a 50 μL water droplet when the surface is immersed in toluene.

The present technology is illustrated by the following examples. It is to be understood that the particular examples, materials, amounts, and procedures are to be interpreted broadly in accordance with the scope and spirit of the current technology as set forth herein.

EXAMPLES

Materials

All purchased materials were used as received (that is, with no further purification). Unless otherwise specified, materials were purchased from Sigma Aldrich (St. Louis, MO).

CHROMASOLV Isopropyl Alcohol (IPA)—99.9%
CHROMASOLV Toluene—99.9%
CHROMASOLV Ethyl Acetate—99.9%
Methyl Alcohol—ACS Reagent—99.8%
Ethyl Alcohol (EtOH)
Maleic Anhydride—99%
$H_2O_2$—30% or 50%
$NH_4OH$—ACS Reagent—50%
N-(2-Aminoethyl)-3-aminopropyltrimethoxysilane (also referred to as DYNASYLAN DAMO-T or DAMO-T)—Evonik Industries AG (Essen, Germany)

DYNASYLAN SIVO 203—Evonik Industries AG (Essen, Germany)

Tyzor 131 (Tyzor)

HCl in isopropyl alcohol (IPA)—0.05M

Poly(2-hydroxyethyl methacrylate) (PHEM)—Scientific Polymer Products (Ontario, N.Y.)—Mw=20,000

Poly(2-ethyl-2-oxazoline) (P2E2O)—Mw=50,000

Polyethyleneimine, branched (PEI-10K or PEI 10000)—Mw=25,000—Mn=10,000

Polyethyleneimine, branched (PEI-600)—Mw=600

Poly(hydroxypropyl methacrylate) (PHPM)—Scientific Polymer Products (Ontario, N.Y.)—Granular Poly(ethylene oxide) diamine terminated (PEO-NH2)—Scientific Polymer Products (Ontario, N.Y.)—Mw=2000

Polystyrene-co-Allyl Alcohol (PS-co-AA)—40 mol %

Poly(acrylic acid) (PAA)

Acrodur 950L—BASF Corporation (Florham Park, N.J.)

3-glycidyloxypropyl) trimethoxy silane poly (ethylene glycol) diacrylate (PEGDA)

Ultra-pure water was generated by treating tap water with Millipore Elix 10 UV and Millipore Milli-Q A10 modules and had a resistance of 18.2 MΩ*cm Diesel fuel or Pump Fuel=Ultra-Low Sulfur Diesel (ULSD) that meets ASTM-D975. "Pump fuel" indicates that the sourced ULSD was used as-received from a fuel pump.

Bio Diesel=soy-based biodiesel that meets ASTM-D6751 (Renewable Energy Group (REG), Inc., Mason City, Iowa).

Test Procedures

Contact Angles and Roll-Off Angles

The contact angle and the roll-off angle of a substrate were measured using a DropMaster DM-701 contact angle meter equipped with a tilt stage (Kyowa Interface Science Co., Ltd.; Niiza-City, Japan). Measurements were performed using the wide camera lens setting and calibrated using a 6 millimeter (mm) calibration standard with the FAMAS software package (Kyowa Interface Science Co., Ltd.; Niiza-City, Japan). Measurements were taken only after the droplet had reached equilibrium on the surface (that is, the contact angle and exposed droplet volume was constant for one minute). Measurements were taken of droplets that were in contact with only the substrate, that is, the droplet was not in contact with any surface supporting the substrate.

Water contact angles in toluene were measured using 20 µL drops or 50 µL drops of ultra-pure water deposited on a substrate sample that was submersed in toluene. Contact angles were measured using a tangent fit and were calculated from an average of five independent measurements taken on different areas of the substrate.

Figure 2:
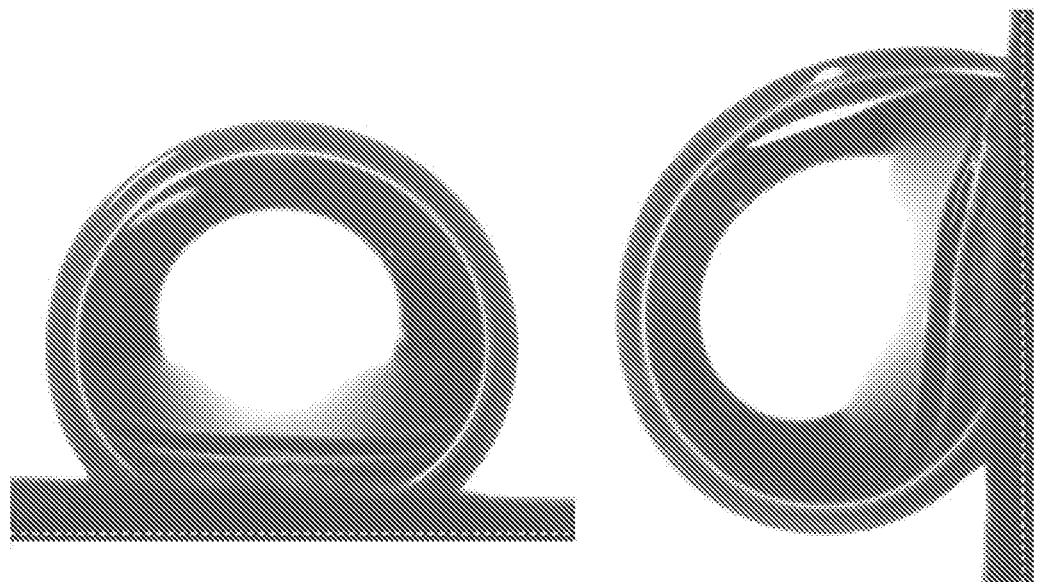
FIG. 2 exemplary images of a 50 µL water droplet on UV-oxygen-treated Substrate 1 immersed in toluene at 0 degrees (0°) rotation (left) and 90° rotation (right).

Water roll-off angles in toluene were measured using 20 µL drops or 50 µL drops of ultra-pure water deposited on a substrate sample that was submersed in toluene. The stage was set to rotate to 90° at a rotation speed of 2 degrees per second (°/sec). At the point when the water drop freely rolled away, or the rear contact line moved at least 0.4 millimeters (mm) relative to the media surface, the rotation was stopped. The angle at the time the rotation was stopped was measured; this angle is defined as the roll-off angle. If the droplet did not roll-off before 90 degrees)(°, the value is reported as 90°. If the droplet rolled away during the deposition process, the value is reported at 1°. Exemplary images of water droplets on a substrate sample immersed in toluene are shown in FIG. 2. Reported values were calculated from an average of five independent measurements taken on different areas of media. Intentional depressions in the substrate (for example, point-bonding depressions) were avoided. If the substrate had a directional macrostructure (for example, corrugation), the roll-off angles were measured in a direction that minimized the effect of the macrostructure.

Droplet Sizing Test

Figure 3:
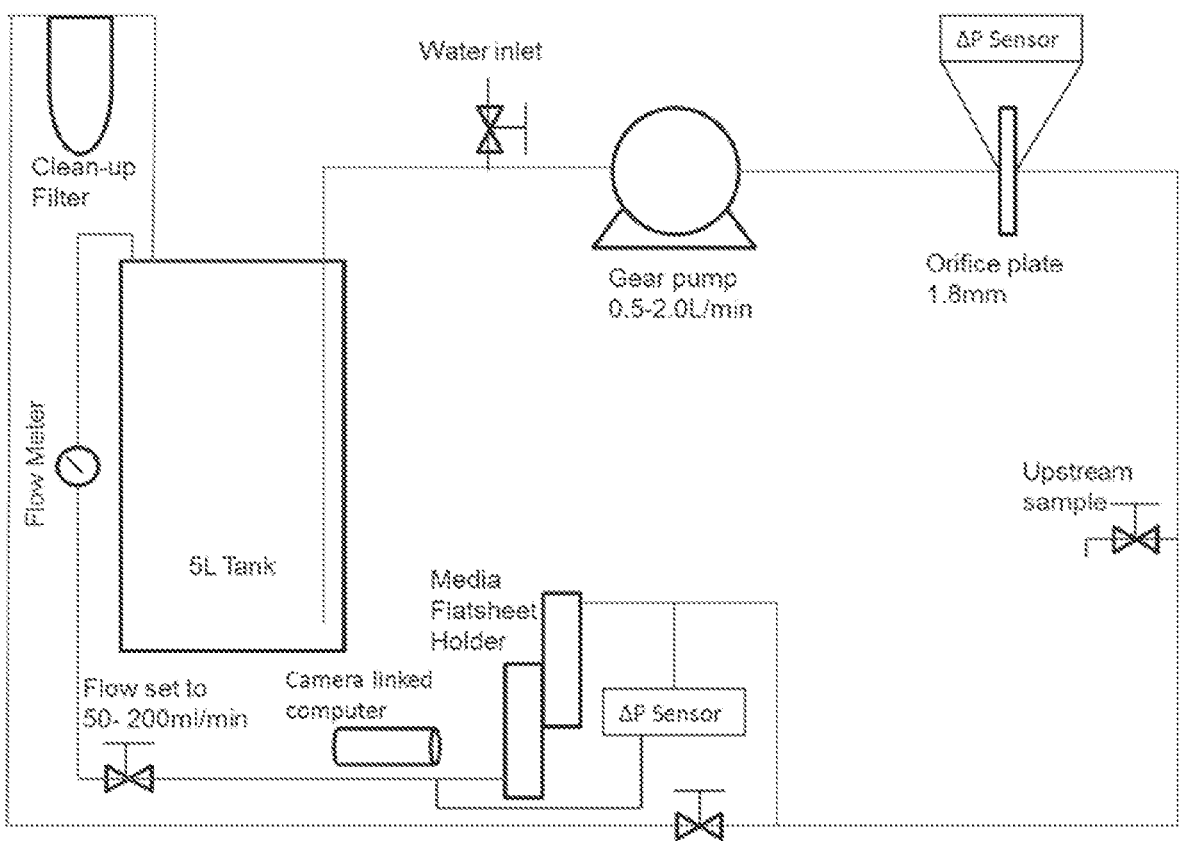
FIG. 3 shows a schematic of the two loop system used for the droplet sizing test.

To determine droplet sizing, a modified version of ISO 16332 was used. A 10 Liter (L) tank supplying a two loop system in multi-pass, shown in FIG. 3, was employed. A main loop handled the majority of the flow, and a test loop, including a media holder, provided a slipstream off the main loop. Manual back-pressure valves were used to regulate the flow to a face velocity of 0.07 feet per minute (ft/min) through the test media throughout the duration of the test. This face velocity is typical of values for in-the-field applications.

Two inch by two inch square samples of each layer were cut and then packed in to a multi-layer media composite including: a loading layer, an efficiency layer, and the substrate sample. The substrate sample to be tested was placed downstream of the efficiency layer, and the efficiency layer was placed downstream of the loading layer. The loading layer and the efficiency layer were thermally bonded sheets that included 20% to 80% bi-component binder fiber having a fiber diameter of 5 µm to 50 µm and a fiber length of 0.1 cm to 15 cm, glass fiber having a fiber diameter of 0.1 micron to 30 microns and an aspect ratio of 10 to 10,000, and have a pore size of 0.5 µm to 100 µm.

Once packed in to a multi-layer media composite, the media layers were held in a custom-built clear acrylic holder. Stainless steel ¼ inch outside diameter (OD) tubing, attached with National Pipe Thread Taper (NPT) fittings, was used to deliver fuel into and out of the from the test loop. The holder was 6 inches×4 inches with a 1 inch×1 inch sample window and a 1 inch×4 inch×¾ inch channel on the downstream side of the media to allow coalesced droplets to exit the fuel stream. As droplets exited the fuel stream, they passed through a zone where a charge-coupled device (CCD) camera captured images of the droplets. Image analysis software (Image J 1.47T, available on the world wide web at imagej.nih.gov) was used to analyze the captured images to determine droplet sizes. The measured droplet sizes were used for statistical analysis. Reported mean droplet sizes were volume weighted: D10 represents the diameter at which 10% of the droplets included a total water volume less than D10 and 90% of the droplets included a total water volume greater than D10; D50 represents the median diameter at which 50% of the droplets included a total water volume less than D50 and 50% of the droplets included a total water volume greater than D50; D90 represents the diameter at which 90% of the droplets included a total water volume less than D90 and 10% of the droplets included a total water volume greater than D90.

Ultra-Low Sulfur Diesel from Chevron Phillips Chemical (The Woodlands, Tex.) was used as a base fuel. 5% (by volume) soy biodiesel (Renewable Energy Group (REG), Inc., Mason City, Iowa) was added to the base fuel to form a fuel mixture. The interfacial tension of the fuel mixture was 21±2 dynes per centimeter, as determined by pendant drop method. The same batch of fuel mixture was used for all testing.

For testing, a multi-layer media composite was placed in the holder, and the holder was filled with the fuel mixture. A face velocity of 0.07 ft/min was set and manually maintained for 10 minutes prior to introducing water.

A water-in-fuel emulsion was generated by injecting water into the main fuel loop and forcing it through an orifice plate. To achieve the desired mean 20 μm emulsion, a 1.8 mm plate was used. The flow speed in the main loop was adjusted to achieve a differential pressure across the orifice plate of 5.0 pounds per square inch (psi) (approximately 1.2 Liters per minute (Lpm)). The water was injected at a rate of 0.3 milliliter per minute (mL/min) with an initial target challenge of 2500 parts per million (ppm) water. Fuel that was not taken into the test loop was sent through a clean-up filter before being directed back into the main tank where it could be passed through the orifice again. The system provides a consistent emulsion challenge to the multi-layer media composite during the duration of a 20 minute test.

Fuel-Water Separation Efficiency Test

Fuel-water separation efficiency testing was done using the ISO/TS 16332 laboratory test method, modified as described herein.

For testing flat-sheets of media, an aluminum holder that holds a 7 inch×7 inch sheet of filter media (effective size of 6 inches×6 inches) was used. On the downstream side of the filter media, a 100 μm polyester screen (effective size of 6 inches×6 inches) was placed to ensure that coalesced water droplets larger than 100 μm in diameter were not carried downstream with the fuel flow.

The upstream water concentration in fuel was set at 5000 ppm and is considered to be constant through the duration of the test. This concentration of water was determined by measuring the known flow rates of both the water injection pump and the fuel flow rate. The downstream water concentration was recorded at predetermined intervals. The water concentration was measured using a Karl-Fisher volumetric titration method using a commercial Metrohm AG (Herisau, Switzerland) 841 Titrando titrator.

The droplet size distribution of the upstream free water was determined using a commercial Malvern Instruments (Malvern, United Kingdom) Insitec SX droplet size analyzer with an attached wet flow cell. For an emulsified water test, the droplet size distribution typically has a D50 of 10 μm±1 μm with a D10 and D90 of 3 μm and 25 μm, respectively.

The face velocity across the media in all tests unless otherwise specified was fixed at 0.05 feet per minute (fpm or ft/min). Unless otherwise specified, the total test time was 15 minutes.

The percent separation efficiency of the media during the test was calculated as the ratio of the downstream water concentration to the upstream water concentration.

Permeability Test

A sample at least 38 cm$^2$ was cut from a media to be tested. The sample was mounted on a TEXTEST® FX 3310 (obtained from Textest AG, Schwerzenbach, Switzerland). Permeability through the media was measured using air, wherein cubic feet of air per square feet of media per minute (ft$^3$ air/ft$^2$ media/min) or cubic meters of air per square meters of media per minute (m$^3$ air/m$^2$ media/min) was measured at a pressure drop of 0.5 inches (1.27 cm) of water.

Preparation Methods

Example 1—UV Treatment

UV-treated media layers were made by exposing the downstream (wire side) surface of a substrate to UV radiation. The UV source was a low pressure mercury lamp (4 inch×4 inch Standard Mercury Grid Lamp, BHK, Inc., Ontario, Canada). The low pressure mercury lamp produces UV light at the following discrete wavelengths: 185 nm, 254 nm, 297 nm, 302 nm, 313 nm, 365 nm, and 366 nm. 4 inch×4 inch samples were exposed to the lamp for between 1 and 20 minutes. Samples shown in FIG. 2 were exposed to the lamp for 20 minutes; samples used for water drop sizing experiments were treated for 8 minutes. Samples were placed approximately 1 cm below the lamp during treatment.

A sample of each substrate listed in Table 1 was UV treated with the low pressure mercury lamp in the presence of atmospheric oxygen. Using the same batch of fuel, D10, D50, and D90 for each substrate before and after treatment were measured; results are shown in Table 2. The contact angles and roll-off angles (for 20 μL drops and 50 μL drops) of each substrate (in toluene) before and after treatment are shown in Table 3.

UV-oxygen treatment with the low pressure mercury lamp resulted in substrates exhibiting an increased roll off angle compared to untreated substrate. As shown in Table 2, with the exception of Substrate 6, an enhancement of D50 mean droplet size of at least 2 fold was also observed. Higher roll off angles measured using drops of water deposited on a substrate sample submersed in toluene (Table 3) correlate with the coalescence of larger droplets by the substrate (D50 enhancement) in diesel fuel (Tables 2 and 3). Because the roll off angle correlates with the size of droplets that coalesce on a surface of a substrate, the roll off angle may be used to identify a substrate that has the ability to coalesce larger droplets capable of exiting the fuel stream.

Without wishing to be bound by theory, it is believed that the acrylic-based resin system of Substrate 6 does not allow for necessary modification(s) of the surface during exposure to UV irradiation. Given the ability of UV-oxygen treatment to enhance adhesion and droplet growth in 100% polyester and phenolic resin containing medias (Substrate 7 and Substrates 1-5, respectively), it is believed that an aromatic component or another form of carbon-carbon bond unsaturation can enhance the effect of UV-oxygen treatment of substrates.

In contrast, when the low pressure mercury lamp was fitted with either a UV bandpass filter (FSQ-UGS, Newport Corp., Irving, Calif.) that blocks wavelengths less than approximately 220 nm and greater than approximately 400 nm, treated Substrate 1 showed little to no change in roll-off angle or mean droplet size compared to untreated media.

Similarly, when Substrates 1 and 7 were treated with a lamp that emits UV at wavelengths greater than 360 nm (Model F300S, Heraeus Noblelight Fusion UV Inc., Gaithersburg, Md.), the treated substrates showed little to no change in mean droplet size compared to untreated substrates and only a small increase in roll off angle compared to untreated substrates.

TABLE 1

| | Composition |
|---|---|
| Substrate 1 | 80% Cellulose 20% Polyester; Phenolic Resin |
| Substrate 2 | 80% Cellulose 20% Polyester; Phenolic Resin with Silicone |
| Substrate 3 | 92% Cellulose 8% Glass; Phenolic Resin |
| Substrate 4 | 100% Cellulose; Phenolic Resin with Silicone |
| Substrate 5 | 90% Cellulose 10% Polyester; Phenolic Resin |
| Substrate 6 | 100% Cellulose; Acrylic Resin |
| Substrate 7 | 100% Polyester (PET) Meltblown; No Resin |
| Substrate 8 | 100% Polyamide (Nylon 6,6) Spunbound; No Resin |

TABLE 2

|  |  | Unmodified | UV Exposed | Enhancement |
|---|---|---|---|---|
| Substrate 1 | D90 (mm) | 0.60 | 1.49 | 2.5x |
|  | D50 (mm) | 0.38 | 0.81 | 2.1x |
|  | D10 (mm) | 0.18 | 0.19 | 1.1x |
| Substrate 2 | D90 (mm) | 0.38 | 1.32 | 3.5x |
|  | D50 (mm) | 0.20 | 0.49 | 2.5x |
|  | D10 (mm) | 0.12 | 0.17 | 1.3x |
| Substrate 3 | D90 (mm) | 0.45 | 1.46 | 3.2x |
|  | D50 (mm) | 0.22 | 1.06 | 4.8x |
|  | D10 (mm) | 0.12 | 0.49 | 4.0x |
| Substrate 4 | D90 (mm) | 0.16 | 1.75 | 10.8x |
|  | D50 (mm) | 0.12 | 1.17 | 9.5x |
|  | D10 (mm) | 0.08 | 0.32 | 4.1x |

TABLE 2-continued

|  |  | Unmodified | UV Exposed | Enhancement |
|---|---|---|---|---|
| Substrate 5 | D90 (mm) | 0.37 | 2.24 | 6.1x |
|  | D50 (mm) | 0.27 | 1.71 | 6.3x |
|  | D10 (mm) | 0.16 | 0.86 | 5.6x |
| Substrate 6 | D90 (mm) | 0.76 | 0.76 | 1.0x |
|  | D50 (mm) | 0.61 | 0.67 | 1.1x |
|  | D10 (mm) | 0.32 | 0.34 | 1.1x |
| Substrate 7 | D90 (mm) | 0.17 | 0.70 | 4.1x |
|  | D50 (mm) | 0.09 | 0.27 | 3.0x |
|  | D10 (mm) | 0.05 | 0.10 | 2.0x |
| Substrate 8 | D90 (mm) | 0.70 | 1.97 | 2.8x |
|  | D50 (mm) | 0.49 | 1.35 | 2.8x |
|  | D10 (mm) | 0.32 | 0.74 | 2.3x |

TABLE 3

|  | Contact Angle in Toluene | | 20 uL Roll-Off Angle in Toluene | | 50 uL Roll-Off Angle in Toluene | | D50 |
|---|---|---|---|---|---|---|---|
|  | Untreated | UV Exposed | Untreated | UV Exposed | Untreated | UV Exposed | Enhancement |
| Substrate 1 | 137 | 102 | 41 | 90 | 10 | 90 | 2.1 |
| Substrate 2 | 143 | 138 | 3 | 90 | 1 | 34 | 2.5 |
| Substrate 3 | 130 | 101 | 12 | 90 | 5 | 90 | 4.8 |
| Substrate 4 | 142 | 129 | 3 | 90 | 1 | 90 | 9.5 |
| Substrate 5 | 145 | 110 | 15 | 90 | 7 | 90 | 6.3 |
| Substrate 6 | 157 | 152 | 7 | 17 | 3 | 15 | 1.1 |
| Substrate 7 | 150 | 137 | 10 | 90 | 10 | 90 | 3.0 |
| Substrate 8 | — | — | — | — | — | — | 2.8 |

Figure 4:
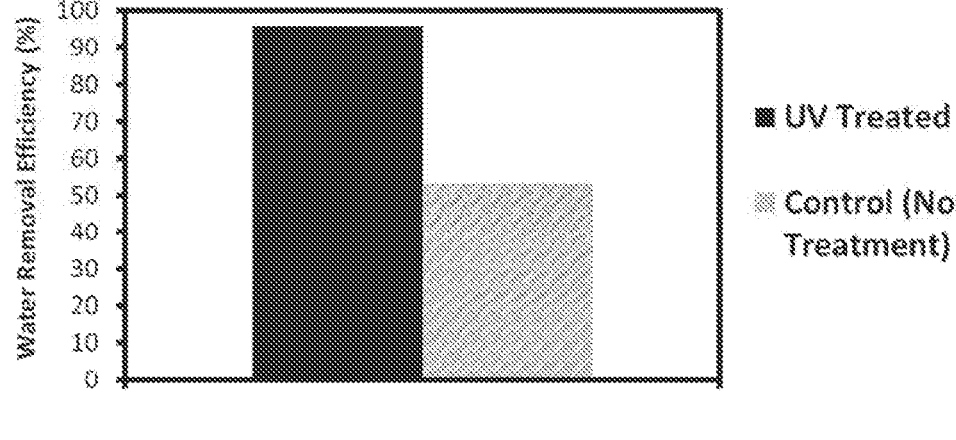
FIG. 4 shows performance of untreated Substrate 1 (control) and UV-oxygen-treated Substrate 1, as measured by water removal efficiency.

The ability of Substrate 1 samples (untreated and UV-oxygen-treated) to remove water from fuel (that is, the performance of the media) was determined by measuring downstream water content after 15 minutes; results are shown in FIG. 4. As can be seen in FIG. 4, compared to untreated Substrate 1, UV-oxygen-treated Substrate 1 samples exhibited significantly improved ability to remove water from the fuel and to maintain low downstream water content, consistent with the observed increased roll off angle and D50 enhancement compared to untreated substrate.

Figure 5:
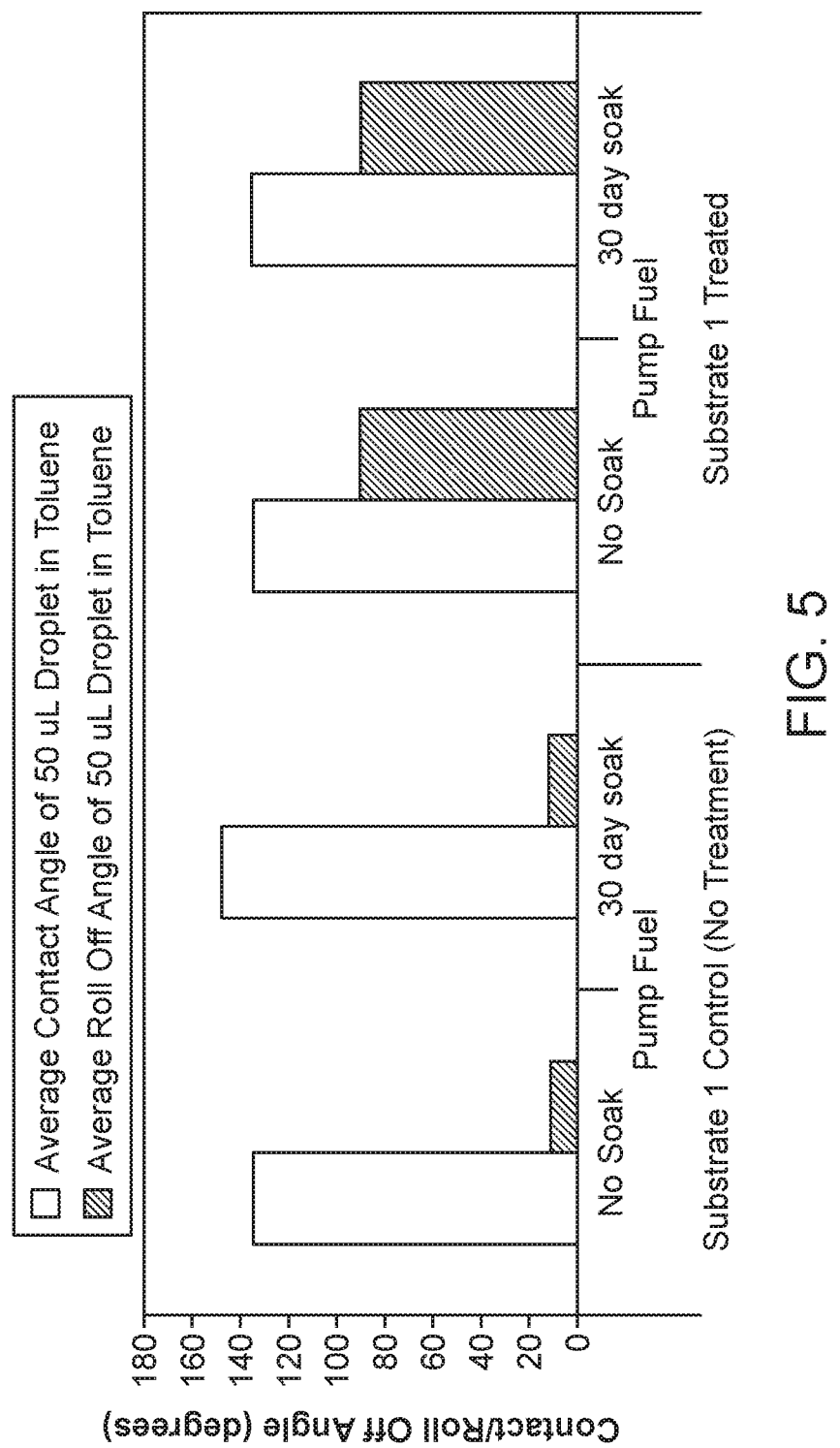
FIG. 5 shows the contact angle and the roll off angle of untreated Substrate 1 and UV-oxygen-treated Substrate 1 without soaking or after soaking in Pump Fuel for 30 days. Contact angles and roll off angles were measured using a 50 µL water droplet in toluene, and reported values are an average of three independent measurements taken on different areas of the media.

Substrate 1 samples (untreated and UV-oxygen-treated) were soaked in 200 milliliters (mL) of Pump Fuel for 30 days at 55° C. Before testing, control (not soaked) and treated samples were washed with hexane and then heated for five minutes in an 80° C. oven to evaporate the hexane. Contact angles in toluene and roll-off angles in toluene were measured using 504 drops of ultra-pure water deposited on a substrate sample that was submersed in toluene. Measurements were performed as described above. Results are shown in FIG. 5 and Table 4. The average roll off angle and contact angle—and the corresponding ability to remove water from fuel—were maintained in UV-oxygen-treated substrates even after being soaked in fuel for 30 days at 55° C., conditions that are found in some in-the-field applications and can accelerate aging of a substrate.

TABLE 4

| Treatment |  |  | UV Treated | UV >300 nm | UV 254 nm Only | $H_2O_2$ + UV | Untreated Soaked 24 Hrs | UV Treated Soaked 24 hrs |
|---|---|---|---|---|---|---|---|---|
| Time Concentration |  |  | 0 min | 8 min | 8 min | 8 min | 8 min | 0 min | 8 min |
| Droplet Sizing | D90 (mm) | 0.60 | 1.49 | 0.50 | 0.80 | 0.93 | 0.50 | 1.01 |
|  | D50 (mm) | 0.29 | 0.81 | 0.31 | 0.33 | 0.31 | 0.36 | 0.81 |
|  | D10 (mm) | 0.17 | 0.19 | 0.19 | 0.15 | 0.14 | 0.18 | 0.35 |
| D90 Enhancement |  |  | 2.5x | 0.8x | 1.3x | 1.5x | 0.8x | 1.7x |
| D50 Enhancement |  |  | 2.8x | 1.1x | 1.1x | 1.1x | 1.2x | 3.6x |
| D10 Enhancement |  |  | 1.1x | 1.1x | 0.9x | 0.9x | 1.1x | 2.1x |
| Contact Angle in Toluene |  | 137° | 102° | 132° | 137° | 141° | — | — |

TABLE 4-continued

| Treatment | UV Treated | UV >300 nm | UV 254 nm Only | $H_2O_2$ + UV | Untreated Soaked 24 Hrs | UV Treated Soaked 24 hrs |
|---|---|---|---|---|---|---|
| 20 uL Roll Off Angle in Toluene | 41° | 90° | — | 37° | — | — |
| 50 uL Roll Off Angle in Toluene | 10° | 90° | 31° | 23° | 47° | — |

Example 2—UV/$H_2O_2$ Treatment

Substrate 1 was cured by heating the media at 150° C. for 10 minutes. The substrate was then submerged in a 50% $H_2O_2$ solution contained in a shallow petri dish (1 cm deep) and UV treated with a low pressure mercury lamp (4 inch×4 inch Standard Mercury Grid Lamp, BHK, Inc., Ontario, Canada) for 0 minutes, 2 minutes, 4 minutes, 6 minutes, or 8 minutes. The substrate was then oven dried at 80° C. for 5 minutes.

Figure 6:
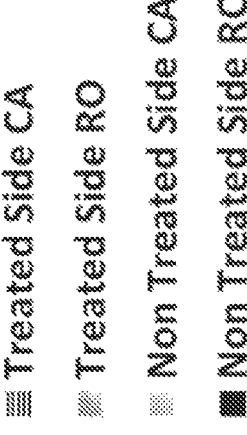
FIG. 6 shows the contact angle (CA) and roll off angle (RO) of a treated side and an untreated side of UV/H$_2$O$_2$-treated Substrate 1 immersed in toluene, measured using a 50 µL water droplet.
Figure 6:
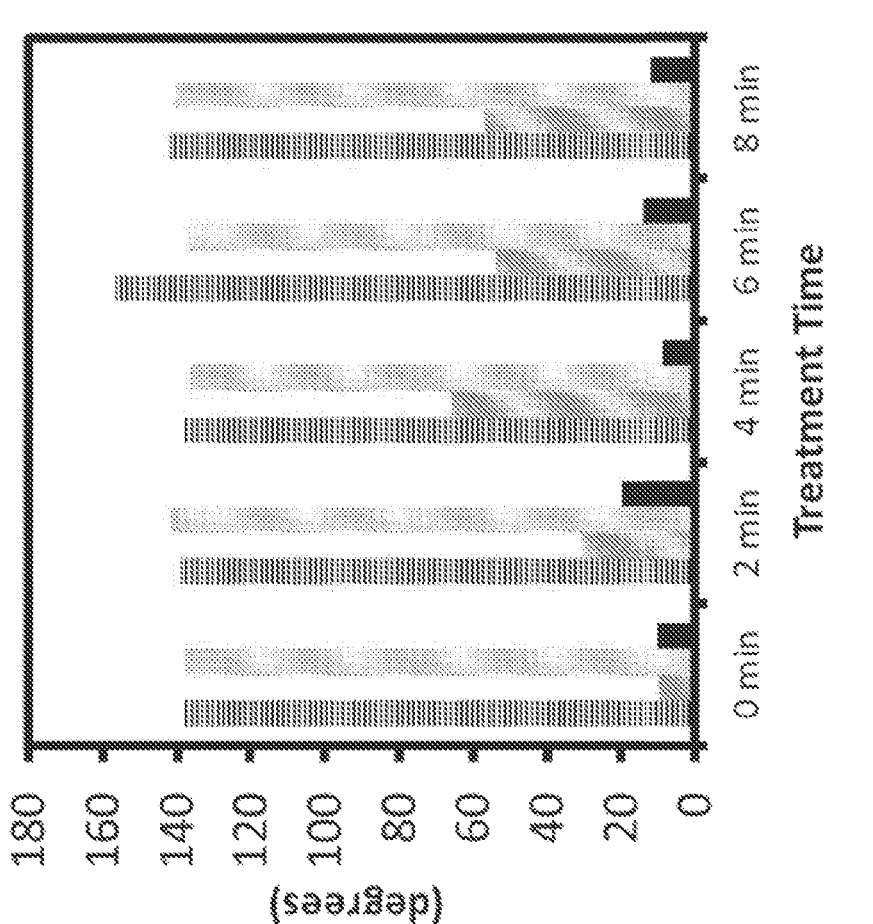
Figure 7:
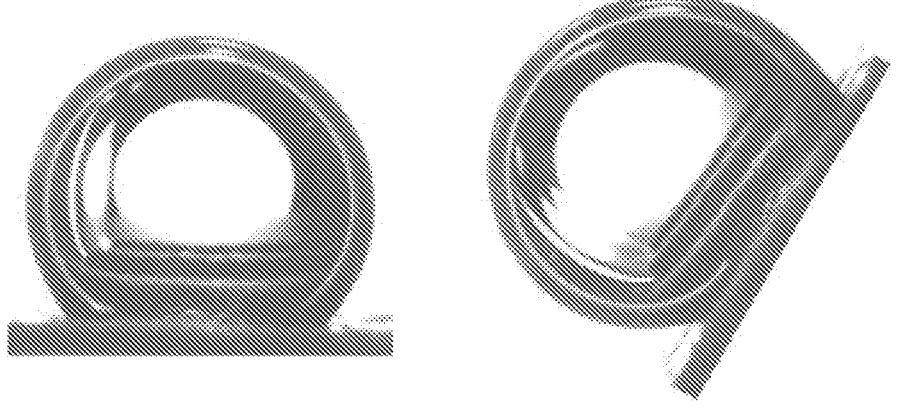
FIG. 7 shows exemplary images of a 20 µL water droplet on PHPM-treated Substrate 1 immersed in toluene at 0° rotation (left) and 60° rotation (right).

The contact angles (CA) in toluene and water roll-off angles (RO) of the treated side and the untreated side of each substrate were measured using 504 drops of ultra-pure water in toluene. Results are shown in Table 4 and FIG. 6.

Example 3—Comparative Examples

The contact angle and roll-off angle in toluene of a Cummins MO-608 fuel-water separation filter was tested using 204 water drops. The upstream side of the filter media had a contact angle of 143° and a roll-off angle of 19°. The downstream side of the filter media had a contact angle of 146° and a roll-off angle of 24°.

The contact angle and roll-off angle in toluene of an ACDelco TP3018 fuel-water separation filter was tested using 204 water drops. The upstream side of the filter media had a contact angle of 146° and a roll-off angle of 28°. The downstream side of the filter media had a reported roll-off angle of 1° (that is, drops rolled away during the deposition process).

The contact angle and roll-off angle in toluene of a Ford F150 FD4615 fuel-water separation filter was tested using 204 water drops. The upstream side of the filter media had a contact angle of 149° and a roll-off angle of 10°. The downstream side of the filter media had a contact angle of 137° and a roll-off angle of 9°.

The contact angle and roll-off angle in toluene of a Donaldson P551063 fuel-water separation filter was tested using 204 water drops. The upstream side of the filter media had a contact angle of 157° and a roll-off angle of 22°. The downstream side of the filter media had a contact angle of 125° and a roll-off angle of 11°.

The contact angle and roll-off angle in toluene of a polytetrafluoroethylene (PTFE) membrane was tested using 50 μL water drops. The membrane had a reported roll-off angle of 1° (that is, drops rolled away during the deposition process), making it was impossible to stabilize the droplet to measure a contact angle. It was approximated that the contact angle is at least 165°.

The contact angle and roll-off angle in toluene of a Komatsu 600-319-5611 fuel filter was tested using 20 μL water drops. The upstream side of the filter media had a contact angle of 150° and a roll-off angle of 3°. The downstream side of the filter media had a contact angle of 145° and a roll-off angle of 32°.

Example 4—Polymer Coating by Dip Coating

Substrate 1 (20% polyester/80% cellulose media with a partially-cured phenolic resin component) was coated with a polymer, using the polymers, concentrations, and solvents shown in Table 5. Samples were dip coated using a Chemat DipMaster 50 dip coater (Chemat Technology, Inc., Northridge, Calif.). Media was fully submerged in a solution including polymer and withdrawn at a rate of 50 mm/min. To ensure coating homogeneity, media was dip coated, rotated 180 degrees, and dip coated again (for a total of two dip coats). Non-aqueous solvents were removed via oven drying at 80° C. for 5 minutes, and water was removed via oven dying at 100° C. for 5 minutes.

To create a charged coating (via quaternization) of PEI-600 (see Table 5 (PEI-600 HCl)), Substrate 1 that had been previously coated with PEI-600 was dip coated in HCl (0.05 M in IPA), using the dip coating procedures described above. To create PEI-10K+Maleic Anhydride coating (see Table 5), Substrate 1 that had been previously coated PEI-10K was dip coated in maleic anhydride using the dip coating procedures described above.

After the dip coating procedure was complete, to increase rigidity of the media and cure the partially-cured phenolic resin, a curing treatment was applied at 150° C. for 10 minutes after drying at 80° C. for 5 minutes.

Figure 8:
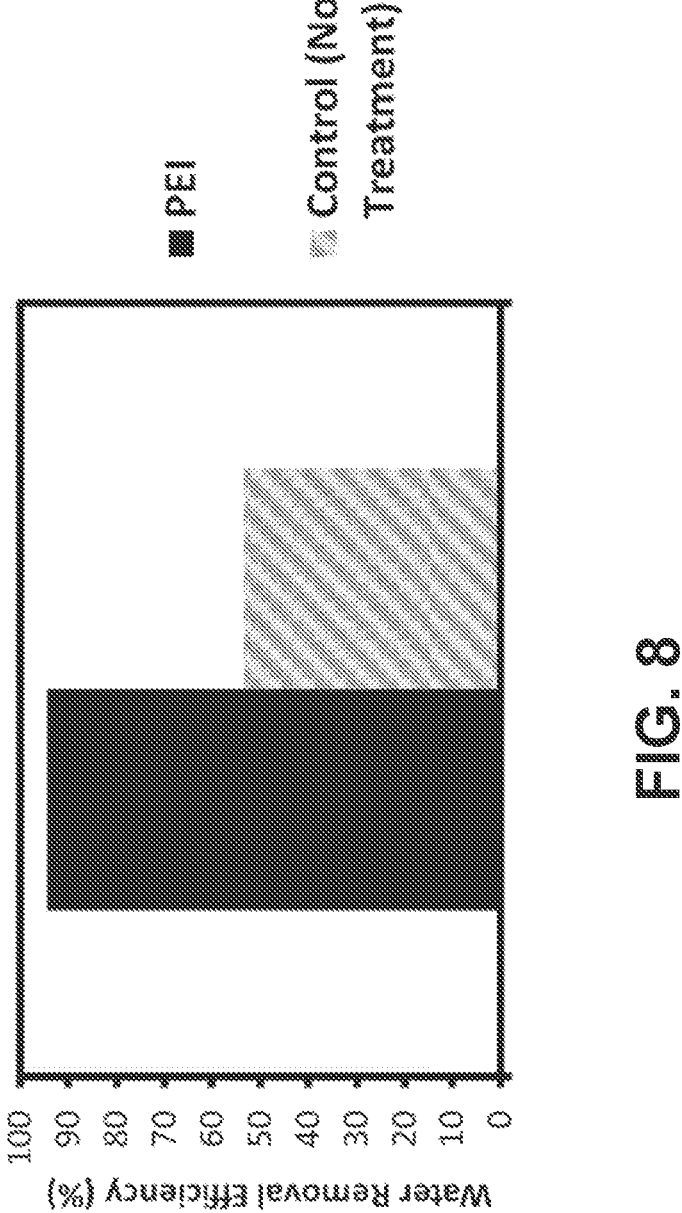
FIG. 8 shows the performance as measured by water removal efficiency of uncoated (control) and PEI-10K-coated Substrate 1.

Results are shown in Table 5 and FIG. 8. An exemplary image of a 20 μL water droplet on a PHPM-treated substrate (see Table 5) immersed in toluene at 0° rotation (left) and 60° rotation (right) is shown in FIG. 2.

As shown in Table 4, higher roll off angles measured using drops of water deposited on a substrate sample submersed in toluene correlate with the coalescence of larger droplets by the substrate (D50 enhancement) in diesel fuel. Because the roll off angle correlates with the size of droplets that coalesce on a surface of a substrate, the roll off angle may be used to identify a substrate that has the ability to coalesce larger droplets capable of exiting the fuel stream. As shown in FIG. 8, increased fuel-water separation efficiency was seen for PEI-10K coated substrate compared to untreated substrate, consistent with the observed increased roll off angle and D50 enhancement.

TABLE 5

| Polymer | untreated | PEI-10K | PS-co-AA | PHPM |
|---|---|---|---|---|
| Concentration | | 1 g/200 mL | 1 g/200 mL | 1 g/200 mL |
| Solvent | | IPA | IPA | MeOH |
| Dry Time (at 80° C.) | | 5 | 5 | 5 |
| Droplet Sizing | | | | |
| D90 (mm) | 0.60 | 1.00 | 0.43 | 2.02 |

TABLE 5-continued

| D50 (mm) | 0.29 | 0.69 | 0.30 | 1.09 |
|---|---|---|---|---|
| D10 (mm) | 0.17 | 0.29 | 0.20 | 0.65 |
| D90 Enhancement | | 1.7x | 0.7x | 3.4x |
| D50 Enhancement | | 2.4x | 1.0x | 3.8x |
| D10 Enhancement | | 1.7x | 1.2x | 3.9x |
| Contact Angle in Toluene | 137° | 138° | 134° | 125° |
| 20 uL Roll Off Angle in Toluene | 41° | 68° | 8° | 90° |
| 50 uL Roll Off Angle in Toluene | 10° | 18° | — | 90° |

| Polymer | PAA | PEI-600 | PEI-600 HCl | PEI-10K + Maleic Anhydride |
|---|---|---|---|---|
| Concentration | 1 g/200 mL | 1 g/200 mL | 1 g/200 mL | 1 g/200 mL |
| Solvent | IPA | IPA | IPA | IPA |
| Dry Time (at 80° C.) | 5 | 5 | 5 | 5 |
| Droplet Sizing | | | | |
| D90 (mm) | 0.43 | 0.55 | 0.87 | |
| D50 (mm) | 0.29 | 0.35 | 0.52 | 0.50 |
| D10 (mm) | 0.15 | 0.18 | 0.35 | 0.30 |
| D90 Enhancement | 0.7x | 0.9x | 1.5x | 0.16 |
| D50 Enhancement | 1.0x | 1.2x | 1.8x | 0.8x |
| D10 Enhancement | 0.9x | 1.1x | 2.1x | 1.0x |
| | | | | 1.0x |
| Contact Angle in Toluene | 135° | 127° | 131° | 144° |
| 20 uL Roll Off Angle in Toluene | 34° | 37° | 90° | 34° |
| 50 uL Roll Off Angle in Toluene | — | 11° | 21° | — |
| | | | | — |

| Polymer | PHEM | P2E2O | DAMO-T | Tyzor |
|---|---|---|---|---|
| Concentration | 1 g/200 mL | 1 g/200 mL | 2 g/200 mL | 10 mL/200 mL |
| Solvent | IPA | MeOH | EtOH | Hexane |
| Dry Time (at 80° C.) | 5 | 5 | 5 | 15 |
| Droplet Sizing | | | | |
| D90 (mm) | 0.65 | 1.33 | 0.44 | 0.41 |
| D50 (mm) | 0.42 | 0.68 | 0.27 | 0.25 |
| D10 (mm) | 0.28 | 0.34 | 0.14 | 0.15 |
| D90 Enhancement | 1.1x | 2.2x | 0.7x | 0.7x |
| D50 Enhancement | 1.5x | 2.4x | 0.9x | 0.9x |
| D10 Enhancement | 1.7x | 2.1x | 0.9x | 0.9x |
| Contact Angle in Toluene | 139° | 125° | 136° | 132° |
| 20 uL Roll Off Angle in Toluene | 56° | 90° | <60° | 28° |
| 50 uL Roll Off Angle in Toluene | 16° | 90° | — | — |

| Polymer | SIVO 203 |
|---|---|
| Concentration | 4 g/400 mL |
| Solvent | IPA |
| Dry Time (at 80° C.) | 15 |
| Droplet Sizing | |
| D90 (mm) | 0.31 |
| D50 (mm) | 0.19 |
| D10 (mm) | 0.12 |
| D90 Enhancement | 0.5x |
| D50 Enhancement | 0.7x |
| D10 Enhancement | 0.7x |
| Contact Angle in Toluene | 133° |
| 20 uL Roll Off Angle in Toluene | 17° |
| 50 uL Roll Off Angle in Toluene | — |

Example 5—Effect of Polymer Coating on Permeability

Substrate 1 (20% polyester/80% cellulose media with a partially-cured phenolic resin component) was dip coated using a Chemat DipMaster 50 dip coater (Chemat Technology, Inc., Northridge, Calif.) with 2% (w/v) PHEM, 4% (w/v) PHEM, 6% (w/v) PHEM, or 8% (w/v) PHEM in methanol. Media was fully submerged in the solution including polymer and withdrawn at a rate of 50 mm/min. To ensure coating homogeneity, media was dip coated, rotated 180 degrees, and dip coated again (for a total of two dip coats). Non-aqueous solvents were removed via oven drying at 80° C. for 5 minutes, and water was removed via oven dying at 100° C. for 5 minutes.

After the dip coating procedure was complete and after drying at 80° C. for 5 minutes, a curing treatment was applied at 150° C. for 10 minutes.

Figure 9:
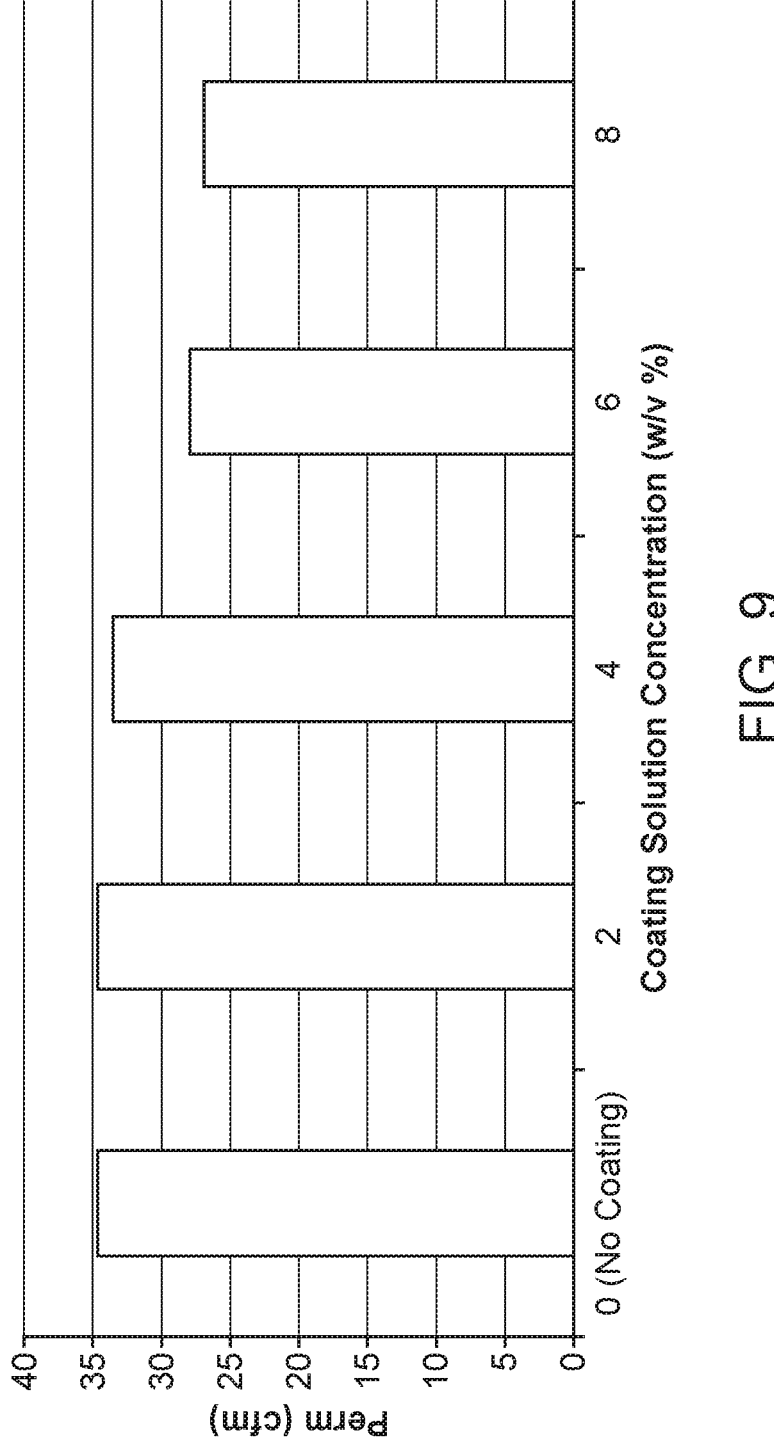
FIG. 9 shows the permeability of uncoated Substrate 1 and of Substrate 1 coated with 2% (w/v) PHEM, 4% (w/v) PHEM, 6% (w/v) PHEM, or 8% (w/v) PHEM.

Permeability was tested as described above. Results are shown in FIG. 9.

Example 6—Polymer Coating by Dip Coating, Crosslinking, and Annealing

Substrate 1 (20% polyester/80% cellulose media with a partially-cured phenolic resin component; see Table 1) was coated with a polymer, using the polymers, crosslinkers, concentrations, and solvents shown in Tables 6 and 7. Samples were dip coated using a Chemat DipMaster 50 dip coater (Chemat Technology, Inc., Northridge, Calif.). Media was fully submerged in a solution including polymer and withdrawn at a rate of 50 mm/min. To ensure coating homogeneity, media was dip coated, rotated 180 degrees, and dip coated again (for a total of two dip coats). Non-aqueous solvents were removed via oven drying at 80° C. for 5 minutes, and water was removed via oven dying at 100° C. for 5 minutes.

After dip coating and/or before annealing, if performed, the media was oven dried at 80° C. for 5 minutes and then exposed to 150° C. for 5 minutes. The heating is believed to increase rigidity of the media, to cure the partially-cured phenolic resin, and to accelerate crosslinking of the cross-linker, if present.

If the polymer coating was annealed, after the dip coating procedure and heating were complete, the media was sub-merging in hot (90° C.) water for 1-2 minutes. After anneal-ing, the media was oven dried for 100° C. for 5 minutes.

Figure 10:
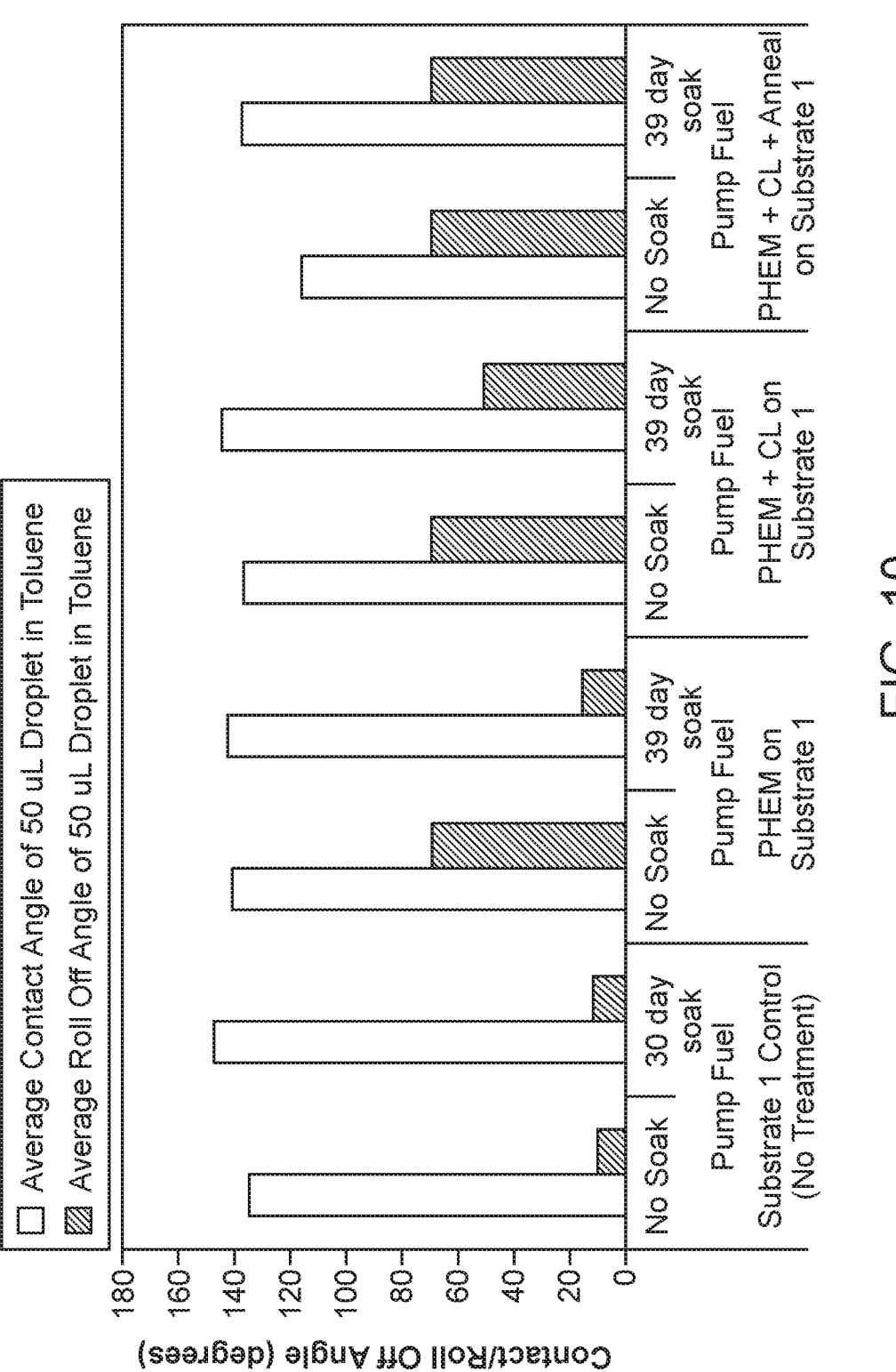
FIG. 10 shows the contact angle and the roll off angle of a 50 µL water droplet on uncoated Substrate 1 (control), PHPM-coated Substrate 1, PHPM-coated Substrate 1 crosslinked (CL) using 1% (w/v) N-(2-Aminoethyl)-3-aminopropyltrimethoxysilane, and PHPM-coated Substrate 1 crosslinked (CL) using 1% (w/v) N-(2-Aminoethyl)-3-aminopropyltrimethoxysilane and annealed without soaking or after soaking in Pump Fuel for the indicated period.
Figure 11:
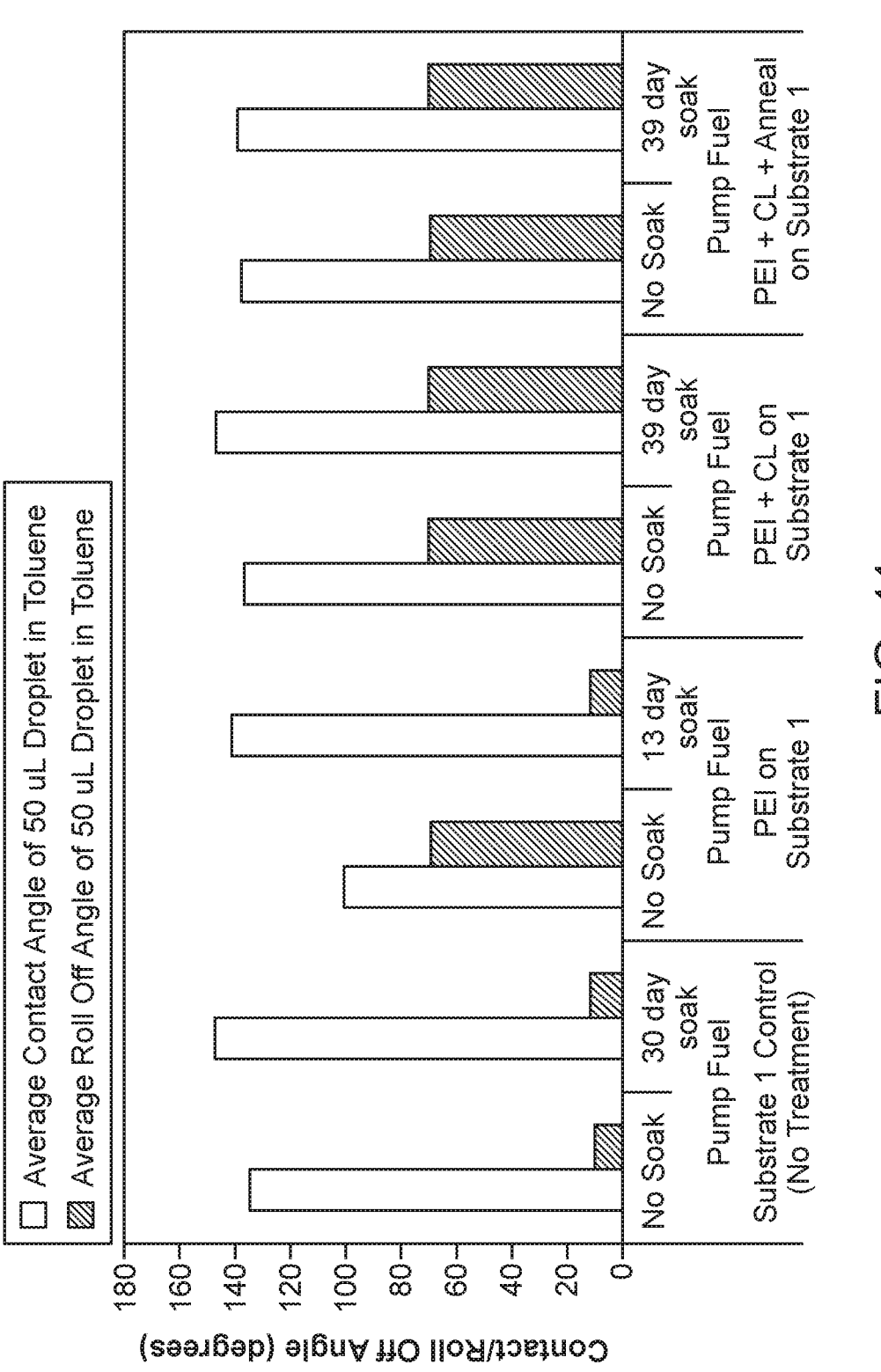
FIG. 11 shows the contact angle and the roll off angle of a 50 µL water droplet on uncoated Substrate 1 (control), PEI-10K-coated Substrate 1, PEI-10K-coated Substrate 1 crosslinked (CL) using 1% (w/v) (3-glycidyloxypropyl) trimethoxysilane), and PEI-10K-coated Substrate 1 crosslinked (CL) using 1% (w/v) (3-glycidyloxypropyl) trimethoxysilane and annealed without soaking or after soaking in Pump Fuel for the indicated period.

Substrate 1 samples (untreated and polymer coated) were soaked in 200 milliliters (mL) of Pump Fuel for 13 days, 30 days, or 39 days (as indicated in FIG. 10 or FIG. 11) at 55° C. Before testing, control (not soaked) and treated samples were washed with hexane and then heated for five minutes in an 80° C. oven to evaporate the hexane. Contact angles in toluene and roll-off angles in toluene were measured using 50 µL drops of ultra-pure water deposited on a substrate sample that was submersed in toluene. Measurements were performed as described above.

Results are shown in FIG. 10 and FIG. 11. The average roll off angle and contact angle—and the corresponding ability to remove water from fuel—were maintained in crosslinked polymer-coated substrates and crosslinked and annealed polymer-coated substrates even after being soaked in fuel for 39 days at 55° C., conditions that are found in some in-the-field applications and can accelerate aging of a substrate.

TABLE 6

| Polymer | PEI-10K | PEI-10K |
| --- | --- | --- |
| Polymer Concentration | 4 g/100 mL | 4 g/100 mL |
| Solvent | methanol | methanol |
| Crosslinker | none | 3-glycidyloxypropyl)tri-methoxysilane |
| Crosslinker Concentration | | 1 g/100 mL |
| Dry Time (at 80° C.) | 5 | 5 |

TABLE 7

| Polymer | PHEM | PHEM |
| --- | --- | --- |
| Polymer Concentration | 4 g/100 mL | 4 g/100 mL |
| Solvent | methanol | methanol |
| Crosslinker | none | N-(2-Aminoethyl)-3aminopropyl-trimethoxysilane |
| Crosslinker Concentration | | 1 g/100 mL |
| Dry Time (at 80° C.) | 5 | 5 |

Example 7—Polymer Coating by Electrospinning

A coating was formed on Substrate 6 (see Table 1) by electrospinning with a 10% polymer (w/v) solution using the conditions shown in Table 8. A methanol solution was used for poly(2-hydroxyethyl methacrylate) (PHEM) and an iso-propyl alcohol (IPA) solution was used for PEI-10K. Coat-ings were formed with and without the presence of a crosslinker in the spinning solution. 0.5% (w/v) N-(2-Aminoethyl)-3-aminopropyltrimethoxysilane (also referred to herein as DAMO-T) was used as a crosslinker for PHEM; 0.5% (w/v) (3-glycidyloxypropyl) trimethoxy silane (also referred to herein as crosslinker 1) or 0.5% (w/v) poly (ethylene glycol) diacrylate (PEGDA) (also referred to herein as crosslinker 2) were used as the crosslinker for PEI-10K.

Results are shown in FIG. 12 to FIG. 15. Contact angles and roll off angles of a 50 µL water droplet on a PHEM-coated substrate with and without crosslinker were measured immediately after electrospinning and are shown in FIG. 12. Contact angles and roll off angles of a 50 µL water droplet on a PEI-coated substrate with and without crosslinker were measured immediately after electrospinning and are shown in FIG. 13.

FIG. 14 shows the contact angles and the roll off angles of a 50 µL water droplet on an exemplary PHEM nanofiber-coated, DAMO-T-crosslinked Substrate 6 1 day, 6 days, and 32 days after formation of the coating by electrospinning. Contact angles and roll off angles 52 days after formation of the coating by electrospinning were similar to those observed 32 days after formation of the coating by electro-spinning.

FIG. 15 shows the contact angles and the roll off angles of a 50 µL water droplet on an exemplary PEI-10K nano-fiber-coated, crosslinked Substrate 6 1 day, 6 days, and 32 days after formation of the coating by electrospinning. The PEI was crosslinked using either (3-glycidyloxypropyl) trimethoxy silane (crosslinker 1) or poly (ethylene glycol) diacrylate (PEGDA) (crosslinker 2). Contact angles and roll off angles 52 days after formation of the coating by elec-trospinning were similar to those observed 32 days after formation of the coating by electrospinning.

Scanning electron microscopy (SEM) images of Substrate 6 coated with polymers by electrospinning are shown in FIG. 16, FIG. 17, and FIG. 18. As shown in FIG. 16, electrospinning of PHEM forms PHEM nanofibers that coat the cellulose substrate. In contrast, as shown in FIG. 17 and FIG. 18, PEI-10K did not form nanofibers on the substrate but, rather, directly coated the cellulose fibers present in the substrate. These results indicate that a polymer coating created using electrospinning technique may be present in the form of nanofibers or it may be present as a solid polymer coat on a substrate.

TABLE 8

| Polymer solution | Volumetric Flow Rate (ml/min) | Voltage (kV) | Spinning distance (inch) | Spinning time (min) |
| --- | --- | --- | --- | --- |
| PHEM + methanol | 0.1 | 25 | 5 | 5 |
| PHEM + methanol + DAMO-T | 0.1 | 25 | 5 | 5 |
| PEI + IPA | 0.5 | 20 | 5 | 15 |
| PEI + IPA+ PEGDA | 0.5 | 20 | 5 | 15 |
| PEI + IPA + (3-glycidyloxypropyl)tri-methoxy silane | 0.5 | 20 | 5 | 15 |

Example filter elements consistent with the materials disclosed herein will now be described. FIG. 19 depicts a first example filter element 100. The filter element 100 has a substrate layer 110 in a pleated configuration. In particular, the substrate layer 110 defines a plurality of pleats 114 extending between a first set of pleat folds 102 and a second set of pleat folds 104. The first set of pleat folds 102 defines a first face 120 and the second set of pleat folds 104 defines a second face 130. The first surface 112 of the substrate layer 110 has a treatment, as disclosed herein above, that increases a roll off angle of the first surface 112 for a 50 μL water droplet when the first surface is immersed in toluene.

In the current example, the first face 120 and the second face 130 are flow faces of the filter element 100, meaning that one of the first face 120 and the second face 130 is a fluid inlet, and the other of the first face 120 and the second face 130 is a fluid outlet. Here the first face 120 is opposite the second face 130 relative to the filter element 100. The first face 120 is planar. The second face 130 is planar. A seal member 140 extends around the periphery of the filter element 100. The filter element 100 is configured to be inserted into a housing (not shown) and fluids enter the filter element 100 at the first face 120, passes through the filtration media, and exits the filter element 100 at the second face 130 to define a fluid pathway 150. While the fluid pathway 150 is depicted such that the first face 120 is an inlet and the second face 130 is an outlet, the fluid pathway can extend in the reverse direction, as well.

The filter element 100 has four side faces 132, 134, 136, 138. The current example filter element 100 is formed from a continuous web of the substrate layer 110. In such embodiments, the plurality of pleats 114 are separated by the first set of pleat folds 102 and the second set of pleat folds 104. The first set of pleat folds 102 form obstructions between the plurality of pleats 114 towards the first face 120 of the media pack such that the fluid pathway extends through the substrate layer 110. Similarly, the second set of pleat folds 104 form obstructions between the plurality of pleats 114 towards the second face 130 of the media pack such that the fluid pathway extends through plurality of pleats 114.

In this example, pleat spacers 142 are disposed between each pleat fold in the first set of pleat folds 102. The pleat spacers 142 are defined by the seal member 140, but in other examples, the pleat spacers 142 can be a separate component from the seal member 140. In yet some examples, the pleat spacers 142 can be incorporated in a frame or housing component that is configured to receive the filter element 100. In various embodiments, the filter element is self-supporting and no pleat spacers are incorporated in the design.

In some embodiments, the roll off angle of the first surface 112 is in a range of 50 degrees to 90 degrees and the first surface has a contact angle in a range of 90 degrees to 180 degrees for a 50 μL water droplet when the first surface is immersed in toluene. The substrate layer 110 also defines a second surface 116 opposite the first surface 112. The second surface can also have a treatment that increases a roll off angle of the second surface 116 for a 50 μL water droplet when the second surface is immersed in toluene. In some embodiments the the second surface has a roll off angle in a range of 50 degrees to 90 degrees and a contact angle in a range of 90 degrees to 180 degrees for a 50 μL water droplet when the second surface is immersed in toluene.

The treatments applied to the substrate layer 110, including the first surface 112 and/or the second surface 116 can be consistent with those described herein. Similarly, the properties of the first surface 112 and the second surface 116 can also be consistent with properties of treated surfaces described herein.

FIG. 20 depicts another example filter element consistent with some embodiments. Similar to the example described above, the filter element 200 has a substrate layer 210 in a pleated configuration. In particular, the substrate layer 210 defines a plurality of pleats 214 extending between a first set of pleat folds 202 and a second set of pleat folds 204. The first set of pleat folds 202 defines a first face 220 and the second set of pleat folds 204 defines a second face 230. A first surface 212 of the substrate layer 210 has a treatment, as disclosed herein above, that increases a roll off angle of the first surface 212 for a 50 μL water droplet when the first surface is immersed in toluene.

In the current example, the first face 220 and the second face 230 are flow faces of the filter element 200. Here the first face 220 is opposite the second face 230 relative to the filter element 200. A seal member 240 extends around the periphery of the second face 230 of the filter element 200. The filter element 200 is configured to be inserted into a housing (not shown) and fluids enter the filter element 200 at the first face 220, pass through the filtration media, and exits the filter element 200 at the second face 230 to define a fluid pathway. The first face 220 is planar. The second face 230 is planar.

The current example filter element 200 is formed from a continuous web of the substrate layer 210. In such embodiments, the plurality of pleats 214 are separated by the first set of pleat folds 202 and the second set of pleat folds 204. The first set of pleat folds 202 and the second set of pleat folds 204 form fluid flow obstructions between the plurality of pleats 214 such that the fluid pathway extends through the substrate layer 210. The substrate layer 210 defines a plurality of flutes 250 extending between the first set of pleat folds 202 and the second set of pleat folds 204. In examples consistent with the current embodiment, each of the flutes 250 define flute peaks 252 and flute valleys 254 that each extend from the first face 220 to the second face 230. The flute peaks 252 and flute valleys 254 generally define a repeating pattern across the width W of the substrate layer 210. While the flute peaks 252 and flute valleys 254 generally define a curvature in the current example, in some other embodiments the flute peaks and/or the flute valleys can be defined by a fold line or a crease along the substrate. In the current example the pleat folds 202, 204 follow the general profile of the plurality of flutes 250, but in some other examples the pleat folds form a straight line. In the current example, the plurality of flutes 250 are non-tapered, but in some embodiments at least a portion of the plurality of flutes 250 are tapered, such as described below in the discussion of FIG. 21.

In some embodiments, the roll off angle of the first surface 212 is in a range of 50 degrees to 90 degrees and the first surface has a contact angle in a range of 90 degrees to 180 degrees for a 50 μL water droplet when the first surface is immersed in toluene. The substrate layer 210 also defines a second surface 216 opposite the first surface 212. The second surface 216 can also have a treatment that increases a roll off angle of the second surface 216 for a 50 μL water droplet when the second surface 216 is immersed in toluene. In some embodiments the second surface 216 has a roll off angle in a range of 50 degrees to 90 degrees and a contact angle in a range of 90 degrees to 180 degrees for a 50 μL water droplet when the second surface 216 is immersed in toluene.

The treatments applied to the substrate layer 210, including the first surface 212 and/or the second surface 216 can be consistent with those described herein. Similarly, the properties of the first surface 212 and the second surface 216 can also be consistent with properties of treated surfaces described herein.

FIG. 21 depicts another example filter element consistent with some embodiments. Similar to the example described above, the filter element 300 has a substrate layer 310 in a pleated configuration. In particular, the substrate layer 310 defines a plurality of pleats 314 extending between a first set of pleat folds 302 and a second set of pleat folds 304. The first set of pleat folds 302 defines a first face 320 and the second set of pleat folds 304 defines a second face 330. A first surface 312 of the substrate layer 310 has a treatment, as disclosed herein above, that increases a roll off angle of the first surface 312 for a 50 μL water droplet when the first surface is immersed in toluene.

In the current example, the first face 320 and the second face 330 are flow faces of the filter element 300. Here the first face 320 is opposite the second face 330 relative to the filter element 300. A seal member (not shown) can extend around the periphery of the filter element 300. The filter element 300 is configured to be inserted into a housing and fluids enter the filter element 300 at the first face 320, pass through the filtration media, and exits the filter element 300 at the second face 330 to define a fluid pathway. In the current embodiment, the first face 320 and the second face 330 are substantially planar, but in some other embodiments the first face and the second face are non-planar or define a curved plane.

The current example filter element 300 is formed from a continuous web of the substrate layer 310. In such embodiments, the plurality of pleats 314 are separated by the first set of pleat folds 302 and the second set of pleat folds 304. The first set of pleat folds 302 and the second set of pleat folds 304 form fluid flow obstructions between the plurality of pleats 314 such that the fluid pathway extends through the substrate layer 310. The substrate layer 310 defines a plurality of flutes 350 extending between the first set of pleat folds 302 and the second set of pleat folds 304. Each of the plurality of flutes 350 has a flute peak 352 and a flute valley 354, where the flute peak 352 and the flute valley 354 also extend between the first face 320 and the second face 330. In the current example, the plurality of flutes 350 taper from the first face 320 to the second face 330 of the filter element 300, meaning that the flute shape changes progressively along the length of the flute L.

The flute peaks and the flute valleys can define a crease or a curvature in various embodiments, and in the current embodiment the flute peaks 352 are defined by a crease or fold in the substrate layer 310 along the length of the flute peak 352, and the flute valleys 354 define a curvature along the length of the flute valley 354.

The plurality of flutes 350 also define a first pair of ridges 356. The ridges 356 are intermediate to the flute peaks 352 and the flute valleys 354. A ridge can be considered a line of intersection between differently sloped media portions that runs along at least a portion of the length L of a flute. A ridge can be formed via deformation of the filter media. The substrate can be deformed to define a ridge as a result of applying pressure to the media. Techniques for forming the ridge include coining, creasing, bending, and folding. For substrates having tapered flutes, the ridges 356 can converge or diverge along the length of the flutes.

The substrate layer 310 of the filter element 300 has a machine direction 364 and a transverse direction 366. The flutes extend along the machine direction 364 of the substrate layer, where the machine direction generally refers to the continuous direction of the media as it comes from a source, such as a supply roll. The pleat folds, therefore, are generally transverse to the machine direction of the media.

In some embodiments, the roll off angle of the first surface 312 is in a range of 50 degrees to 90 degrees and the first surface has a contact angle in a range of 90 degrees to 180 degrees for a 50 μL water droplet when the first surface is immersed in toluene. The substrate layer 310 also defines a second surface 316 opposite the first surface 312. The second surface 316 can also have a treatment that increases a roll off angle of the second surface 316 for a 50 μL water droplet when the second surface 316 is immersed in toluene. In some embodiments the second surface 316 has a roll off angle in a range of 50 degrees to 90 degrees and a contact angle in a range of 90 degrees to 180 degrees for a 50 μL water droplet when the second surface 316 is immersed in toluene.

The treatments applied to the substrate layer 310, including the first surface 312 and/or the second surface 316 can be consistent with those described herein. Similarly, the properties of the first surface 312 and the second surface 316 can also be consistent with properties of treated surfaces described herein.

FIG. 22 depicts another example pleated filter element consistent with some embodiments. Similar to the example described above, the filter element 400 has a substrate layer 410 in a pleated configuration. In particular, the substrate layer 410 defines a plurality of pleats 414 extending between a first set of pleat folds 402 and a second set of pleat folds 404. The first set of pleat folds 402 defines a first face 420 and the second set of pleat folds 404 defines a second face 430. A first surface 412 of the substrate layer 410 has a treatment, as disclosed herein above, that increases a roll off angle of the first surface 412 for a 50 μL water droplet when the first surface is immersed in toluene.

In the current example, the first face 420 and the second face 430 are flow faces of the filter element 400. The filter element 400 has a tubular configuration. The first face 420 and the second face each define a curved plane. The first face 420 defines an outer cylindrical surface and the second face 430 defines an inner cylindrical surface. "Cylindrical" is defined herein to encompass cross sectional shapes that are partially or fully circular and partially or fully ovular. The distance between each adjacent pleat fold in the first set of pleat folds 402 is greater than the distance between each adjacent pleat fold in the second set of pleat folds 404. A seal member 440a, 440b, can extend around the periphery of each end of the filter element 400. The filter element 400 is configured to be inserted into a housing and fluids enter the filter element 400 at the first face 420 or the second face 430, pass through the substrate layer, and exit the filter element 400 at the other of the first face 420 or second face 430 to define a fluid pathway.

The current example filter element 400 is formed from a continuous web of the substrate layer 410. In such embodiments, the plurality of pleats 414 are separated by the first set of pleat folds 402 and the second set of pleat folds 404. The first set of pleat folds 402 and the second set of pleat folds 404 form fluid flow obstructions between the plurality of pleats 414 such that the fluid pathway extends through the substrate layer 410. In the current example, the substrate layer 410 does not define a plurality of flutes, but in other examples the substrate layer can define a plurality of flutes extending from the first face to the second face.

In some embodiments, the roll off angle of the first surface 412 is in a range of 50 degrees to 90 degrees and the first surface has a contact angle in a range of 90 degrees to 180 degrees for a 50 μL water droplet when the first surface is immersed in toluene. The substrate layer 410 also defines a second surface 416 opposite the first surface 412. The second surface 416 can also have a treatment that increases a roll off angle of the second surface 416 for a 50 μL water droplet when the second surface 416 is immersed in toluene. In some embodiments the second surface 416 has a roll off angle in a range of 50 degrees to 90 degrees and a contact angle in a range of 90 degrees to 180 degrees for a 50 μL water droplet when the second surface 416 is immersed in toluene.

The treatments applied to the substrate layer 410, including the first surface 412 and/or the second surface 416 can be consistent with those described herein. Similarly, the properties of the first surface 412 and the second surface 416 can also be consistent with properties of treated surfaces described herein.

The example filter elements of FIGS. 19-22 can incorporate layers of material in addition to the disclosed substrate, including support layers, filtration layers, coalescing layers, sorbent layers, and the like. Each of the layers of material, including the substrate layers, can be coupled to abutting layers of material in embodiments. The layers can be coupled through a variety of approaches including, for example, adhesive bonding or thermal bonding. Each of the substrate layers can be consistent with substrate layers disclosed herein above. In some examples, one or more of the substrate layers is a screen, and in some particular examples, the substrate layers are a series of screens.

FIG. 23 depicts a schematic of another filter element configuration consistent with some embodiments. This filter arrangement is referred to herein as "flow-by" filtration, in that material containing contaminant that flows through the filter from an inlet flow face to an outlet flow face is directed generally parallel to the planar surface (e.g., top and bottom surfaces) of multiple layers of filter media so that the material flows "by" the surface of the filter media rather than through it. Such an arrangement is generally perpendicular to traditional filter arrangements in which fluid flows directly through the pore structure of the filter media (i.e., through the thickness of the filter media, such as from a top planar surface to a bottom planar surface). In the flow-by filter configurations, multiple layers of material are arranged in a stack such that the edges of the layers define a flow face. The flow face is generally perpendicular to the direction in which material will flow relative to the stack and is located where the material enters and/or exits the stack or configuration of filter material.

The example schematic filter element 500 of FIG. 23 has a substrate layer 510 having a first edge 512 cooperatively defining a first flow face 502, a second edge 514 cooperatively defining a second flow face 504, a first surface 516 and a second surface 518. A flow-defining layer 520 is adjacent to the substrate layer 510, wherein the flow-defining layer 520 has a third edge 522 cooperatively defining the first flow face 502, a fourth edge 524 cooperatively defining the second flow face 504, a third surface 526 and a fourth surface 528. The flow-defining layer 520 defines a fluid flow path from the first flow face 502 to the second flow face 504. The fluid flow path extends from the third edge 522 to the fourth edge 524 and the fluid flow path is adjacent to the first surface 516.

The substrate layers 510 can be consistent with substrates generally discussed herein, although in some embodiments the substrate layer 510 is untreated consistently with the current disclosure. In some embodiments the substrate layer can also be a contaminant retention layer, which is generally configured to be able to capture contaminants or particles as material flows generally by or past their first and second face surfaces. The substrate layer can have additional layers of material including support layers, filtration layers, coalescing layers, sorbent layers, and the like.

The flow defining layers 520 can also be consistent with substrates generally discussed herein, although in some embodiments the flow defining layers 520 are untreated. The flow defining layer can have additional layers of material including support layers, filtration layers, coalescing layers, sorbent layers, and the like.

The substrate layers 510 and the flow defining layers 520 are in a stacked, alternating relationship, such that a flow defining layer 520 is positioned between a first substrate layer 510*a* and a second substrate layer 510*b*. The first flow face 502 is opposite the second flow face 504 relative to the filter element 500. The first flow face 502 is parallel to the second flow face 504. Each of the substrate layers 510 and the flow defining layers 520 are planar. While the substrate layer 510 and the flow-defining layer 520 are each substantially flat in the current embodiment, in some examples, one or both of the layers define a plurality of flutes, an example of which is described in conjunction with FIG. 26.

The edges of the flow defining layers 520 and the substrate layers 510 are generally aligned with each other in each stack. In certain embodiments, the stack will generally fill the housing or other structure in which it is positioned in order to maximize the amount of material available for filtration in a given volume. However, other embodiments may include layers of different sizes and/or shapes so that the edges of the various layers can be staggered in an ordered or random arrangement along the height of the stack. In any of the arrangements where the edges of the layers are not aligned along a plane, the flow face will still comprise the edges of the layers facing the direction in which material flow is entering or exiting the filter stack.

The flow defining layers 520 can be configured as a mesh or screen type of structure having relatively large intersecting fibers or strands, as compared to the fibers in the substrate layers. The relatively large fibers and corresponding large pores of the flow defining layers contribute to the composite flow permeability. Although the flow-by filters are configured so that fluid flows generally across the surfaces of the multiple layers, the size of the pores or openings are measured or sized lateral to the direction of flow (i.e., the flow-through direction). That is, the pore size is measured and selected to provide desired flow characteristics, even though the filter is not arranged for material to flow through the thickness of the filter material.

The substrate layers 510 can be configured as a mesh or screen type of structure having relatively small intersecting fibers or strands, as compared to the fibers in the flow defining layers. Holes or openings that are created by these intersecting strands may be referred to as pores. The pores sizes are designed or selected with consideration of the size of the contaminants to be captured by the particular layers. Alternatively, the substrate layers may be made from materials that do not have a mesh or screen type structure but still include pores or openings to allow for flow while the area surrounding the openings can catch or stop the contaminants.

A common technique used for measuring the pore sizes of either or both of the flow defining layers and the substrate layers is capillary flow porometry. This technique uses capillary theory to calculate pore sizes based on the relationship of the surface tension of a liquid, pressure, and diameter of each pore. This measurement method uses a non-reacting liquid to completely wet and fill the pores of the porous material with a fluid that has a very low contact angle to the material. The saturated material is then pressurized with a non-reacting gas while measuring the pressure and air flow until all of the liquid has been forced out of the pores. With this technique, smaller pore sizes will require higher pressure to force the liquid out of the pores, with the opposite result for larger pore sizes. The collected data is then compared to pressure and flow measurements of a clean, dry sample to calculate the pore size distribution. In this measurement, the mean flow pore size is defined at the point for which the wetted sample airflow is equal to half of the dry sample airflow.

In general for various embodiments, the pore sizes of the flow defining layer, when measured in the flow through orientation using the above described techniques and/or other techniques, are greater than the sizes of the pores of the substrate layer (also measured in the flow through direction). In certain embodiments, the sizes of the pores of the substrate layer are in the range of 1-200 microns measured in the flow through orientation, but can more specifically be in the range of 1-100 microns, more specifically 1-50 microns, more specifically 1-25 microns, more specifically 1-15 microns, or even more specifically 1-10 microns.

Generally each flow defining layer 520 is a single layer, with the structure being designed to guide fluid flow through the element 500 primarily along the face of the substrate layers 510. The thickness, spacing, and arrangement of the fibers or strands, along with the overall thickness of the flow defining layer, can be varied to achieve desired filtration performance. In one exemplary embodiment, the overall thickness of the flow defining layer is in the range of approximately 200 µm-5000 µm, more specifically in the range of 200 µm-2000 µm, and more specifically in the range of 500 µm-1000 µm, although the thickness can be smaller or larger than these thickness ranges.

In various embodiments consistent with FIG. 23, the first surface 516 of the substrate layer has a treatment that increases the roll off angle for a 50 µL water droplet when the first surface 516 is immersed in toluene. The roll off angle of the first surface 516 can be in a range of 50 degrees to 90 degrees, and the first surface 516 can have a contact angle in a range of 90 degrees to 180 degrees for a 50 µL water droplet when the first surface 516 is immersed in toluene. In some embodiments the second surface 518 of the substrate layer has a treatment that increases the roll off angle for a 50 µL water droplet when the second surface 518 is immersed in toluene. The roll off angle of the second surface 518 can be in a range of 50 degrees to 90 degrees, and the second surface 518 can have a contact angle in a range of 90 degrees to 180 degrees for a 50 µL water droplet when the second surface 518 is immersed in toluene.

In various embodiments, the third surface 526 of the flow defining layer has a treatment that increases the roll off angle for a 50 µL water droplet when the third surface 526 is immersed in toluene. The roll off angle of the third surface 526 can be in a range of 50 degrees to 90 degrees, and the third surface 526 has a contact angle in a range of 90 degrees to 180 degrees for a 50 µL water droplet when the third surface 526 is immersed in toluene. In some embodiments the fourth surface 528 of the flow defining layer has a treatment that increases the roll off angle for a 50 µL water droplet when the fourth surface 528 is immersed in toluene. The roll off angle of the fourth surface 528 can be in a range of 50 degrees to 90 degrees, and the fourth surface 528 can have a contact angle in a range of 90 degrees to 180 degrees for a 50 µL water droplet when the fourth surface 528 is immersed in toluene.

Flow-by can be provided in a wide variety of configurations, wherein each of these configurations involves a flow path in which fluid moves across the face of one or more substrate layers. When in use, the stack of alternating substrate layers and flow-defining layers can be positioned within a housing or other structure that compresses the layers by a desired amount and/or maintains the stack of layers at a certain compression level once they are positioned within the housing. In one exemplary embodiment, the surface area of the contaminant retention material of the flow face of a compressed stack of materials defines approximately 40-80% of the total area of the flow face.

The number of layers in the stack forming the filter element can vary widely, but can be in the range of 40-100 layers per inch, or more specifically can be in the range of 55-75 layers per inch, or can even more specifically be 65 layers per inch. It is understood, however, that more or fewer layers can be incorporated in a particular filter element.

FIG. 24 depicts another example flow by filter element consistent with some examples. The example schematic filter element 600 of FIG. 24 has a substrate layer 610 having a first edge 612 cooperatively defining a first flow face 602, a second edge 614 cooperatively defining a second flow face 604, a first surface 616 and a second surface 618. A flow-defining layer 620 is adjacent to the substrate layer 610, wherein the flow-defining layer 620 has a third edge 622 cooperatively defining the first flow face 602, a fourth edge 624 cooperatively defining the second flow face 630, a third surface 626 and a fourth surface 628 (not directly visible). The flow-defining layer 620 defines a fluid flow path 603 from the first flow face 602 to the second flow face 604. The fluid flow path extends from the third edge 622 to the fourth edge 624 and the fluid flow path is adjacent to the first surface 616.

In the current example, the substrate layer 610 and the flow-defining layer 620 are each an elongate sheet arranged in a coiled configuration about a central axis x. The flow defining layer 620 is in contact with the adjacent substrate layer 610, and the pair of layers 610, 620 is rolled either about itself or around a core that extends along the longitudinal axis x to create a cylindrical filter. In this configuration, fluid can flow from the top of the rolled layers (i.e., one end of the cylindrical filter) to the bottom of the rolled layers (i.e., the opposite end of the cylindrical filter) across the rolled faces of the flow defining layer 620 and substrate layer 610. Alternatively, fluid can flow in the opposite direction (i.e., from the bottom of the roll to the top of the roll). The first flow face 602 is opposite the second flow face 604 relative to the filter element 600. The first flow face 602 is parallel to the second flow face 604. While the substrate layer 610 and the flow-defining layer 620 are each substantially flat in the current embodiment, in some examples, one or both of the layers define a plurality of flutes.

The various surfaces of the substrate layer 610 and the flow-defining layer 620 can be treated or untreated, consistently with the description of FIG. 23, above.

FIG. 25 depicts yet another example flow-by filter consistent with some embodiments. The example schematic filter element 700 of FIG. 24 has a substrate layer 710 having a first edge 712 cooperatively defining a first flow face 702, a second edge 714 cooperatively defining a second flow face 704, a first surface 716 and a second surface (not visible). A flow-defining layer 720 is adjacent to the substrate layer 710, wherein the flow-defining layer 720 has a third edge 722 cooperatively defining the first flow face 702, a fourth edge 724 cooperatively defining the second flow face 730, a third surface and a fourth surface (not visible). The flow-defining layer 720 defines a fluid flow path 750 from the first flow face 702 to the second flow face 704. The fluid flow path extends from the third edge 722 to the fourth edge 724 and the fluid flow path is adjacent to the first surface 716.

In the current example, the substrate layer 710 and the flow-defining layer 720 are alternating disks that are in a stacked configuration. Each flow defining layer 720 is in contact with at least one adjacent substrate layer 710. Each of the disks of the substrate layer 710 and the flow defining layer 720 are stacked along a longitudinal axis x to create a cylindrical filter. Each of the disks define an opening, and the stack of disks cumulatively define an outer cylindrical surface that is the first flow face 702 and an inner cylindrical surface that is a second flow face 704. In this embodiment, fluid will flow either from first flow face 702 of the element toward the central opening (second flow face 704) of the filter element 700 or from the central opening (second flow face 704) toward the first flow face 702 in a flow-by type of flow path. That is, fluid flow through the filter element will be generally perpendicular to the longitudinal axis x. In the current example, the first flow face 702 is concentric to the second flow face 704.

The various surfaces of the substrate layers 710 and the flow-defining layers 720 can be treated or untreated, consistently with the description of FIG. 23, above. FIG. 26 depicts yet another example filter element having a flow-by configuration consistent with the technology disclosed herein. The materials of the layers can generally be consistent with the discussion of FIG. 23, above. The example schematic filter element 800 of FIG. 23 has a first layer 810 having a first edge 812 cooperatively defining a first flow face 802, a second edge 814 cooperatively defining a second flow face 804, a first surface 816 and a second surface (not visible). A second layer 820 is adjacent to the first layer 810, wherein the second layer 820 has a third edge 822 cooperatively defining the first flow face 802, a fourth edge (not visible) cooperatively defining the second flow face 804, a third surface 826 and a fourth surface (not visible). The second layer 820 defines a fluid flow path from the first flow face 802 to the second flow face 804. The fluid flow path extends from the third edge 822 to the fourth edge 824 and the fluid flow path is adjacent to the first surface 816.

The first layers 810 and the second layers 820 are in a stacked, alternating relationship, such that a second layer 820 is positioned between two first layers 810. In the current embodiment, the first layers 810 are in a fluted configuration, meaning that the first layer 810 defines flutes 830 extending from the first flow face 802 to the second flow face 804. The first layers 810 can either be substrate layers or flow defining layers, which is described above in the discussion of FIG. 23, in detail. The second layers 820 can be the other of the substrate layers or flow defining layers. The first flow face 802 is opposite the second flow face 804 relative to the filter element 800. The first flow face 802 is parallel to the second flow face 804. Similar to embodiments discussed above, the edges of the first layers 810 and the second layers 820 are generally aligned with each other in the stack.

FIG. 27 depicts an example barrier vent assembly consistent with some embodiments of the technology disclosed herein, and FIG. 28 is a cross-sectional view of the barrier vent assembly along line E-E'. The barrier vent assembly 900 has a substrate layer 910 having a first surface 912 and a second surface 914. The substrate layer 910 defines a perimeter region 916 and a central region 918 that is central to the perimeter region 916. The perimeter region 916 is configured to couple to a housing about an opening defined by the housing.

Generally at least one of the first surface 912 and the second surface 914 has a treatment that increases the roll off angle for a 50 μL water droplet when the respective surface is immersed in toluene. In particular, one or both of the first surface 912 and the second surface 914 has a roll off angle in a range of 50 degrees to 90 degrees and a contact angle in a range of 90 degrees to 180 degrees for a 50 μL water droplet when the respective surface is immersed in toluene. The treatment(s) on the first surface and/or the second surface can be consistent with treatments disclosed herein, and such treatments can result in surface properties also disclosed herein.

The barrier vent assembly 900 can be coupled to a variety of types of housings. In one embodiment, the housing is an electronics housing. In another embodiment, the housing is a bulb housing. In another embodiment, the housing is a fuel tank. The barrier vent assembly 900 can be coupled to the housing through a variety of approaches. In the current example, an adhesive 920 is disposed in the perimeter region 916 on the second surface 914 of the substrate layer 910. The adhesive 920 can be placed in contact with the housing to secure the barrier vent assembly 900 to the housing. In alternate embodiments the adhesive can be disposed in the perimeter region 916 on the first surface 912. Additionally, the adhesive can be disposed on both the first surface 912 and the second surface 914 of the substrate layer 910.

The first surface 912 can be configured to be positioned outside of the housing, in multiple embodiments. In such embodiments, a treatment as disclosed herein can be applied to the first surface 912 to prevent the entry of water droplets into the housing. Alternatively, the first surface 912 can be positioned inside of the housing, in which case a treatment as disclosed herein can be applied to the first surface 912 to prevent the exiting of water droplets from the housing.

The barrier vent assembly 900 can include additional layers on the substrate, including support layers, filtration layers, coalescing layers, sorbent layers, and the like.

FIG. 29 depicts an alternate configuration for a barrier vent assembly consistent with the technology disclosed herein, and FIG. 30 is a cross-sectional view of the barrier vent assembly 1000 through line F-F'. The barrier vent assembly 1000 has a substrate layer 1010 having a first surface 1012 and a second surface 1014. The substrate layer 1010 defines a perimeter region 1016 and a central region 1018 that is central to the perimeter region 1016. The perimeter region 1016 is configured to couple to a housing about an opening defined by the housing. In particular, a frame 1020 is coupled to the perimeter region 1016, where the frame 1020 is configured to be coupled to the housing.

The frame 1020 can be injection molded around the perimeter region 1016 of the assembly 1000. The frame 1020 surrounds the perimeter region 1016 and retains it in an extended, taut position. In some embodiments, an adhesive layer is disposed on one or both sides of the frame 1020.

The surfaces of the substrate can be treated consistently with the description of FIGS. 27-28, above.

FIG. 31 is a schematic of an example fuel filtration system 650 consistent with some embodiments. A coalescing filter element 660 is positioned in a fuel stream 670, and is configured to coalesce water in the fuel stream 670. A barrier assembly 680 is configured to be positioned downstream of the coalescing filter element 660, and is configured to be in fluid communication with the filter element 660. The barrier assembly 680 has a substrate defining an upstream surface 682 and a downstream surface 684, where at least the upstream surface 682 has a treatment that increases a roll off angle for a 50 μL water droplet when the upstream surface 682 is immersed in toluene. In some embodiments the downstream surface 684 can also have a treatment that increases a roll off angle for a 50 μL water droplet when the downstream surface 684 is immersed in toluene. The treatments and properties of the upstream surface 682 and/or the downstream surface 684 can be consistent with treatments and properties already disclosed herein.

The fuel stream 670 can pass through one or more fuel lines 652 of the fuel filtration system 650. In a variety of embodiments, the fuel filtration system 650 has a drainage port 654 in fluid communication with the barrier assembly 680 to drain water that was coalesced by the coalescing filter element 660 and barred from further passage through the fuel lines 652 by the barrier assembly 680. In some embodiments, the upstream surface 682 of the barrier assembly 680 is configured to be positioned non-perpendicularly to the direction of fluid flow through the fuel lines 652.

In some alternate embodiments, a barrier assembly can be positioned upstream of the coalescing filter element relative to fluid flow in the fuel filtration system. In such embodiments one or both of the upstream surface and downstream surface of the barrier assembly can be treated to increase the roll off angle (for a 50 µL water droplet when the respective surface is immersed in toluene). Regardless of where the barrier assembly is positioned relative to the coalescing filter element, in various embodiments there is a gap between the barrier assembly and the coalescing filter element. The gap between the barrier assembly and the coalescing filter element can vary.

In some examples, a downstream side 662 of the coalescing filter element 660 can incorporate a treated substrate as disclosed herein. In some embodiments an upstream side 664 of the coalescing filter element 660 can incorporate a treated substrate as disclosed herein.

FIG. 32 is another example filter element consistent with some embodiments. The example filter element 550 can be consistent with a crankcase vent, in some implementations. The filter element 550 has a housing 560 and a first substrate layer 570 disposed in the housing. The first substrate layer 570 is configured in a spiral configuration and the first substrate layer 570 defines a first surface 572 and a second surface 574. The at least one of the first surface 572 and the second surface 574 has a treatment, as disclosed herein, that increases a roll-off angle for a 50 µL water droplet when the surface is immersed in toluene. The first substrate layer 570 defines an outer cylindrical surface 562 and a central cylindrical opening 564. In some embodiments the treated surface defines the central cylindrical opening 564, and in some other embodiments the treated surface defines the outer cylindrical surface 562. In various embodiments, the first substrate layer 570 defines substrate drainage channels 576 configured to direct fluid flow outside of the housing 560. The substrate drainage channels 576 can be defined within the spiraled media configuration and extend along the length L of the filter element from one end of the filter element 560 to the opposite end of the filter element 550. In some embodiments, the housing 550 defines housing drainage channels 566 to direct fluid flow outside of the housing 560.

In operation, in part, gases enter housing inlet 561 from an engine crankcase ventilation vent, for example. The gases are directed to the central cylindrical opening 564 directed through the substrate layer 570. Coalesced liquid can drain through the substrate drainage channels 576 to the bottom 568 of the housing 560. The gases can pass outwardly from the housing via an outlet 563, to be directed to another system, or elsewhere. A flow control module 580 is shown secured to the bottom 568 of the housing 560. The flow control module 580 is configured to control and manage fluid flow out of the filter element 550. The flow control module 580 can have a variety of configurations.

In a number of embodiments, the roll-off angle of the first surface is in a range of 50 degrees to 90 degrees and the first surface has a contact angle in a range of 90 degrees to 180 degrees for a 50 µL water droplet when the first surface is immersed in toluene. In some embodiments, the second surface has a roll off angle in a range of 50 degrees to 90 degrees and a contact angle in a range of 90 degrees to 180 degrees for a 50 µL water droplet when the first surface is immersed in toluene.

In some embodiments, a second substrate layer abuts the first substrate layer and the second substrate layer is also in a spiraled configuration and is disposed in the housing. The second substrate layer defines a third surface and a fourth surface. In some embodiments, at least one of the third surface and the fourth surface has a roll off angle and a contact angle for a 50 µL water droplet when the first surface is immersed in toluene that is different than the roll off angle and the contact angle of the first surface of the first substrate layer. Similar to earlier examples described, the substrate layer(s) can have additional layers such as support layers, filtration layers, coalescing layers, sorbent layers, and the like.

FIG. 33 is an example cross-flow filter element consistent with some embodiments of the technology disclosed herein. The cross-flow filter element 160 is disposed in an example filtration system 155. The filter element 160 has a first substrate 170 defining structure having an outer radial surface 174 and an inner radial surface 172. The filter element 160 defines an upstream side 176 within the inner radial surface 172 and a downstream side 178 outside of the outer radial surface 174. At least one of the outer radial surface 174 and the inner radial surface 172 has a treatment (consistent with treatments disclosed herein) that increases a roll-off angle for a 50 µL water droplet when the outer radial surface is immersed in toluene.

The cross-flow filter element 160 generally defines a fluid feed flow path from a first end 162 of the filter element 160 to a second end 164 of the filter element 160. Feed 166 enters the filter element 160 through the first end 162. A filtrate flow path 182 is configured to extend outward from the outer radial surface 174 of the filter element 160, where permeate 167 passes through the first substrate 170. Retentate 168 exits the filter element 160 through the second end 164. The cross-flow filter element 160 can be disposed in a housing 180 that mutually defines the filtration flow path 182 to direct the permeate to a particular location.

The first substrate 170 can be a variety of different materials and combinations of materials. In some embodiments the first substrate 170 is a membrane. In some embodiments the first substrate 170 is ceramic. In some embodiments the first substrate 170 is polymeric. The filter element 160 can have layers additional to the first substrate 170 including additional treated layers, support layers, filtration layers, coalescing layers, sorbent layers, and the like.

In some embodiments, the roll off angle of the outer radial surface 174 is in a range of 50 degrees to 90 degrees and the outer radial surface 174 has a contact angle in a range of 90 degrees to 180 degrees for a 50 µL water droplet when the outer radial surface 174 is immersed in toluene. In some embodiments, the inner radial surface 172 has a roll off angle in a range of 50 degrees to 90 degrees and a contact angle in a range of 90 degrees to 180 degrees for a 50 µL water droplet when the inner radial surface 172 is immersed in toluene.

In some embodiments each of the inner radial surface 172 and the outer radial surface 174 has a roll off angle in a range of 50 degrees to 90 degrees and a contact angle in a range of 90 degrees to 180 degrees for a 50 µL water droplet when the respective surface is immersed in toluene.

FIG. 34 depicts yet another filter element consistent with some examples. The filter element 260 has a stack of a plurality of layers of single facer media 270. Each layer of single facer media 270 comprises a fluted sheet 272 and a facing sheet 274 which cumulatively define a plurality of flutes 280. The flutes 280 are inlet flutes 282 and outlet flutes 284. Each flute of the plurality of flutes 280 has a flute length L extending from a first face 262 of the filter element 260 to a second face 264 of the filter element 260. A first obstruction 283 disposed within the outlet flutes towards the first face 262 of the filter element 260, and second obstruction 281 is disposed within the inlet flutes 282 towards the second face 264 of the filter element 260, so that fluid passing into the first face 262 of the filter element 260 and out the second face 264 of the filter element 260 passes through the media to provide fluid filtration.

In a number of embodiments, a first surface of the single facer media has a treatment that increases a roll-off angle for a 50 μL water droplet when the surface is immersed in toluene. The roll off angle of the first surface of the single facer media is in a range of 50 degrees to 90 degrees and the at least one contact angle has a contact angle in a range of 90 degrees to 180 degrees for a 50 μL water droplet when the surface is immersed in toluene. The roll off angle of the first surface is in a range of 60 degrees to 90 degrees, in a range of 70 degrees to 90 degrees, or in a range of 80 degrees to 90 degrees. The first surface can be any surface of the single facer media 270 including one of the two surfaces 271, 273 of the fluted sheet 272 and/or one of the two surfaces 275, 277 of the facing sheet 274. Additional surfaces of each layer of single facer media 270 can additionally be treated consistently with the present disclosure.

In some embodiments alternate to the current example, a single, elongate sheet of single facer filter media can be configured in a spiral configuration to form a cylindrical filter element.

FIG. 35 depicts another filter element consistent with some examples. The filter element 450 has filter media 460 configured in a tubular arrangement defining an inner opening 452 and an outer surface 454. A liner 470*a-b* is positioned concentric with the filter media 460.

The liner 470*a-b* is generally arranged in a series with respect to fluid flow through the filter element 450. The current example depicts an inner liner 470*a* disposed in the inner opening 452 of the filter media 460 and an outer liner 470*b* disposed around the outer surface 454 of the filter media 460. The inner liner 470*a* and/or the outer liner 470*b* can have a treatment consistent with the present disclosure. In some embodiments, an outer liner will be omitted. In some embodiments, an inner liner will be omitted. The liner 470*a-b* has a treatment consistent with the present disclosure, which increases the roll-off angle of at least a first surface for a 50 μL water droplet when the surface is immersed in toluene. In some embodiments the first surface is an inner liner surface 472 of the inner liner 470*a* that is treated, and in some embodiments the first surface is an outer liner surface (not visible) of the inner liner 470*a* that is treated. In some embodiments the first surface is an inner liner surface (not visible) of the outer liner 470*b* that is treated, and in some embodiments the first surface is an outer liner surface 474 of the outer liner 470*b* that is treated.

The roll off angle of the first surface of the liner is generally in a range of 50 degrees to 90 degrees and the first surface has a contact angle in a range of 90 degrees to 180 degrees for a 50 μL water droplet when the surface is immersed in toluene. The roll off angle of the first surface is in a range of 60 degrees to 90 degrees, in a range of 70 degrees to 90 degrees, or in a range of 80 degrees to 90 degrees.

The filter media 460 can have a number of configurations. In some embodiments, the filter media 460 is wrapped (see FIG. 32, for example). In some embodiments, the filter media is pleated (see FIG. 22, for example).

Additional Exemplary Embodiments

Embodiment 1

A filter element comprising:
a substrate layer defining a first surface having a treatment that increases a roll off angle of the first surface for a 50 μL water droplet when the first surface is immersed in toluene, wherein the substrate layer defines a plurality of pleats extending between a first set of pleat folds and a second set of pleat folds, wherein the first set of pleat folds defines a first face and the second set of pleat folds defines a second face.

Embodiment 2

The filter element of any one of embodiments 1 and 3-31, wherein the roll off angle of the first surface is in a range of 50 degrees to 90 degrees and the first surface has a contact angle in a range of 90 degrees to 180 degrees for a 50 μL water droplet when the first surface is immersed in toluene.

Embodiment 3

The filter element of any one of embodiments 1-2 and 4-31, wherein the first face is opposite the second face relative to the filter element.

Embodiment 4

The filter element of any one of embodiments 1-3 and 5-31, wherein a distance between each adjacent pleat fold in the first set of pleat folds is greater than a distance between each adjacent pleat fold in the second set of pleat folds.

Embodiment 5

The filter element of any one of embodiments 1-4 and 6-31, further comprising pleat spacers disposed between each pleat fold in the first set of pleat folds.

Embodiment 6

The filter element of any one of embodiments 1-5 and 7-31, wherein the first face defines a curved plane.

Embodiment 7

The filter element of any one of embodiments 1-6 and 8-31, wherein the substrate layer defines a plurality of flutes extending between the first set of pleat folds and the second set of pleat folds.

Embodiment 8

The filter element of any one of embodiments 1-7 and 9-31, wherein a portion of the plurality of flutes are tapered.

Embodiment 9

The filter element of any one of embodiments 1-8 and 10-31, wherein the substrate layer defines a second surface opposite the first surface, wherein the second surface has a roll off angle in a range of 50 degrees to 90 degrees and a contact angle in a range of 90 degrees to 180 degrees for a 50 µL water droplet when the second surface is immersed in toluene.

Embodiment 10

The filter element of any one of embodiments 1-9 and 11-31, wherein the first face defines an outer cylindrical surface and the second face defines an inner cylindrical surface.

Embodiment 11

The filter media of any one of embodiments 1-10 and 12-31, wherein the roll off angle of the first surface is in a range of 60 degrees to 90 degrees, in a range of 70 degrees to 90 degrees, or in a range of 80 degrees to 90 degrees.

Embodiment 12

The filter media of any one of embodiments 1-11 and 13-31, wherein the first surface comprises a UV-treated surface.

Embodiment 13

The filter media of any one of embodiments 1-12 and 14-31, wherein the first surface comprises a UV-oxygen-treated surface.

Embodiment 14

The filter media of any one of embodiments 1-13 and 15-31, wherein the substrate layer comprises at least one of an aromatic component and an unsaturated component.

Embodiment 15

The filter media of any one of embodiments 1-14 and 16-31, wherein the substrate layer comprises a UV-reactive resin.

Embodiment 16

The filter media of any one of embodiments 1-15 and 17-31, wherein the first surface comprises a hydrophilic group-containing polymer.

Embodiment 17

The filter media of any one of embodiments 1-16 and 18-31, wherein the hydrophilic group-containing polymer comprises a hydrophilic pendant group.

Embodiment 18

The filter media of any one of embodiments 1-17 and 19-31, wherein the hydrophilic group-containing polymer does not comprise a fluoropolymer.

Embodiment 19

The filter media of any one of embodiments 1-18 and 20-31, wherein the hydrophilic group-containing polymer comprises a hydrophilic polymer.

Embodiment 20

The filter media of any one of embodiments 1-19 and 21-31, wherein the hydrophilic group-containing polymer comprises a charged polymer.

Embodiment 21

The filter media of any one of embodiments 1-20 and 22-31, wherein the hydrophilic group-containing polymer comprises a hydroxylated methacrylate polymer.

Embodiment 22

The filter media of any one of embodiments 1-21 and 23-31, wherein the substrate layer comprises a modifying resin.

Embodiment 23

The filter media of any one of embodiments 1-22 and 24-31, wherein the substrate layer comprises pores having an average diameter of up to 2 mm.

Embodiment 24

The filter media of any one of embodiments 1-23 and 25-31, wherein the substrate layer comprises pores having an average diameter in a range of 40 µm to 50 µm.

Embodiment 25

The filter media of any one of embodiments 1-24 and 26-31, wherein the substrate layer is at least 15% porous and up to 99% porous.

Embodiment 26

The filter media of any one of embodiments 1-25 and 27-31, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 27

The filter media of any one of embodiments 1-26 and 28-31, wherein the surface comprises a hydrophilic group-containing polymer, wherein the substrate comprises pores having an average diameter of up to 2 mm, and wherein the substrate is at least 15% porous and up to 99% porous.

Embodiment 28

The filter media of any one of embodiments 1-27 and 29-31, wherein the substrate layer is stable.

Embodiment 29

The filter media of any one of embodiments 1-28 and 30-31, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 30

The filter media of any one of embodiments 1-29 and 31, wherein the substrate layer comprises cellulose, polyester, polyamide, polyolefin, glass, or a combination thereof.

Embodiment 31

The filter media of any one of embodiments 1-30, wherein the substrate layer comprises a phenolic resin.

Embodiment 32

A filter element comprising:

a substrate layer defining a first surface having a treatment that increases the roll off angle for a 50 μL water droplet when the first surface is immersed in toluene, wherein the substrate layer has a first edge defining a first flow face and a second edge defining a second flow face; and a flow-defining layer adjacent to the substrate layer, wherein the flow-defining layer has a third edge defining the first flow face and a fourth edge defining the second flow face, wherein the flow-defining layer defines a fluid flow path from the first flow face to the second flow face and wherein the fluid flow path extends from the third edge to the fourth edge and the fluid flow path is adjacent to the first surface.

Embodiment 33

The filter element of any one of embodiments 32 and 34-66, wherein the roll off angle of the first surface is in a range of 50 degrees to 90 degrees and the first surface has a contact angle in a range of 90 degrees to 180 degrees for a 50 μL water droplet when the first surface is immersed in toluene.

Embodiment 34

The filter element of any one of embodiments 32-33 and 35-66, further comprising a plurality of alternating substrate layers and flow defining layers in a stacked relationship.

Embodiment 35

The filter element of any one of embodiments 32-34 and 36-66, wherein the first flow face is opposite the second flow face.

Embodiment 36

The filter element of any one of embodiments 32-35 and 37-66, wherein one of the first flow face and the second flow face defines an outer cylindrical surface and the other one of the first flow face and the second flow face defines an inner cylindrical surface.

Embodiment 37

The filter element of any one of embodiments 32-36 and 38-66, wherein the substrate layer and the flow-defining layer each comprise an elongate sheet in a coiled configuration.

Embodiment 38

The filter element of any one of embodiments 32-37 and 39-66, wherein the flow-defining layer comprises a mesh material.

Embodiment 39

The filter element of any one of embodiments 32-38 and 40-66, wherein the substrate layer and the flow-defining layer are planar.

Embodiment 40

The filter element of any one of embodiments 32-39 and 41-66, wherein the first flow face is parallel to the second flow face.

Embodiment 41

The filter element of any one of embodiments 32-40 and 42-66, wherein the substrate layer is a first substrate layer and the filter element comprises a second substrate layer, and the flow-defining layer is positioned between the first substrate layer and the second substrate layer.

Embodiment 42

The filter element of any one of embodiments 32-41 and 43-66, wherein the substrate layer defines a second surface opposite the first surface, wherein the second surface has a roll off angle in a range of 50 degrees to 90 degrees and a contact angle in a range of 90 degrees to 180 degrees for a 50 μL water droplet when the second surface is immersed in toluene.

Embodiment 43

The filter element of any one of embodiments 32-42 and 44-66, wherein one of the substrate layer and the flow-defining layer defines flutes extending from the first flow face to the second flow face.

Embodiment 44

The filter element of any one of embodiments 32-43 and 45-66, wherein the other of the substrate layer and the flow-defining layer is substantially planar.

Embodiment 45

The filter element of any one of embodiments 32-44 and 46-66, wherein the other of the substrate layer and the flow-defining layer defines flutes extending from the first flow face to the second flow face.

Embodiment 46

The filter media of any one of embodiments 32-45 and 47-66, wherein the roll off angle of the first surface is in a range of 60 degrees to 90 degrees, in a range of 70 degrees to 90 degrees, or in a range of 80 degrees to 90 degrees.

Embodiment 47

The filter media of any one of embodiments 32-46 and 48-66, wherein the first surface comprises a UV-treated surface.

Embodiment 48

The filter media of any one of embodiments 32-47 and 49-66, wherein the first surface comprises a UV-oxygen-treated surface.

Embodiment 49

The filter media of any one of embodiments 32-48 and 50-66, wherein the substrate layer comprises at least one of an aromatic component and an unsaturated component.

Embodiment 50

The filter media of any one of embodiments 32-49 and 51-66, wherein the substrate layer comprises a UV-reactive resin.

Embodiment 51

The filter media of any one of embodiments 32-50 and 52-66, wherein the first surface comprises a hydrophilic group-containing polymer.

Embodiment 52

The filter media of any one of embodiments 32-51 and 53-66, wherein the hydrophilic group-containing polymer comprises a hydrophilic pendant group.

Embodiment 53

The filter media of any one of embodiments 32-52 and 54-66, wherein the hydrophilic group-containing polymer does not comprise a fluoropolymer.

Embodiment 54

The filter media of any one of embodiments 32-53 and 55-66, wherein the hydrophilic group-containing polymer comprises a hydrophilic polymer.

Embodiment 55

The filter media of any one of embodiments 32-54 and 56-66, wherein the hydrophilic group-containing polymer comprises a charged polymer.

Embodiment 56

The filter media of any one of embodiments 32-55 and 57-66, wherein the hydrophilic group-containing polymer comprises a hydroxylated methacrylate polymer.

Embodiment 57

The filter media of any one of embodiments 32-56 and 58-66, wherein the substrate layer comprises a modifying resin.

Embodiment 58

The filter media of any one of embodiments 32-57 and 59-66, wherein the substrate layer comprises pores having an average diameter of up to 2 mm.

Embodiment 59

The filter media of any one of embodiments 32-58 and 60-66, wherein the substrate layer comprises pores having an average diameter in a range of 40 μm to 50 μm.

Embodiment 60

The filter media of any one of embodiments 32-59 and 61-66, wherein the substrate layer is at least 15% porous and up to 99% porous.

Embodiment 61

The filter media of any one of embodiments 32-60 and 62-66, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 62

The filter media of any one of embodiments 32-61 and 63-66, wherein the surface comprises a hydrophilic group-containing polymer, wherein the substrate comprises pores having an average diameter of up to 2 mm, and wherein the substrate is at least 15% porous and up to 99% porous.

Embodiment 63

The filter media of any one of embodiments 32-62 and 64-66, wherein the substrate layer is stable.

Embodiment 64

The filter media of any one of embodiments 32-63 and 65-66, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof. Embodiment 65. The filter media of any one of embodiments 32-64 and 66, wherein the substrate layer comprises cellulose, polyester, polyamide, polyolefin, glass, or a combination thereof.

Embodiment 66

The filter media of any one of embodiments 32-65, wherein the substrate layer comprises a phenolic resin.

Embodiment 67

A filter element comprising:
a substrate layer having a first edge defining a first flow face and a second edge defining a second flow face; and
a flow-defining layer adjacent to the substrate layer, wherein the flow-defining layer has a first surface having a treatment that increases the roll off angle for a 50 μL water droplet when the first surface is immersed in toluene, and wherein the flow-defining layer has a third edge defining the first flow face and a fourth edge defining the second flow face, wherein the flow-defining layer defines a fluid flow path from the first flow face to the second flow face and wherein the fluid flow path extends from the third edge to the fourth edge and the fluid flow path is adjacent to the first surface.

Embodiment 68

The filter element of any one of embodiments 67 and 69-102, wherein the substrate layer is a contaminant retention layer.

Embodiment 69

The filter element of any one of embodiments 67-68 and 70-102, wherein the roll off angle of the first surface is in a range of 50 degrees to 90 degrees, and the first surface has a contact angle in a range of 90 degrees to 180 degrees for a 50 μL water droplet when the first surface is immersed in toluene.

Embodiment 70

The filter element of any one of embodiments 67-69 and 71-102, further comprising a plurality of alternating substrate layers and flow defining layers in a stacked relationship.

Embodiment 71

The filter element of any one of embodiments 67-70 and 72-102, wherein the first flow face is opposite the second flow face.

Embodiment 72

The filter element of any one of embodiments 67-71 and 73-102, wherein one of the first flow face and the second flow face defines an outer cylindrical surface and the other one of the first flow face and the second flow face defines an inner cylindrical surface.

Embodiment 73

The filter element of any one of embodiments 67-72 and 74-102, wherein the substrate layer and the flow-defining layer each comprise an elongate sheet in a coiled configuration.

Embodiment 74

The filter element of any one of embodiments 67-73 and 75-102, wherein the flow-defining layer comprises a mesh material.

Embodiment 75

The filter element of any one of embodiments 67-74 and 76-102, wherein the substrate layer and the flow-defining layer are planar.

Embodiment 76

The filter element of any one of embodiments 67-75 and 77-102, wherein the first flow face is parallel to the second flow face.

Embodiment 77

The filter element of any one of embodiments 67-76 and 78-102, wherein the substrate layer is a first substrate layer and the filter element comprises a second substrate layer, and the flow-defining layer is positioned between the first substrate layer and the second substrate layer.

Embodiment 78

The filter element of any one of embodiments 67-77 and 79-102, wherein the flow-defining layer defines a second surface opposite the first surface, wherein the second surface has a roll off angle in a range of 50 degrees to 90 degrees and a contact angle in a range of 90 degrees to 180 degrees for a 50 μL water droplet when the second surface is immersed in toluene.

Embodiment 79

The filter element of any one of embodiments 67-78 and 80-102, wherein one of the substrate layer and the flow-defining layer defines flutes extending from the first flow face to the second flow face.

Embodiment 80

The filter element of any one of embodiments 67-79 and 81-102, wherein the other of the substrate layer and the flow-defining layer is substantially planar.

Embodiment 81

The filter element of any one of embodiments 67-80 and 82-102, wherein the other of the substrate layer and the flow-defining layer defines flutes extending from the first flow face to the second flow face.

Embodiment 82

The filter media of any one of embodiments 67-81 and 83-102, wherein the roll off angle of the first surface is in a range of 60 degrees to 90 degrees, in a range of 70 degrees to 90 degrees, or in a range of 80 degrees to 90 degrees.

Embodiment 83

The filter media of any one of embodiments 67-82 and 84-102, wherein the first surface comprises a UV-treated surface.

Embodiment 84

The filter media of any one of embodiments 67-83 and 85-102, wherein the first surface comprises a UV-oxygen-treated surface.

Embodiment 85

The filter media of any one of embodiments 67-84 and 86-102, wherein the flow-defining layer comprises at least one of an aromatic component and an unsaturated component.

Embodiment 86

The filter media of any one of embodiments 67-85 and 87-102, wherein the flow-defining layer comprises a UV-reactive resin.

Embodiment 87

The filter media of any one of embodiments 67-86 and 88-102, wherein the first surface comprises a hydrophilic group-containing polymer.

Embodiment 88

The filter media of any one of embodiments 67-87 and 89-102, wherein the hydrophilic group-containing polymer comprises a hydrophilic pendant group.

Embodiment 89

The filter media of any one of embodiments 67-88 and 90-102, wherein the hydrophilic group-containing polymer does not comprise a fluoropolymer.

Embodiment 90

The filter media of any one of embodiments 67-89 and 91-102, wherein the hydrophilic group-containing polymer comprises a hydrophilic polymer.

Embodiment 91

The filter media of any one of embodiments 67-90 and 92-102, wherein the hydrophilic group-containing polymer comprises a charged polymer.

Embodiment 92

The filter media of any one of embodiments 67-91 and 93-102, wherein the hydrophilic group-containing polymer comprises a hydroxylated methacrylate polymer.

Embodiment 93

The filter media of any one of embodiments 67-92 and 94-102, wherein the flow-defining layer comprises a modifying resin.

Embodiment 94

The filter media of any one of embodiments 67-93 and 95-102, wherein the flow-defining layer comprises pores having an average diameter of up to 2 mm.

Embodiment 95

The filter media of any one of embodiments 67-94 and 96-102, wherein the flow-defining layer comprises pores having an average diameter in a range of 40 µm to 50 µm.

Embodiment 96

The filter media of any one of embodiments 67-95 and 97-102, wherein the flow-defining layer is at least 15% porous and up to 99% porous.

Embodiment 97

The filter media of any one of embodiments 67-96 and 98-102, wherein the flow-defining layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 98

The filter media of any one of embodiments 67-97 and 99-102, wherein the first surface comprises a hydrophilic group-containing polymer, wherein the substrate comprises pores having an average diameter of up to 2 mm, and wherein the substrate is at least 15% porous and up to 99% porous.

Embodiment 99

The filter media of any one of embodiments 67-98 and 100-102, wherein the substrate layer is stable.

Embodiment 100

The filter media of any one of embodiments 67-99 and 101-102, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 101

The filter media of any one of embodiments 67-100 and 102, wherein the flow-defining layer comprises cellulose, polyester, polyamide, polyolefin, glass, or a combination thereof.

Embodiment 102

The filter media of any one of embodiments 67-101, wherein the flow-defining layer comprises a phenolic resin.

Embodiment 103

A barrier vent assembly comprising:
a substrate layer having a first surface having a treatment that increases the roll off angle for a 50 µL water droplet when the first surface is immersed in toluene, wherein the substrate layer defines a perimeter region and a central region that is central to the perimeter region; and wherein the perimeter region is configured to couple to a housing about an opening defined by the housing.

Embodiment 104

The barrier vent assembly of any one of embodiments 103 and 105-132, wherein the roll off angle of the first surface is in a range of 50 degrees to 90 degrees and the first surface has a contact angle in a range of 90 degrees to 180 degrees for a 50 μL water droplet when the first surface is immersed in toluene.

Embodiment 105

The barrier vent assembly of any one of embodiments 103-104 and 106-132, wherein an adhesive is disposed in the perimeter region.

Embodiment 106

The barrier vent assembly of any one of embodiments 103-105 and 107-132, wherein a frame is coupled to the perimeter region, and the frame is configured to be coupled to the housing.

Embodiment 107

The barrier vent assembly of any one of embodiments 103-106 and 108-132, the substrate layer having a second surface having a roll off angle in a range of 50 degrees to 90 degrees and a contact angle in a range of 90 degrees to 180 degrees for a 50 μL water droplet when the first surface is immersed in toluene.

Embodiment 108

The barrier vent assembly of any one of embodiments 103-107 and 109-132, wherein the adhesive is disposed on the second surface.

Embodiment 109

The barrier vent assembly of any one of embodiments 103-108 and 110-132, wherein the adhesive is disposed on the first surface.

Embodiment 110

The barrier vent assembly of any one of embodiments 103-109 and 111-132, wherein the first surface is configured to face outside the housing.

Embodiment 111

The barrier vent assembly of any one of embodiments 103-110 and 112-132, wherein the housing is a fuel tank housing.

Embodiment 112

The filter media of any one of embodiments 103-111 and 113-132, wherein the roll off angle of the first surface is in a range of 60 degrees to 90 degrees, in a range of 70 degrees to 90 degrees, or in a range of 80 degrees to 90 degrees.

Embodiment 113

The filter media of any one of embodiments 103-112 and 114-132, wherein the first surface comprises a UV-treated surface.

Embodiment 114

The filter media of any one of embodiments 103-113 and 115-132, wherein the first surface comprises a UV-oxygen-treated surface.

Embodiment 115

The filter media of any one of embodiments 103-114 and 116-132, wherein the substrate layer comprises at least one of an aromatic component and an unsaturated component.

Embodiment 116

The filter media of any one of embodiments 103-115 and 117-132, wherein the substrate layer comprises a UV-reactive resin.

Embodiment 117

The filter media of any one of embodiments 103-116 and 118-132, wherein the first surface comprises a hydrophilic group-containing polymer.

Embodiment 118

The filter media of any one of embodiments 103-117 and 119-132, wherein the hydrophilic group-containing polymer comprises a hydrophilic pendant group.

Embodiment 119

The filter media of any one of embodiments 103-118 and 120-132, wherein the hydrophilic group-containing polymer does not comprise a fluoropolymer.

Embodiment 120

The filter media of any one of embodiments 103-119 and 121-132, wherein the hydrophilic group-containing polymer comprises a hydrophilic polymer.

Embodiment 121

The filter media of any one of embodiments 103-120 and 122-132, wherein the hydrophilic group-containing polymer comprises a charged polymer.

Embodiment 122

The filter media of any one of embodiments 103-121 and 123-132, wherein the hydrophilic group-containing polymer comprises a hydroxylated methacrylate polymer.

Embodiment 123

The filter media of any one of embodiments 103-122 and 124-132, wherein the substrate layer comprises a modifying resin.

Embodiment 124

The filter media of any one of embodiments 103-123 and 125-132, wherein the substrate layer comprises pores having an average diameter of up to 2 mm.

Embodiment 125

The filter media of any one of embodiments 103-124 and 126-132, wherein the substrate layer comprises pores having an average diameter in a range of 40 μm to 50 μm.

Embodiment 126

The filter media of any one of embodiments 103-125 and 127-132, wherein the substrate layer is at least 15% porous and up to 99% porous.

Embodiment 127

The filter media of any one of embodiments 103-126 and 128-132, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 128

The filter media of any one of embodiments 103-127 and 129-132, wherein the surface comprises a hydrophilic group-containing polymer, wherein the substrate comprises pores having an average diameter of up to 2 mm, and wherein the substrate is at least 15% porous and up to 99% porous.

Embodiment 129

The filter media of any one of embodiments 103-128 and 130-132, wherein the substrate layer is stable.

Embodiment 130

The filter media of any one of embodiments 103-129 and 131-132, wherein the first surface comprises poly(hydroxy-propyl methacrylate) (PHPM), poly(2-hydroxyethyl meth-acrylate) (PHEM), poly(2-ethyl-2-oxazoline) (P2E2O), polyethyleneimine (PEI), quaternized polyethyleneimine, poly(dopamine), or combinations thereof. Embodiment 131. The filter media of any one of embodiments 103-130 and 132, wherein the substrate layer comprises cellulose, poly-ester, polyamide, polyolefin, glass, or a combination thereof.

Embodiment 132

The filter media of any one of embodiments 103-131, wherein the substrate layer comprises a phenolic resin.

Embodiment 133

A fuel filtration system comprising:
a filter element configured to coalesce water in a fuel stream;
a barrier assembly in fluid communication with the filter element, wherein the barrier assembly is positioned downstream of the filter element and wherein the barrier assembly defines an upstream surface, wherein the upstream surface has a treatment that increases a roll off angle for a 50 μL water droplet when the upstream surface is immersed in toluene.

Embodiment 134

The fuel filtration system of any one of embodiments 133 and 135-156, wherein the upstream surface of the barrier assembly is configured to be positioned non-perpendicularly to the direction of fluid flow.

Embodiment 135

The fuel filtration system of any one of embodiments 133-134 and 136-156, wherein the roll-off angle of the upstream surface is in a range of 50 degrees to 90 degrees and the upstream surface has a contact angle of in a range of 90 degrees to 180 degrees for a 50 μL water droplet when the upstream surface is immersed in toluene.

Embodiment 136

The filter media of any one of embodiments 133-135 and 137-156, wherein the roll off angle of the first surface is in a range of 60 degrees to 90 degrees, in a range of 70 degrees to 90 degrees, or in a range of 80 degrees to 90 degrees.

Embodiment 137

The filter media of any one of embodiments 133-136 and 138-156, wherein the first surface comprises a UV-treated surface.

Embodiment 138

The filter media of any one of embodiments 133-137 and 139-156, wherein the first surface comprises a UV-oxygen-treated surface.

Embodiment 139

The filter media of any one of embodiments 133-138 and 140-156, wherein the substrate layer comprises at least one of an aromatic component and an unsaturated component.

Embodiment 140

The filter media of any one of embodiments 133-139 and 141-156, wherein the substrate layer comprises a UV-reac-tive resin.

Embodiment 141

The filter media of any one of embodiments 133-140 and 142-156, wherein the first surface comprises a hydrophilic group-containing polymer.

Embodiment 142

The filter media of any one of embodiments 133-141 and 143-156, wherein the hydrophilic group-containing polymer comprises a hydrophilic pendant group.

Embodiment 143

The filter media of any one of embodiments 133-142 and 144-156, wherein the hydrophilic group-containing polymer does not comprise a fluoropolymer.

Embodiment 144

The filter media of any one of embodiments 133-143 and 145-156, wherein the hydrophilic group-containing polymer comprises a hydrophilic polymer.

Embodiment 145

The filter media of any one of embodiments 133-144 and 146-156, wherein the hydrophilic group-containing polymer comprises a charged polymer.

Embodiment 146

The filter media of any one of embodiments 133-145 and 147-156, wherein the hydrophilic group-containing polymer comprises a hydroxylated methacrylate polymer.

Embodiment 147

The filter media of any one of embodiments 133-146 and 148-156, wherein the substrate layer comprises a modifying resin.

Embodiment 148

The filter media of any one of embodiments 133-147 and 149-156, wherein the substrate layer comprises pores having an average diameter of up to 2 mm.

Embodiment 149

The filter media of any one of embodiments 133-148 and 150-156, wherein the substrate layer comprises pores having an average diameter in a range of 40 $\mu$m to 50 $\mu$m.

Embodiment 150

The filter media of any one of embodiments 133-149 and 151-156, wherein the substrate layer is at least 15% porous and up to 99% porous.

Embodiment 151

The filter media of any one of embodiments 133-150 and 152-156, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 152

The filter media of any one of embodiments 133-151 and 153-156, wherein the surface comprises a hydrophilic group-containing polymer, wherein the substrate comprises pores having an average diameter of up to 2 mm, and wherein the substrate is at least 15% porous and up to 99% porous.

Embodiment 153

The filter media of any one of embodiments 133-152 and 154-156, wherein the substrate layer is stable.

Embodiment 154

The filter media of any one of embodiments 133-153 and 155-156, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 155

The filter media of any one of embodiments 133-154 and 156, wherein the substrate layer comprises cellulose, polyester, polyamide, polyolefin, glass, or a combination thereof.

Embodiment 156

The filter media of any one of embodiments 133-155, wherein the substrate layer comprises a phenolic resin.

Embodiment 157

A filter element comprising:

a housing; and a first substrate layer disposed in the housing, the first substrate layer defining a first surface and a second surface, the first surface having a treatment that increases a roll-off angle for a 50 $\mu$L water droplet when the first surface is immersed in toluene, wherein the first substrate layer is in a spiral configuration.

Embodiment 158

The filter element of any one of embodiments 157 and 159-187, wherein the roll-off angle of the first surface is in a range of 50 degrees to 90 degrees and the first surface has a contact angle in a range of 90 degrees to 180 degrees for a 50 $\mu$L water droplet when the first surface is immersed in toluene

Embodiment 159

The filter element of any one of embodiments 157-158 and 160-187, wherein the housing defines housing drainage channels configured to direct fluid flow outside of the housing.

Embodiment 160

The filter element of any one of embodiments 157-159 and 161-187, wherein the filter media defines substrate drainage channels within the spiraled configuration.

Embodiment 161

The filter element of any one of embodiments 157-160 and 162-187, wherein the first substrate layer defines an outer cylindrical surface and a central cylindrical opening.

Embodiment 162

The filter element of any one of embodiments 157-161 and 163-187, wherein the second surface has a roll off angle in a range of 50 degrees to 90 degrees and a contact angle in a range of 90 degrees to 180 degrees for a 50 μL water droplet when the first surface is immersed in toluene.

Embodiment 163

The filter element of any one of embodiments 157-162 and 164-187, wherein the first surface defines the central cylindrical opening.

Embodiment 164

The filter element of any one of embodiments 157-163 and 165-187, wherein the second surface defines the central cylindrical opening.

Embodiment 165

The filter element of any one of embodiments 157-164 and 166-187, further comprising a second substrate layer disposed in the housing, wherein the second substrate layer abuts the first substrate layer.

Embodiment 166

The filter element of any one of embodiments 157-165 and 167-187, wherein the second substrate layer has a third surface and a fourth surface, wherein each of the third surface and the fourth surface has a roll off angle and a contact angle for a 50 μL water droplet when the first surface is immersed in toluene that is different than the roll off angle and the contact angle of the first surface of the first substrate layer.

Embodiment 167

The filter media of any one of embodiments 157-166 and 168-187, wherein the roll off angle of the first surface is in a range of 60 degrees to 90 degrees, in a range of 70 degrees to 90 degrees, or in a range of 80 degrees to 90 degrees.

Embodiment 168

The filter media of any one of embodiments 157-167 and 169-187, wherein the first surface comprises a UV-treated surface.

Embodiment 169

The filter media of any one of embodiments 157-168 and 170-187, wherein the first surface comprises a UV-oxygen-treated surface.

Embodiment 170

The filter media of any one of embodiments 157-169 and 171-187, wherein the substrate layer comprises at least one of an aromatic component and an unsaturated component.

Embodiment 171

The filter media of any one of embodiments 157-170 and 172-187, wherein the substrate layer comprises a UV-reactive resin.

Embodiment 172

The filter media of any one of embodiments 157-171 and 173-187, wherein the first surface comprises a hydrophilic group-containing polymer.

Embodiment 173

The filter media of any one of embodiments 157-172 and 174-187, wherein the hydrophilic group-containing polymer comprises a hydrophilic pendant group.

Embodiment 174

The filter media of any one of embodiments 157-173 and 175-187, wherein the hydrophilic group-containing polymer does not comprise a fluoropolymer.

Embodiment 175

The filter media of any one of embodiments 157-174 and 176-187, wherein the hydrophilic group-containing polymer comprises a hydrophilic polymer.

Embodiment 176

The filter media of any one of embodiments 157-175 and 177-187, wherein the hydrophilic group-containing polymer comprises a charged polymer.

Embodiment 177

The filter media of any one of embodiments 157-176 and 178-187, wherein the hydrophilic group-containing polymer comprises a hydroxylated methacrylate polymer.

Embodiment 178

The filter media of any one of embodiments 157-177 and 179-187, wherein the substrate layer comprises a modifying resin.

Embodiment 179

The filter media of any one of embodiments 157-178 and 180-187, wherein the substrate layer comprises pores having an average diameter of up to 2 mm.

Embodiment 180

The filter media of any one of embodiments 157-179 and 181-187, wherein the substrate layer comprises pores having an average diameter in a range of 40 μm to 50 μm.

Embodiment 181

The filter media of any one of embodiments 157-180 and 182-187, wherein the substrate layer is at least 15% porous and up to 99% porous.

Embodiment 182

The filter media of any one of embodiments 157-181 and 183-187, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 183

The filter media of any one of embodiments 157-182 and 184-187, wherein the surface comprises a hydrophilic group-containing polymer, wherein the substrate comprises pores having an average diameter of up to 2 mm, and wherein the substrate is at least 15% porous and up to 99% porous.

Embodiment 184

The filter media of any one of embodiments 157-183 and 185-187, wherein the substrate layer is stable.

Embodiment 185

The filter media of any one of embodiments 157-184 and 186-187, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 186

The filter media of any one of embodiments 157-185 and 187, wherein the substrate layer comprises cellulose, polyester, polyamide, polyolefin, glass, or a combination thereof.

Embodiment 187

The filter media of any one of embodiments 157-186, wherein the substrate layer comprises a phenolic resin.

Embodiment 188

A cross-flow filter element comprising:
a first substrate defining a tubular structure having an outer radial surface and an inner radial surface, wherein the filter element defines an upstream side within the inner radial surface and a downstream side outside of the outer radial surface, and wherein at least one of the outer radial surface and the inner radial surface has a treatment that increases a roll-off angle for a 50 μL water droplet when the outer radial surface is immersed in toluene.

Embodiment 189

The cross-flow filter element of any one of embodiments 188 and 190-215, wherein the roll off angle of the outer radial surface is in a range of 50 degrees to 90 degrees and the outer radial surface has a contact angle in a range of 90 degrees to 180 degrees for a 50 μL water droplet when the outer radial surface is immersed in toluene.

Embodiment 190

The cross-flow filter element of any one of embodiments 188-189 and 191-215, wherein the inner radial surface has a roll off angle in a range of 50 degrees to 90 degrees and a contact angle in a range of 90 degrees to 180 degrees for a 50 μL water droplet when the inner radial surface is immersed in toluene.

Embodiment 191

The cross-flow filter element of any one of embodiments 188-190 and 192-215, wherein each of the inner radial surface and the outer radial surface has a roll off angle in a range of 50 degrees to 90 degrees and a contact angle in a range of 90 degrees to 180 degrees for a 50 μL water droplet when the respective surface is immersed in toluene.

Embodiment 192

The cross-flow filter element of any one of embodiments 188-191 and 193-215, wherein the first substrate is a membrane.

Embodiment 193

The cross-flow filter element of any one of embodiments 188-192 and 194-215, wherein the first substrate is a ceramic.

Embodiment 194

The cross-flow filter element of any one of embodiments 188-193 and 195-215, wherein the first substrate is polymeric.

Embodiment 195

The filter media of any one of embodiments 188-194 and 196-215, wherein the roll off angle of the first surface is in a range of 60 degrees to 90 degrees, in a range of 70 degrees to 90 degrees, or in a range of 80 degrees to 90 degrees.

Embodiment 196

The filter media of any one of embodiments 188-195 and 197-215, wherein the first surface comprises a UV-treated surface.

Embodiment 197

The filter media of any one of embodiments 188-196 and 198-215, wherein the first surface comprises a UV-oxygen-treated surface.

Embodiment 198

The filter media of any one of embodiments 188-197 and 199-215, wherein the first substrate comprises at least one of an aromatic component and an unsaturated component.

Embodiment 199

The filter media of any one of embodiments 188-198 and 200-215, wherein the first substrate comprises a UV-reactive resin.

Embodiment 200

The filter media of any one of embodiments 188-199 and 201-215, wherein the first surface comprises a hydrophilic group-containing polymer.

Embodiment 201

The filter media of any one of embodiments 188-200 and 202-215, wherein the hydrophilic group-containing polymer comprises a hydrophilic pendant group.

Embodiment 202

The filter media of any one of embodiments 188-201 and 203-215, wherein the hydrophilic group-containing polymer does not comprise a fluoropolymer.

Embodiment 203

The filter media of any one of embodiments 188-202 and 204-215, wherein the hydrophilic group-containing polymer comprises a hydrophilic polymer.

Embodiment 204

The filter media of any one of embodiments 188-203 and 205-215, wherein the hydrophilic group-containing polymer comprises a charged polymer.

Embodiment 205

The filter media of any one of embodiments 188-204 and 206-215, wherein the hydrophilic group-containing polymer comprises a hydroxylated methacrylate polymer.

Embodiment 206

The filter media of any one of embodiments 188-205 and 207-215, wherein the first substrate comprises a modifying resin.

Embodiment 207

The filter media of any one of embodiments 188-206 and 208-215, wherein the first substrate comprises pores having an average diameter of up to 2 mm.

Embodiment 208

The filter media of any one of embodiments 188-207 and 209-215, wherein the first substrate comprises pores having an average diameter in a range of 40 μm to 50 μm.

Embodiment 209

The filter media of any one of embodiments 188-208 and 210-215, wherein the first substrate is at least 15% porous and up to 99% porous.

Embodiment 210

The filter media of any one of embodiments 188-209 and 211-215, wherein the first substrate comprises at least one of an aromatic component and an unsaturated component, wherein the surface comprises a UV-treated surface, wherein the first substrate comprises pores having an average diameter of up to 2 mm, and wherein the substrate is at least 15% porous and up to 99% porous.

Embodiment 211

The filter media of any one of embodiments 188-210 and 212-215, wherein the surface comprises a hydrophilic group-containing polymer, wherein the first substrate comprises pores having an average diameter of up to 2 mm, and wherein the first substrate is at least 15% porous and up to 99% porous.

Embodiment 212

The filter media of any one of embodiments 188-211 and 213-215, wherein the first substrate is stable.

Embodiment 213

The filter media of any one of embodiments 188-212 and 214-215, wherein the first surface comprises poly(hydroxy-propyl methacrylate) (PHPM), poly(2-hydroxyethyl meth-acrylate) (PHEM), poly(2-ethyl-2-oxazoline) (P2E2O), polyethyleneimine (PEI), quaternized polyethyleneimine, poly(dopamine), or combinations thereof.

Embodiment 214

The filter media of any one of embodiments 188-213 and 215, wherein the first substrate comprises cellulose, poly-ester, polyamide, polyolefin, glass, or a combination thereof.

Embodiment 215

The filter media of any one of embodiments 188-214, wherein the first substrate comprises a phenolic resin.

Embodiment 216

A filter element comprising:
a stack of a plurality of layers of single facer media wherein each layer of single facer media comprises a fluted sheet and a facing sheet which cumulatively define a plurality of flutes comprising inlet flutes and outlet flutes, wherein each flute of the plurality of flutes has a flute length extending from a first face of the filter element to a second face of the filter element;
a first obstruction disposed within the outlet flutes towards the first face of the filter element; and
a second obstruction disposed within the inlet flutes towards the second face of the filter element, so that fluid passing into the first face of the filter element and out the second face of the filter element passes through media to provide fluid filtration, wherein at least a first surface of the single facer media has a treatment that increases a roll-off angle for a 50 μL water droplet when the surface is immersed in toluene.

Embodiment 217

The filter element of any one of embodiments 216 and 218-238, wherein the roll off angle of the first surface of the single facer media is in a range of 50 degrees to 90 degrees and the at least one surface has a contact angle in a range of 90 degrees to 180 degrees for a 50 μL water droplet when the surface is immersed in toluene.

Embodiment 218

The filter media of any one of embodiments 216-217 and 219-238, wherein the roll off angle of the first surface is in a range of 60 degrees to 90 degrees, in a range of 70 degrees to 90 degrees, or in a range of 80 degrees to 90 degrees.

Embodiment 219

The filter media of any one of embodiments 216-218 and 220-238, wherein the first surface comprises a UV-treated surface.

Embodiment 220

The filter media of any one of embodiments 216-219 and 221-238, wherein the first surface comprises a UV-oxygen-treated surface.

Embodiment 221

The filter media of any one of embodiments 216-220 and 222-238, wherein the substrate layer comprises at least one of an aromatic component and an unsaturated component.

Embodiment 222

The filter media of any one of embodiments 216-221 and 223-238, wherein the substrate layer comprises a UV-reactive resin.

Embodiment 223

The filter media of any one of embodiments 216-222 and 224-238, wherein the first surface comprises a hydrophilic group-containing polymer.

Embodiment 224

The filter media of any one of embodiments 216-223 and 225-238, wherein the hydrophilic group-containing polymer comprises a hydrophilic pendant group.

Embodiment 225

The filter media of any one of embodiments 216-224 and 226-238, wherein the hydrophilic group-containing polymer does not comprise a fluoropolymer.

Embodiment 226

The filter media of any one of embodiments 216-225 and 227-238, wherein the hydrophilic group-containing polymer comprises a hydrophilic polymer.

Embodiment 227

The filter media of any one of embodiments 216-226 and 228-238, wherein the hydrophilic group-containing polymer comprises a charged polymer.

Embodiment 228

The filter media of any one of embodiments 216-227 and 229-238, wherein the hydrophilic group-containing polymer comprises a hydroxylated methacrylate polymer.

Embodiment 229

The filter media of any one of embodiments 216-228 and 230-238, wherein the substrate layer comprises a modifying resin.

Embodiment 230

The filter media of any one of embodiments 216-229 and 231-238, wherein the substrate layer comprises pores having an average diameter of up to 2 mm.

Embodiment 231

The filter media of any one of embodiments 216-230 and 232-238, wherein the substrate layer comprises pores having an average diameter in a range of 40 μm to 50 μm.

Embodiment 232

The filter media of any one of embodiments 216-231 and 233-238, wherein the substrate layer is at least 15% porous and up to 99% porous.

Embodiment 233

The filter media of any one of embodiments 216-232 and 234-238, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 234

The filter media of any one of embodiments 216-233 and 235-238, wherein the surface comprises a hydrophilic group-containing polymer, wherein the substrate comprises pores having an average diameter of up to 2 mm, and wherein the substrate is at least 15% porous and up to 99% porous.

Embodiment 235

The filter media of any one of embodiments 216-234 and 236-238, wherein the substrate layer is stable.

Embodiment 236

The filter media of any one of embodiments 216-235 and 237-238, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 237

The filter media of any one of embodiments 216-236 and 238, wherein the substrate layer comprises cellulose, polyester, polyamide, polyolefin, glass, or a combination thereof.

Embodiment 238

The filter media of any one of embodiments 216-237, wherein the substrate layer comprises a phenolic resin.

Embodiment 239

A filter element comprising:
filter media configured in a tubular arrangement defining an inner opening and an outer surface; and a liner concentric with the filter media, wherein the liner is arranged in a series with respect to fluid flow through the filter element, wherein the liner has a treatment that increases the roll-off angle of at least a first surface for a 50 µL water droplet when the surface is immersed in toluene.

Embodiment 240

The filter element of any one of embodiments 239 and 241-267, wherein the roll off angle of the first surface is in a range of 50 degrees to 90 degrees and the first surface has a contact angle in a range of 90 degrees to 180 degrees for a 50 µL water droplet when the surface is immersed in toluene.

Embodiment 241

The filter element of any one of embodiments 239-240 and 242-267, wherein the liner is disposed in the inner opening defined by the filter media.

Embodiment 242

The filter element of any one of embodiments 239-241 and 243-267, wherein the liner is disposed around the outer surface of the filter media.

Embodiment 243

The filter element of any one of embodiments 239-242 and 244-267, wherein the filter media is pleated.

Embodiment 244

The filter element of any one of embodiments 239-243 and 245-267, wherein the filter media is wrapped.

Embodiment 245

The filter element of any one of embodiments 239-244 and 246-267, wherein the first surface of the liner comprises an outer liner surface.

Embodiment 246

The filter element of any one of embodiments 239-245 and 247-267, wherein the at least first surface of the liner comprises an inner liner surface.

Embodiment 247

The filter media of any one of embodiments 239-246 and 248-267, wherein the roll off angle of the first surface is in a range of 60 degrees to 90 degrees, in a range of 70 degrees to 90 degrees, or in a range of 80 degrees to 90 degrees.

Embodiment 248

The filter media of any one of embodiments 239-247 and 249-267, wherein the first surface comprises a UV-treated surface.

Embodiment 249

The filter media of any one of embodiments 239-248 and 250-267, wherein the first surface comprises a UV-oxygen-treated surface.

Embodiment 250

The filter media of any one of embodiments 239-249 and 251-267, wherein the substrate layer comprises at least one of an aromatic component and an unsaturated component.

Embodiment 251

The filter media of any one of embodiments 239-250 and 252-267, wherein the substrate layer comprises a UV-reactive resin.

Embodiment 252

The filter media of any one of embodiments 239-251 and 253-267, wherein the first surface comprises a hydrophilic group-containing polymer.

Embodiment 253

The filter media of any one of embodiments 239-252 and 254-267, wherein the hydrophilic group-containing polymer comprises a hydrophilic pendant group.

Embodiment 254

The filter media of any one of embodiments 239-253 and 255-267, wherein the hydrophilic group-containing polymer does not comprise a fluoropolymer.

Embodiment 255

The filter media of any one of embodiments 239-254 and 256-267, wherein the hydrophilic group-containing polymer comprises a hydrophilic polymer.

Embodiment 256

The filter media of any one of embodiments 239-255 and 257-267, wherein the hydrophilic group-containing polymer comprises a charged polymer.

Embodiment 257

The filter media of any one of embodiments 239-256 and 258-267, wherein the hydrophilic group-containing polymer comprises a hydroxylated methacrylate polymer.

Embodiment 258

The filter media of any one of embodiments 239-257 and 259-267, wherein the substrate layer comprises a modifying resin.

Embodiment 259

The filter media of any one of embodiments 239-258 and 260-267, wherein the substrate layer comprises pores having an average diameter of up to 2 mm.

Embodiment 260

The filter media of any one of embodiments 239-259 and 261-267, wherein the substrate layer comprises pores having an average diameter in a range of 40 µm to 50 µm.

Embodiment 261

The filter media of any one of embodiments 239-260 and 262-267, wherein the substrate layer is at least 15% porous and up to 99% porous.

Embodiment 262

The filter media of any one of embodiments 239-261 and 263-267, wherein the substrate layer comprises at least one of an aromatic component and an unsaturated component, wherein the surface comprises a UV-treated surface, wherein the substrate comprises pores having an average diameter of up to 2 mm, and wherein the substrate is at least 15% porous and up to 99% porous.

Embodiment 263

The filter media of any one of embodiments 239-262 and 264-267, wherein the surface comprises a hydrophilic group-containing polymer, wherein the substrate comprises pores having an average diameter of up to 2 mm, and wherein the substrate is at least 15% porous and up to 99% porous.

Embodiment 264

The filter media of any one of embodiments 239-263 and 265-267, wherein the substrate layer is stable.

Embodiment 265

The filter media of any one of embodiments 239-264 and 266-267, wherein the first surface comprises poly(hydroxypropyl methacrylate) (PHPM), poly(2-hydroxyethyl methacrylate) (PHEM), poly(2-ethyl-2-oxazoline) (P2E2O), polyethyleneimine (PEI), quaternized polyethyleneimine, poly(dopamine), or combinations thereof.

Embodiment 266

The filter media of any one of embodiments 239-265 and 267, wherein the substrate layer comprises cellulose, polyester, polyamide, polyolefin, glass, or a combination thereof.

Embodiment 267

The filter media of any one of embodiments 239-266, wherein the substrate layer comprises a phenolic resin.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The current technology is not limited to the exact details shown and described, for variations obvious to one skilled in the art will be included within the technology defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present technology. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the current technology are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A filter element comprising:
   a substrate layer defining a first surface having a roll off angle in a range of 50 degrees to 90 degrees and a contact angle in a range of 90 degrees to 180 degrees for a 50 µL water droplet when the first surface is immersed in toluene, wherein the substrate layer comprises cellulose, glass, or a combination thereof, wherein the substrate layer defines a plurality of pleats extending between a first set of pleat folds and a second set of pleat folds, wherein the first set of pleat folds defines a first face and the second set of pleat folds defines a second face.

2. The filter element of claim 1, wherein the first face is opposite the second face relative to the filter element.

3. The filter element of claim 1, wherein a distance between each adjacent pleat fold in the first set of pleat folds is greater than a distance between each adjacent pleat fold in the second set of pleat folds.

4. The filter element of claim 1, further comprising pleat spacers disposed between each pleat fold in the first set of pleat folds.

5. The filter element of claim 1, wherein the first face defines a curved plane.

6. The filter element of claim 1, wherein the substrate layer defines a plurality of flutes extending between the first set of pleat folds and the second set of pleat folds.

7. The filter element of claim 6, wherein a portion of the plurality of flutes are tapered.

8. The filter element of claim 1, wherein the substrate layer defines a second surface opposite the first surface, wherein the second surface has a roll off angle in a range of 50 degrees to 90 degrees and a contact angle in a range of 90 degrees to 180 degrees for a 50 µL water droplet when the second surface is immersed in toluene.

9. The filter element of claim 1, wherein the first face defines an outer cylindrical surface and the second face defines an inner cylindrical surface.

10. The filter element of claim 1, wherein the roll off angle of the first surface is in a range of 60 degrees to 90 degrees, in a range of 70 degrees to 90 degrees, or in a range of 80 degrees to 90 degrees.

11. The filter element of claim 1, wherein the first surface comprises a UV-treated surface.

12. The filter element of claim 1, wherein the first surface comprises a UV-oxygen-treated surface.

13. The filter element of claim 1, wherein the substrate layer comprises at least one of an aromatic component and an unsaturated component.

14. The filter element of claim 1, wherein the substrate layer comprises a UV-reactive resin.

15. The filter element of claim 1, wherein the first surface comprises a hydrophilic group-containing polymer.

16. The filter element of claim 15, wherein the hydrophilic group-containing polymer comprises a hydrophilic pendant group.

17. The filter element of claim 15, wherein the hydrophilic group-containing polymer does not comprise a fluoropolymer.

18. The filter element of claim 15, wherein the hydrophilic group-containing polymer comprises a hydrophilic polymer.

19. The filter element of claim 1, wherein the substrate layer does not comprise polyethylene terephthalate.

* * * * *